(12) United States Patent
Wei et al.

(10) Patent No.: US 12,414,069 B2
(45) Date of Patent: Sep. 9, 2025

(54) NETWORK SEARCH METHOD FOR SA 5G SERVICE AUTO-PROVISIONING AND RELATED APPARATUS

(71) Applicant: Huawei Technologies Co., Ltd., Shenzhen (CN)

(72) Inventors: Zhenrong Wei, Shenzhen (CN); Hao Song, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 519 days.

(21) Appl. No.: 17/921,442

(22) PCT Filed: Apr. 26, 2021

(86) PCT No.: PCT/CN2021/090038
§ 371 (c)(1),
(2) Date: Oct. 26, 2022

(87) PCT Pub. No.: WO2021/218936
PCT Pub. Date: Nov. 4, 2021

(65) Prior Publication Data
US 2023/0164727 A1    May 25, 2023

(30) Foreign Application Priority Data
Apr. 26, 2020 (CN) .......................... 202010339740.3

(51) Int. Cl.
*H04W 60/00* (2009.01)
(52) U.S. Cl.
CPC .................................. *H04W 60/00* (2013.01)
(58) Field of Classification Search
CPC ....... H04W 60/00; H04W 48/18; H04W 4/14; H04W 4/50; H04W 60/04; H04W 48/16
See application file for complete search history.

(56) References Cited

U.S. PATENT DOCUMENTS

| 2005/0020259 | A1* | 1/2005 | Herrero | .................... | H04W 8/12 |
| | | | | | 455/433 |
| 2021/0258857 | A1* | 8/2021 | Won | ...................... | H04W 48/18 |
| 2023/0189187 | A1* | 6/2023 | Velev | .................... | H04W 48/16 |
| | | | | | 455/435.1 |

FOREIGN PATENT DOCUMENTS

WO    WO-2019034610 A1 *  2/2019  ............ H04W 60/04

OTHER PUBLICATIONS

3GPP TS 24.501 V0.1.0, Nov. 2017, "3rd Generation Partnership Project; Technical Specification Group Core Network and Terminals; Non-Access-Stratum (NAS) protocol for 5G System (5GS); Stage 3 (Release 15)," 16 pages.

* cited by examiner

*Primary Examiner* — Marcus Hammonds
(74) *Attorney, Agent, or Firm* — Conley Rose, P.C.

(57) ABSTRACT

A network search method for standalone (SA) fifth generation (5G) service auto-provisioning includes a user equipment sending a registration request to a network side device to request to register the user equipment with a 5G network. A networking mode of the 5G network is SA networking. The user equipment receives a registration reject response from the network side device when no available 5G subscription data of the user equipment is obtained through query, where the registration reject response notifies the user equipment that the registration with the 5G network fails. The user equipment receives a notification short message from the network side device after the network side device provisions a 5G service for the user equipment; and the user equipment sends the registration request to the network side device again in response to the notification short message.

17 Claims, 40 Drawing Sheets

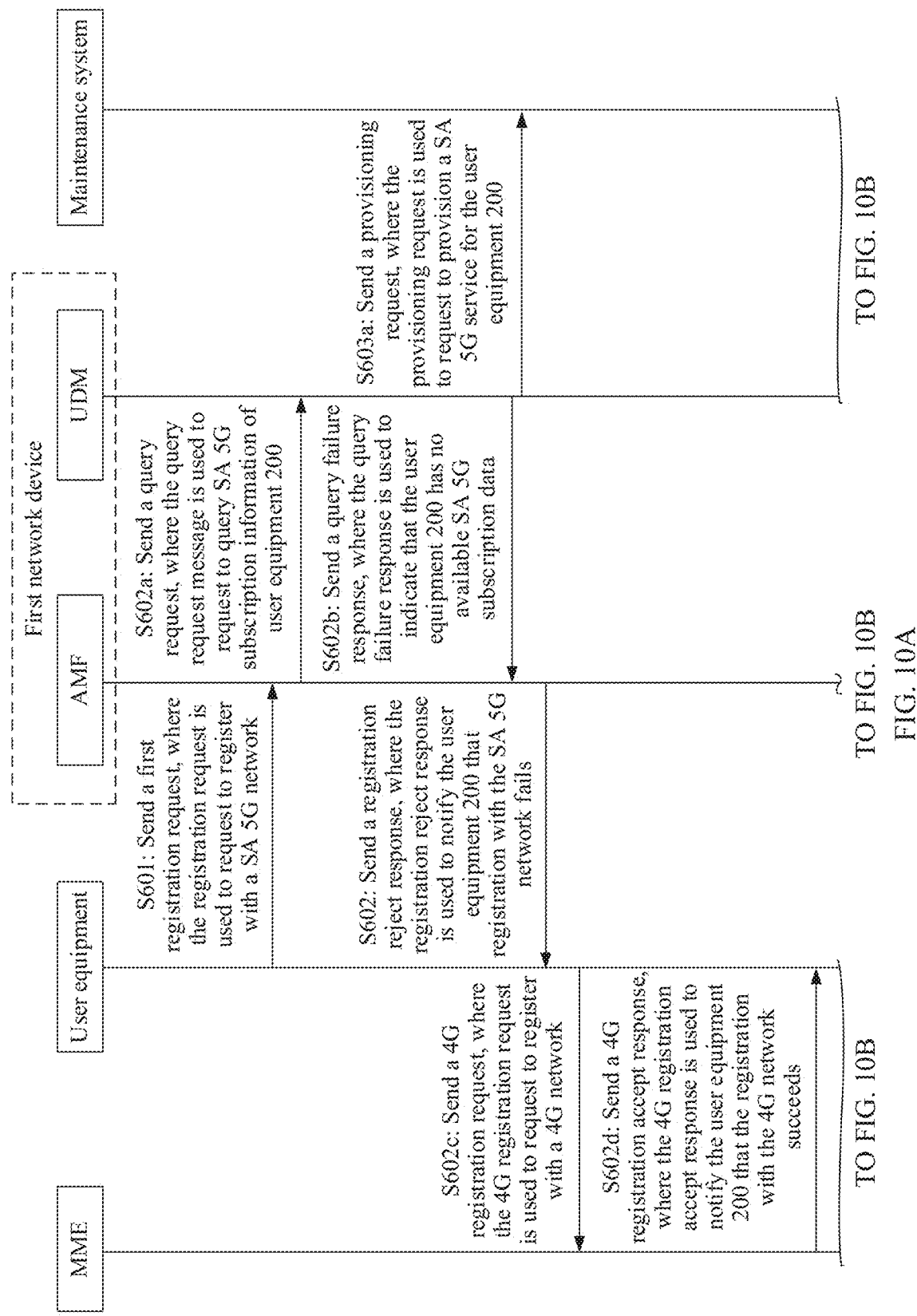

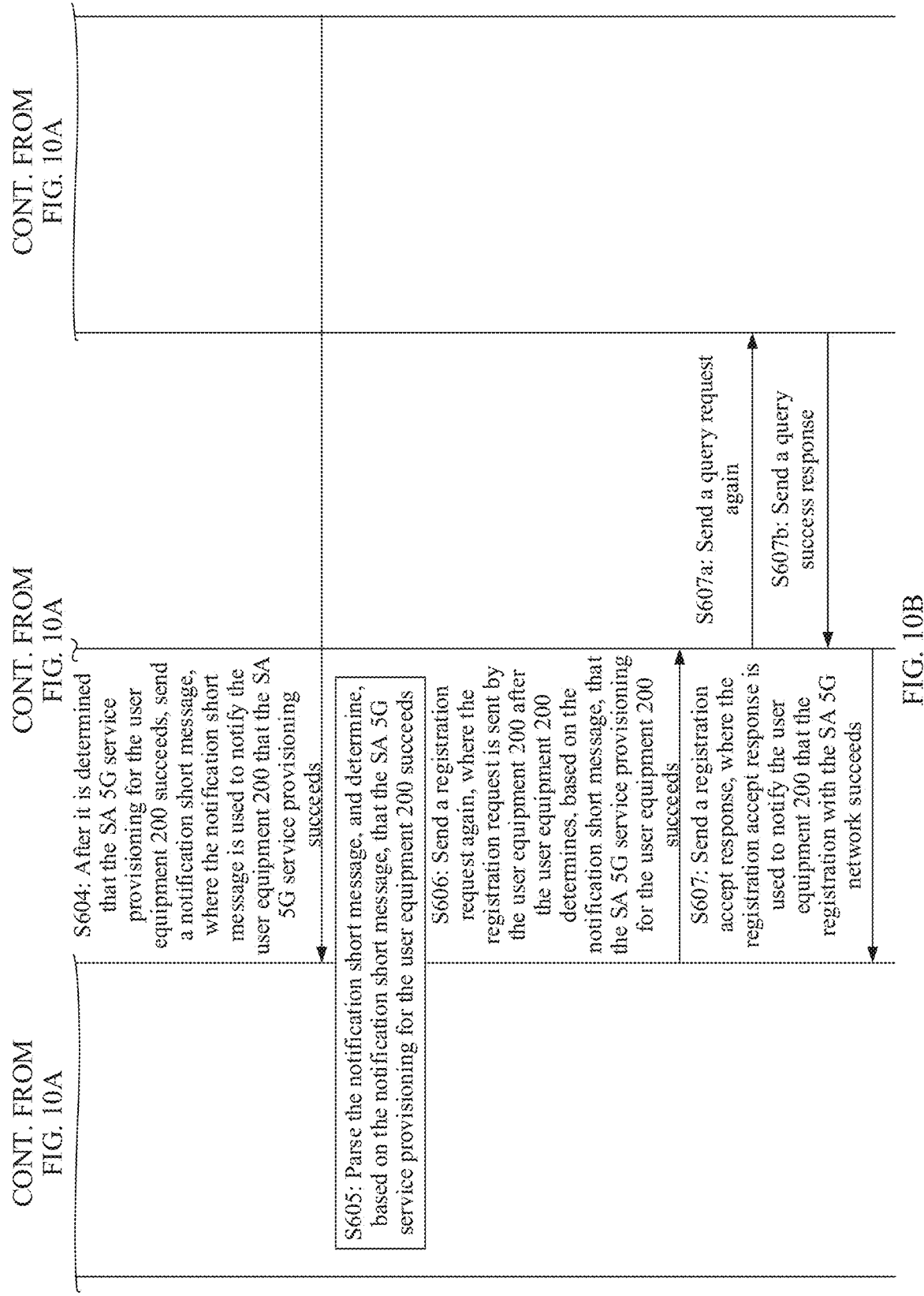

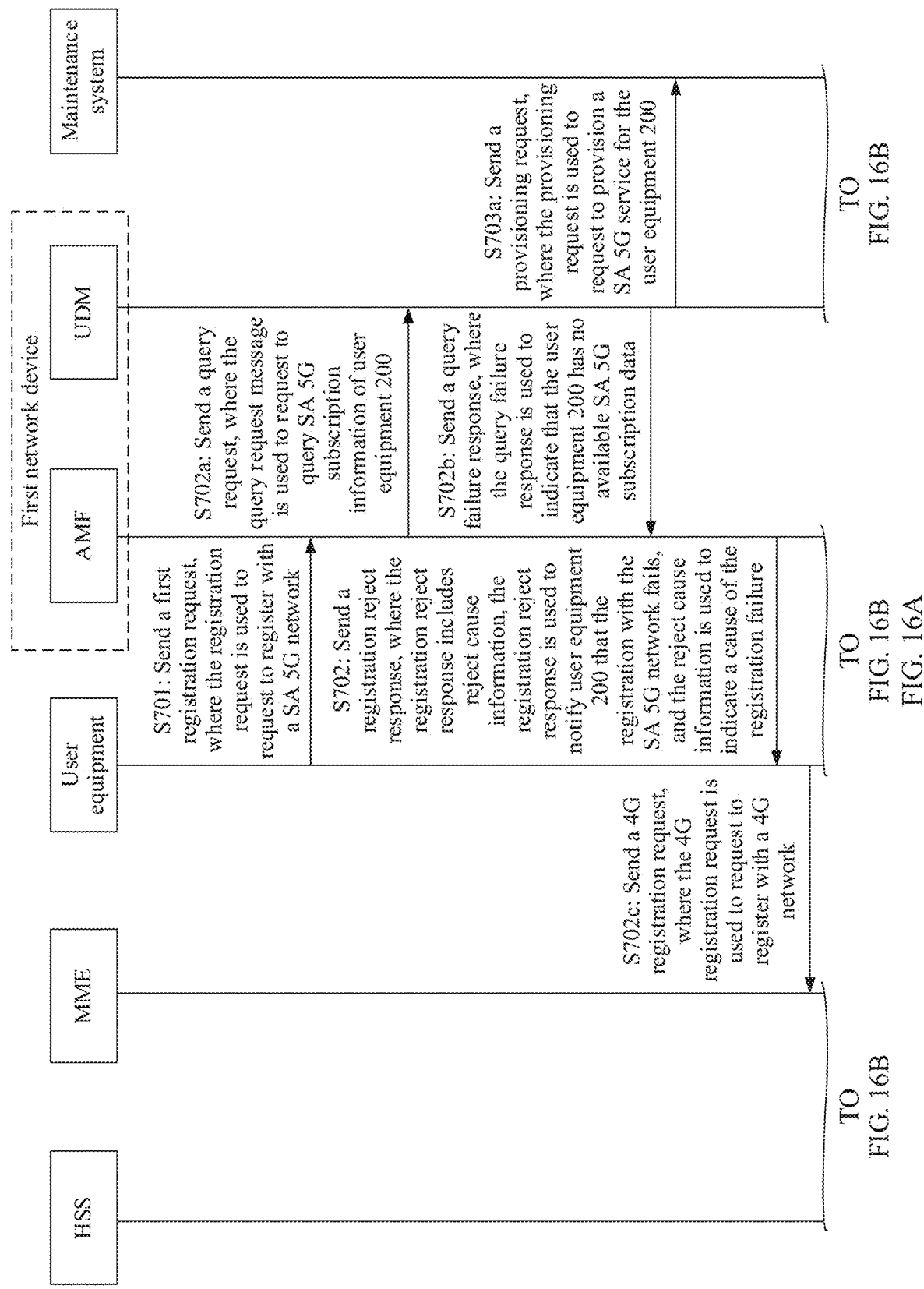

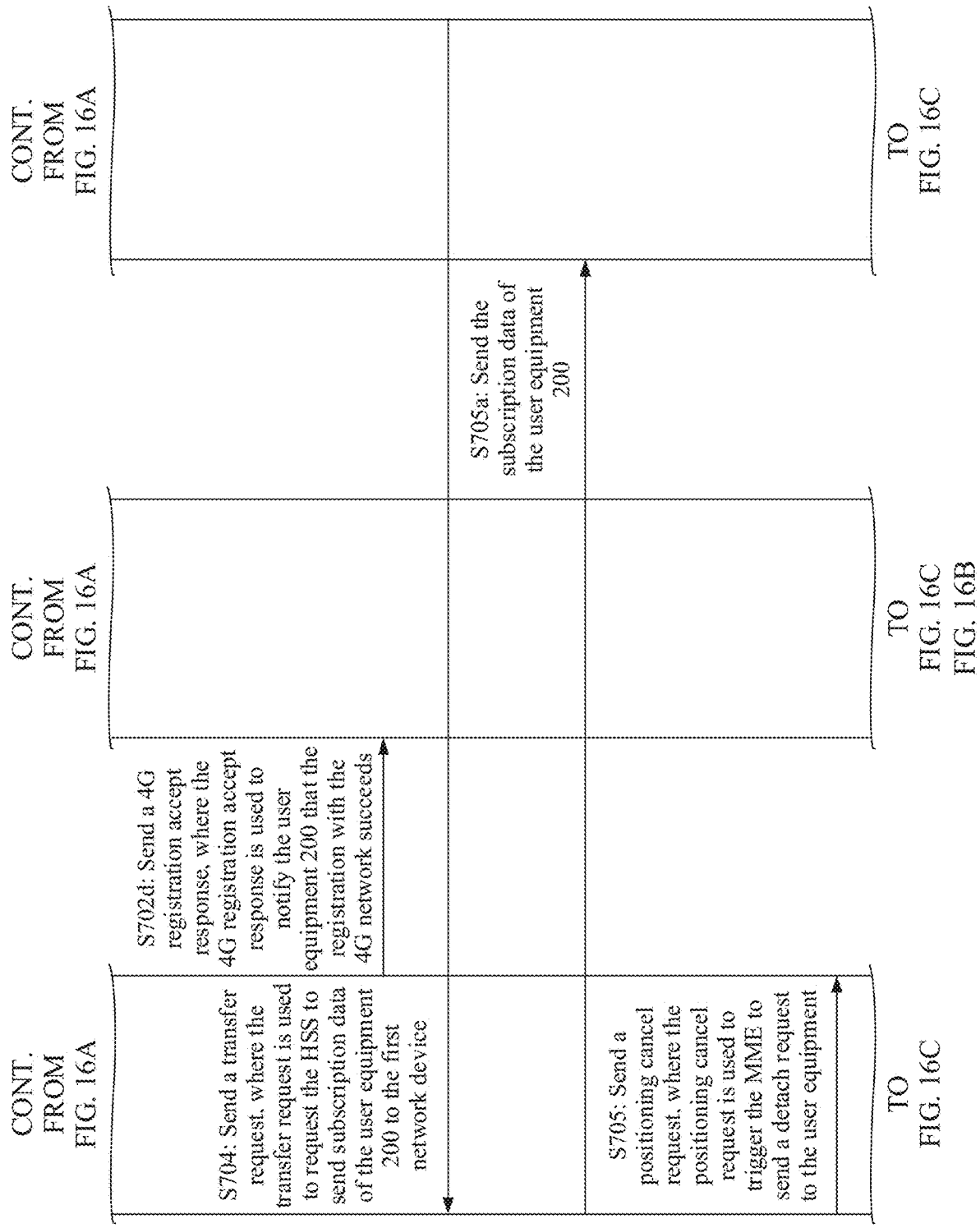

NETWORK SEARCH METHOD FOR SA 5G SERVICE AUTO-PROVISIONING AND RELATED APPARATUS

CROSS-REFERENCE TO RELATED APPLICATIONS

This is a U.S. National Stage of International Patent Application No. PCT/CN2021/090038 filed on Apr. 26, 2021, which claims priority to Chinese Patent Application No. 202010339740.3 filed on Apr. 26, 2020. Both of the aforementioned applications are hereby incorporated by reference in their entireties.

TECHNICAL FIELD

This application relates to the field of communication technologies, and in particular, to a network search method for SA 5G service auto-provisioning and a related apparatus.

BACKGROUND

With advent of a fifth-generation mobile communication technology (5th generation mobile networks, 5G) era, a 5G mobile network can meet people's communication requirements, and can also support connections of massive interact of things devices, to provide mobile communication services for thousands of industries. Deployment modes of 5G networking mainly include the following two modes: non-standalone (non-standalone, NSA) networking and standalone (standalone, SA) networking. In non-standalone networking, existing 4G infrastructure is used to deploy a 5G network. The standalone networking mode features a mature technology, large-scale coverage, and the like. In the standalone networking mode, a new 5G network is established, and the 5G network includes new base stations, backhaul links, and a core network. This mode can bring all 5G network features and functions. Compared with NSA networking, SA networking has a better performance advantage. However, standalone networking requires continuous investment in new devices and has higher costs than those of non-standalone networking. In an initial phase, an operator will focus on NSA. However, in the near future, SA will gradually replace NSA and become a mainstream in the market. When a mobile phone intends to register with a SA 5G network, a SA 5G service needs to be provisioned in advance. For a SA 5G network registration request from a mobile phone for which a SA 5G service is not provisioned, different operators process the request in different ways.

Currently, user equipment for which a SA 5G service is not provisioned cannot quickly register with a SA 5G network, and user experience is poor.

SUMMARY

Embodiments of this application provide a network search method for SA 5G service auto-provisioning and a related apparatus, so that user equipment for which a SA 5G service is not provisioned can quickly register with a SA 5G network, and user experience is effectively improved.

According to a first aspect, this application provides a network search system for SA 5G service auto-provisioning, where the system includes user equipment and a network side device, where the user equipment is configured to send a registration request to a network side device, where the registration request is used to request to register the user equipment with a, 5G network, and a networking mode of the 5G network is standalone networking SA;

the network side device is configured to: in response to the registration request, send a registration reject response to the user equipment when no available 5G subscription data corresponding to the user equipment is obtained through query, and provision a 5G service for the user equipment, where the registration reject response is used to notify the user equipment that the registration with the 5G network fails;

the network side device is further configured to send a notification short message to the user equipment after the 5G service is successfully provisioned for the user equipment, where the notification short message is used to notify the user equipment that the 5G service is successfully provisioned; and the user equipment is further configured to: in response to the received notification short message, send a registration request to the network side device again.

In an implementation, that the user equipment is configured to send a registration request to a network side device includes: the user equipment is specifically configured to send the registration request to the network side device for the first time.

In an implementation, that the user equipment is configured to send the registration request to the network side device includes: the user equipment is specifically configured to: when the user equipment has no network service in an NR cell, send the registration request to the network side device for the first time.

In an implementation, that the user equipment is configured to send the registration request to the network side device includes: the user equipment is specifically configured to: when the user equipment leaves an LTE cell and enters a new radio NR cell, send the registration request to the network side device for the first time.

In an implementation, that the user equipment is configured to send the registration request to the network side device includes: the user equipment is specifically configured to: when the user equipment is powered on in an NR cell, send the registration request to the network side device for the first time.

In an implementation, that the user equipment is configured to send the registration request to the network side device includes: the user equipment is specifically configured to: when an airplane mode of the user equipment is disabled in an NR cell, send the registration request to the network side device for the first time.

In an implementation, the user equipment supports the 5G network.

In an implementation, after the network side device provisions the 5G service for the user equipment, the network side device stores the available 5G subscription data corresponding to the user equipment.

In an implementation, the network side device is further configured to: in response to the registration request sent by the user equipment again, send a registration accept response to the user equipment after the available 5G subscription data corresponding to the user equipment is obtained through query, where the registration accept response is used to notify the user equipment that the registration with the 5G network succeeds.

In an implementation, that the user equipment is further configured to: in response to the received notification short message, send the registration request to the network side device again includes: the user equipment is further specifically configured to: when the user equipment detects that the notification short message includes a preset keyword, send the registration request to the network side device again.

According to a second aspect, this application provides a network search method for SA 5G service auto-provisioning. The method includes: user equipment sends a registration request to a network side device, where the registration request is used to request to register the user equipment with a 5G network, and a networking mode of the 5G network is standalone networking SA; the user equipment receives a registration reject response sent by the network side device when no available 5G subscription data corresponding to the user equipment is obtained through query, where the registration reject response is used to notify the user equipment that the registration with the 5G network fails; the user equipment receives a notification short message sent by the network side device after the network side device provisions a 5G service for the user equipment, where the notification short message is used to notify the user equipment that the 5G service is successfully provisioned; and the user equipment sends, in response to the notification short message, the registration request to the network side device again.

In this embodiment of this application, user equipment for which a 5G service is not provisioned sends a 5G network registration request to the network side device, and the network side device queries, in response to the registration request, 5G subscription data corresponding to the user equipment. When no available 5G subscription data of the user equipment is obtained through query, the network side device sends a registration reject response to the user equipment, and provisions the 5G service for the user equipment. Then, the network side device sends a notification short message to the user equipment after the 5G service is successfully provisioned, to notify the user equipment that the 5G service is successfully provisioned. When determining, based on the notification short message, that the 5G service is successfully provisioned, the user equipment initiates a 5G network registration request again. In this way, the user equipment can quickly register with the 5G network, and user experience is effectively improved.

In an implementation, that the user equipment sends the registration request to the network side device includes: the user equipment sends the registration request to the network side device for the first time.

In an implementation, that the user equipment sends the registration request to the network side device includes: when the user equipment has no network service in an NR cell, sending the registration request to the network side device for the first time.

In an implementation, that the user equipment sends the registration request to the network side device includes: when the user equipment leaves an LTE cell and enters a new radio NR cell, sending the registration request to the network side device for the first time.

In an implementation, that the user equipment sends the registration request to the network side device includes: when the user equipment is powered on in an NR cell, sending the registration request to the network side device for the first time.

In an implementation, that the user equipment sends the registration request to the network side device includes: when an airplane mode of the user equipment is disabled in an NR cell, sending the registration request to the network side device for the first time.

In an implementation, the user equipment supports the 5G network.

In an implementation, after the network side device provisions the 5G service for the user equipment, the network side device stores the available 5G subscription data corresponding to the user equipment.

In an implementation, after the user equipment sends the registration request to the network side device again, the method further includes: the user equipment receives the registration accept response sent by the network side device after the available 5G subscription data corresponding to the user equipment is obtained through query, where the registration accept response is used to notify the user equipment that the registration with the 5G network succeeds.

In an implementation, that the user equipment sends, in response to the notification short message, the registration request to the network side device again includes: when the user equipment detects that the notification short message includes a preset keyword, sending the registration request to the network side device again.

According to a third aspect, this application further provides a network search system for SA 5G service auto-provisioning, where the system includes user equipment, a first network device, and a maintenance system of an operator, where the user equipment is configured to send a registration request to the first network device, where the registration request is used to request to register the user equipment with a 5G network, and a networking mode of the 5G network is standalone networking SA;

the first network device is configured to: in response to the registration request, send a registration reject response to the user equipment when no available 5G subscription data corresponding to the user equipment is obtained through query, and sends a provisioning request to the maintenance system, where the registration reject response is used to notify the user equipment that the registration with the 5G network fails;

the maintenance system is configured to: in response to the provisioning request, provision a 5G service for the user equipment, and sends a notification short message to the user equipment after the 5G service is successfully provisioned, where the notification short message is used to notify the user equipment that the 5G service is successfully provisioned; and the user equipment is further configured to: in response to the notification short message, send a registration request to the first network device again.

According to a fourth aspect, this application provides a network search system for SA 5G service auto-provisioning, where the system includes user equipment and a network side device, where the user equipment is configured to send a registration request to a network side device, where the registration request is used to request to register the user equipment with a 5G network, and a networking mode of the 5G network is standalone networking SA;

the network side device is configured to: in response to the registration request, send a registration reject response to the user equipment when no available 5G subscription data corresponding to the user equipment is obtained through query, and provision a 5G service for the user equipment, where the registration reject response is used to notify the user equipment that the registration with the 5G network fails, the registration reject response includes reject cause information, and the reject cause information is used to indicate a cause of the registration failure;

the network side device is further configured to send a detach request to the user equipment after the network side device provisions the 5G service for the user equipment, where the detach request is used to trigger the user equipment to re-register with a 4G network; and the user equipment is further configured to: in response to the reject cause information and the detach request, send a registration request to the network side device again.

In an implementation, the reject cause information is a reject cause value #111.

In an implementation, the reject cause information is a reject cause value #127.

In an implementation, that the user equipment is configured to send the registration request to the network side device includes: the user equipment is specifically configured to send the registration request to the network side device for the first time.

In an implementation, that the user equipment is configured to send the registration request to the network side device includes: the user equipment is specifically configured to: when the user equipment has no network service in an NR cell, send the registration request to the network side device for the first time.

In an implementation, that the user equipment is configured to send the registration request to the network side device includes: the user equipment is specifically configured to: when the user equipment leaves an LIE cell and enters a new radio NR cell, send the registration request to the network side device for the first time.

In an implementation, that the user equipment is configured to send the registration request to the network side device includes: the user equipment is specifically configured to: when the user equipment is powered on in an NR cell, send the registration request to the network side device for the first time.

In an implementation, that the user equipment is configured to send the registration request to the network side device includes: the user equipment is specifically configured to: when an airplane mode of the user equipment is disabled in an NR cell, send the registration request to the network side device for the first time.

In an implementation, the user equipment supports the 5G network.

In an implementation, after the network side device provisions the 5G service for the user equipment, the network side device stores the available 5G subscription data corresponding to the user equipment.

In an implementation, the network side device is further configured to: in response to the registration request sent by the user equipment again, send a registration accept response to the user equipment after the available 5G subscription data corresponding to the user equipment is obtained through query, where the registration accept response is used to notify the user equipment that the registration with the 5G network succeeds.

According to a fifth aspect, this application provides a network search method for SA 5G service auto-provisioning. The method includes: user equipment sends a registration request to a network side device, where the registration request is used to request to register the user equipment with a 5G network, and a networking mode of the 5G network is standalone networking the user equipment receives a registration reject response sent by the network side device when no available 5G subscription data corresponding to the user equipment is obtained through query, where the registration reject response is used to notify the user equipment that the registration with the 5G network fails, the registration reject response includes reject cause information, and the reject cause information is used to indicate a cause of the registration failure the network side device is configured to provision a 5G service for the user equipment when no available 5G subscription data corresponding to the user equipment is obtained through query the user equipment receives a detach request that is sent by the network side device after the network side device provisions the 5G service for the user equipment, where the detach request is used to trigger the user equipment to re-register with a 4G network; and the user equipment sends, in response to the reject cause information and the detach request, a registration request to the network side device again.

In this embodiment of this application, user equipment for which a 5G service is not provisioned sends a 5G network registration request to the network side device, and the network side device queries, in response to the registration request, 5G subscription data corresponding to the user equipment. When no available 5G subscription data of the user equipment is obtained through query, the network side device sends a registration reject response to the user equipment, and provisions the 5G service for the user equipment. The network side device adds the reject cause information to the registration reject response, and sends the detach request to the user equipment after the network side device provisions the 5G service for the user equipment. When receiving the detach request after receiving the reject cause information, the user equipment initiates a 5G network registration request again. In this way, user equipment for which a SA 5G service is not provisioned can also quickly register with the 5G network, and user experience is effectively improved.

In an implementation, the reject cause information is a reject cause value #111.

In an implementation, the reject cause information is a reject cause value #127.

In an implementation, a timer is numbered as T3502.

In an implementation, that the user equipment sends the registration request to the network side device includes: the user equipment sends the registration request to the network side device for the first time.

In an implementation, that the user equipment sends the registration request to the network side device includes: when the user equipment has no network service in an NR cell, sending the registration request to the network side device for the first time.

In an implementation, that the user equipment sends the registration request to the network side device includes: when the user equipment leaves an LTE cell and enters a new radio NR cell, sending the registration request to the network side device for the first time.

In an implementation, that the user equipment sends the registration request to the network side device includes: when the user equipment is powered on in an NR cell, sending the registration request to the network side device for the first time.

In an implementation, that the user equipment sends the registration request to the network side device includes: when an airplane mode of the user equipment is disabled in an NR cell, sending the registration request to the network side device for the first time.

In an implementation, the user equipment supports the 5G network.

In an implementation, after the user equipment sends the registration request to the network side device again, the method further includes: the user equipment receives the registration accept response sent by the network side device after the available 5G subscription data corresponding to the user equipment is obtained through query, where the registration accept response is used to notify the user equipment that the registration with the 5G network succeeds.

According to a sixth aspect, this application provides a network search system for SA 5G service auto-provisioning, where the system includes user equipment and a network side device, where the user equipment is configured to send a registration request to a network side device, where the registration request is used to request to register the user equipment with a 5G network, and a networking mode of the 5G network is standalone networking SA;

the network side device is configured to: in response to the registration request, send a registration reject response to the user equipment when no available 5G subscription data corresponding to the user equipment is obtained through query, and provision a 5G service for the user equipment, where the registration reject response is used to notify the user equipment that the registration with the 5G network tails, the registration reject response includes reject cause information, and the reject cause information is used to indicate a cause of the registration failure;

the user equipment is further configured to: in response to the reject cause information, start a timer; and the user equipment is further configured to: in response to expiration of the timer, send a registration request to the network side device again.

In an implementation, the reject cause information is a reject cause value #111.

In an implementation, the reject cause information is a reject cause value #127.

In an implementation, the timer is numbered as T3502.

In an implementation, that the user equipment is configured to send the registration request to the network side device includes: the user equipment is specifically configured to send the registration request to the network side device for the first time.

In an implementation, that the user equipment is configured to send the registration request to the network side device includes: the user equipment is specifically configured to: when the user equipment has no network service in an NR cell, send the registration request to the network side device for the first time.

In an implementation, that the user equipment is configured to send the registration request to the network side device includes: the user equipment is specifically configured to: when the user equipment leaves an LIE cell and enters a new radio NR cell, send the registration request to the network side device for the first time.

In an implementation, that the user equipment is configured to send the registration request to the network side device includes: the user equipment is specifically configured to: when the user equipment is powered on in an NR cell, send the registration request to the network side device for the first time.

In an implementation, that the user equipment is configured to send the registration request to the network side device includes: the user equipment is specifically configured to: when an airplane mode of the user equipment is disabled in an NR cell, send the registration request to the network side device for the first time.

In an implementation, the user equipment supports the 5G network.

In an implementation, after the network side device provisions the 5G service for the user equipment, the network side device stores the available 5G subscription data corresponding to the user equipment.

In an implementation, the network side device is further configured to: in response to the registration request sent by the user equipment again, send a registration accept response to the user equipment after the available 5G subscription data corresponding to the user equipment is obtained through query where the registration accept response is used to notify the user equipment that the registration with the 5G network succeeds.

According to a seventh aspect, this application provides a network search method for SA 5G service auto-provisioning. The method includes: user equipment sends a registration request to a network side device, where the registration request is used to request to register the user equipment with a 5G network, and a networking mode of the 5G network is standalone networking SA; the user equipment receives a registration reject response sent by the network side device when no available 5G subscription data corresponding to the user equipment is obtained through query, where the registration reject response is used to notify the user equipment that the registration with the 5G network fails, the registration reject response includes reject cause information, and the reject cause information is used to indicate a cause of the registration failure; the network side device is configured to provision a 5G service for the user equipment when no available 5G subscription data corresponding to the user equipment is obtained through query; the user equipment starts, in response to the reject cause information, a timer; and the user equipment sends, in response to expiration of the timer, a registration request to the network side device again.

In this embodiment of this application, user equipment for which a 5G service is not provisioned sends a 5G network registration request to the network side device, and the network side device queries, in response to the registration request, 5G subscription data corresponding to the user equipment. When no available 5G subscription data of the user equipment is obtained through query, the network side device sends a registration reject response to the user equipment, and provisions the 5G service for the user equipment. The network side device adds the reject cause information to the registration reject response, and the reject cause information may trigger the user equipment to start the timer. In addition, when determining that the timer expires, the user equipment initiates a 5G network registration request again. The network side device has provisioned the 5G service for the user equipment before the timer expires. Therefore, the user equipment can quickly register with the 5G network, and user experience is effectively improved.

In an implementation, the reject cause information is a reject cause value #111.

In an implementation, the reject cause information is a reject cause value #127.

In an implementation, the timer is numbered as T3502.

In an implementation, that the user equipment sends the registration request to the network side device includes: the user equipment sends the registration request to the network side device for the first time.

In an implementation, that the user equipment sends the registration request to the network side device includes: when the user equipment has no network service in an NR cell, sending the registration request to the network side device for the first time.

In an implementation, that the user equipment sends the registration request to the network side device includes: when the user equipment leaves an LTE cell and enters a new radio NR cell, sending the registration request to the network side device for the first time.

In an implementation, that the user equipment sends the registration request to the network side device includes: when the user equipment is powered on in an NR cell, sending the registration request to the network side device for the first time.

In an implementation, that the user equipment sends the registration request to the network side device includes: when an airplane mode of the user equipment is disabled in an NR cell, sending the registration request to the network side device for the first time.

In an implementation, the user equipment supports the 5G network.

In an implementation, after the user equipment sends the registration request to the network side device again, the method further includes: the user equipment receives the registration accept response sent by the network side device after the available 5G subscription data corresponding to the user equipment is obtained through query, where the registration accept response is used to notify the user equipment that the registration with the 5G network succeeds.

According to an eighth aspect, user equipment is provided, including a communication interface, a memory, and a processor. The communication interface and the memory are coupled to the processor, the memory is configured to store computer program code, the computer program code includes computer instructions. When the processor reads the computer instructions from the memory, the user equipment is enabled to perform any possible implementation of the second aspect, any possible implementation of the fifth aspect, or any possible implementation of the seventh aspect.

According to a ninth aspect, a chip is provided, including a memory and a processor. The memory is coupled to the processor, the processor includes a modem processor, the memory is configured to store computer program code, and the computer program code includes computer instructions. When the processor reads the computer instructions from the memory, the chip is enabled to perform any possible implementation of the second aspect, any possible implementation of the fifth aspect, or any possible implementation of the seventh aspect.

According to a tenth aspect, a computer-readable storage medium is provided, including instructions, where when the instructions are run on user equipment, the user equipment is enabled to perform any possible implementation of the second aspect, any possible implementation of the fifth aspect, or any possible implementation of the seventh aspect.

According to an eleventh aspect, a computer product is provided. When the computer program product runs on a computer, the computer is enabled to perform any possible implementation of the second aspect, any possible implementation of the fifth aspect, or any possible implementation of the seventh aspect.

BRIEF DESCRIPTION OF DRAWINGS

FIG. 2 to FIG. 8A and FIG. 8B are examples of user interfaces according to an embodiment of this application;

FIG. 10A and FIG. 10B are a schematic flowchart of another network search method for SA 5G service auto-provisioning according to an embodiment of this application;

FIG. 16A, FIG. 16B and FIG. 16C are a schematic flowchart of yet another network search method for SA 5G service auto-provisioning according to an embodiment of this application;

FIG. 19A and FIG. 19B to FIG. 22A and FIG. 22B are examples of user interfaces according to an embodiment of this application;

DESCRIPTION OF EMBODIMENTS

The following clearly describes the technical solutions in embodiments of this application in detail with reference to the accompanying drawings. In descriptions of embodiments of this application, unless otherwise specified, "/" indicates "or". For example, A/B may indicate A or B. The term "and/or" in this specification merely describes an association relationship for describing associated objects, and indicates that three relationships may exist. For example, A and/or B may indicate the Mowing three cases: Only A exists, both A and B exist, and only B exists. In addition, in the descriptions of embodiments of this application, "a plurality of" means two or more.

The following terms "first" and "second" are merely intended for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more.

Figure 1:
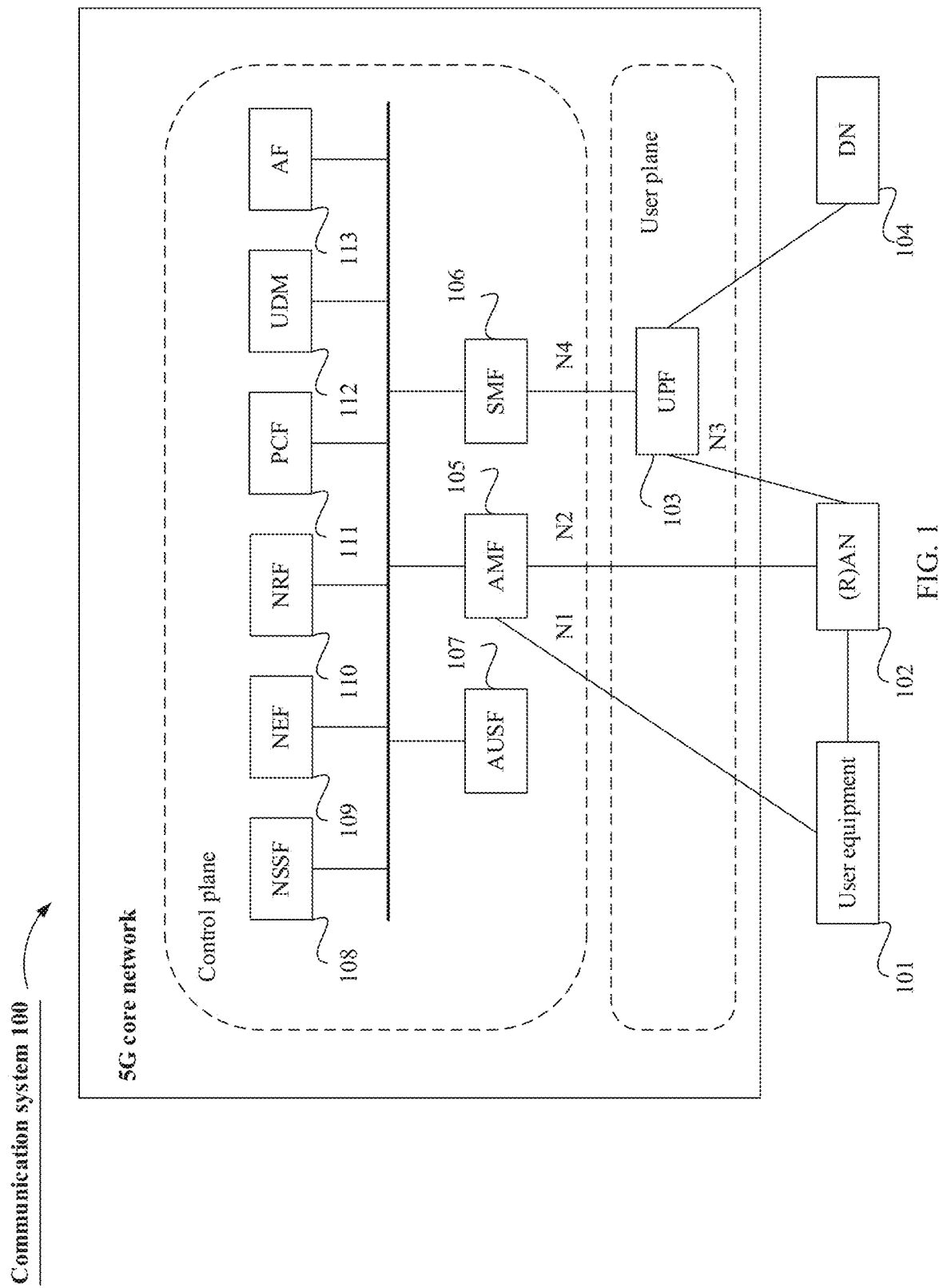
FIG. 1 is a schematic diagram of a system architecture of a communication system according to an embodiment of this application.

FIG. 1 shows a network architecture of a communication system 100 according to an embodiment of this application. As shown in FIG. 1, the communication system 100 may include: user equipment (user equipment, UE) 101, a (Radio) access network (access network, AN) device 102, a user plane function (user plane function, UM entity 103, a data network (data network, DN) device 104 and a control plane functional entity. The control plane functional entity may include: an AMF (access and mobility management function, access and mobility management function) entity 105, an SMF (session management function, session management function) entity 106, an authentication service function (authentication server function, AUSF) entity 107, an NSSF 108, an NET 109, an NF repository function (NF repository function, NRF) entity 110, a policy control function (policy control function, PCF) entity 111, a unified data management (unified data management, UDM) entity 112, and an application function (application function, AF) entity 113.

The UE 101 in this embodiment of this application may be a wireless terminal device with a wireless connection function. The UE 101 may be distributed in the entire communication system 100, and may be stationary or mobile. The UE 101 may communicate with one or more core networks by using the (R)AN 102. For example, the UE 101 may be a mobile terminal device such as a mobile phone, a computer, a tablet computer, a personal communication service (personal communication service, PCS) phone, or a personal digital assistant (personal digital assistant, PDA); or the UE 101 may be a mobile station (mobile station), a mobile unit (mobile unit), an M2M terminal, a wireless unit, a remote unit, a terminal agent, a mobile client, or the like; or the UE 101 may be an internet of things terminal device or an internet of vehicles terminal device. This is not limited in this embodiment of this application.

The (R)AN 102 may be a 5G base station, an NR base station, or the like. The UE 101 may access the communication system 100 by using the (R)AN 102. Alternatively, the (R)AN 102 may be a network including a plurality of (R)AN 102 nodes, and may implement functions such as a wireless physical layer function, a resource scheduling function, and a radio resource management function. The (R)AN 102 is connected to the UPF 103 through a user plane interface N3, and may be configured to transmit data of the UE 101. The AN establishes a control plane signaling connection to the AMF 105 through a control plane interface N2, and may be configured to implement functions such as radio access bearer control.

The UPF 103 may be used for functions such as packet routing and forwarding, quality of service (Quality of Service, QoS) processing of a user plane, uplink traffic verification, transport-level packet marking in an uplink and a downlink, downlink data packet buffering, and downlink data notification triggering. The UPF 103 is connected to the SMF 106 through an interface N4, and the UPF 103 is connected to the DN 104 through an interface N6. The UPF 103 is a session point for interconnection between an external protocol data unit (protocol data unit, PDU) and a data network.

The AMF 105 may be used for functions such as authentication on the UE 101, SMF 106 selection, connection management, reachability management, and mobility management. The AMF 105 may be further configured to provide transmission for an SM message between the UE 101 and the SMF 106. The AMF 105 may serve as an anchor for a signaling connection between N1 and N2, to maintain and manage status information of the UE 101.

The SMF 106 may be configured to be responsible for all control plane functions of session management of the terminal device, including UPF 103 selection, internet protocol (internet protocol, IP) address allocation, QoS attribute management of a session, and the like. The SMF 106 is connected to the UPF 103 through the interface N4. The SMF 106 may control insertion and removal of an uplink classifier, and may further control insertion and removal of the UPF 103 that supports a branching point.

The AUSF 107 is configured to interact with the UDM 112 to obtain user information, and perform functions related to authentication and authorization, for example, generating an intermediate key.

The NSSF 108 is configured to: select a network slice for the UE 101, and send signaling to a corresponding network slice based on single network slice selection assistance information (single network slice selection assistance information, S-NSSAI).

The NEF 109 is configured to: expose various services and capabilities (including content exposure or exposure to a third party, and the like) provided by 3GPP network functions, perform verification and authorization, and assist in limiting an application function.

The NRF 110 is configured to: receive an NF discovery request from an NF instance, and provide the discovered NF instance information for the NF instance, to maintain the NF instance and an NF configuration file.

The PCF 111 is configured to: formulate a policy, provide a policy control service, obtain policy-related subscription data, and the like.

The UDM 112 is configured to: store user subscription data corresponding to the UE 101, perform user identification processing, support functions such as service/session continuity, access authorization, registration and mobility management, subscription management, and user management, and the like.

The AF 113 is configured to: interact with a 3GPP core network to provide a service. The AF 113 may access a network exposure function, and control policy framework interaction.

It should be noted that physically, each entity shown in FIG. 1 may be a single device, or two or more entities may be integrated into a same physical device. This is not limited in this embodiment of this application.

In this embodiment of this application, the communication system 100 may be a 5G communication system, an NR system, a future evolved communication system, or the like.

In this embodiment of this application, the core network entity may alternatively be referred to as a core network device or a network device.

As shown in FIG. 1, deployment of a 5G network mainly needs two parts: a radio access network (radio access network. RAN) and a core network (core network). The radio access network mainly consists of base stations, and provides a radio access function for a user. The core network mainly provides an internet access service and a corresponding management function for the user. Investment in deploying a new network is huge. Therefore, 3GPP (3rd generation partnership project, a standardization organization) defines the following two 5G network deployment modes: SA and NSA. In the SA mode, a new existing network is established, including a new base station, a new backhaul link, and a new core network. In the NSA mode, existing 4G infrastructure is used to deploy a 5G network.

In the NSA mode, a control plane is independently deployed on the 4G network, and a user plane is co-deployed on the 5G network and the 4G network, or a user plane is independently deployed on the 5G network. In the NSA mode, an advantage of a high bandwidth of the 5G network may be introduced, popularization of the 5G network is accelerated, and device replacement costs are reduced in a short term, in the SA mode, the control plane and the user plane are independently deployed on the 5G network. An independent networking based on a 5G new radio technology may work without depending on the 4G network. In the SA mode, a new network element and a new interface are introduced, and at the same time, new technologies such as network virtualization and software-defined networking are to be used on a large scale. In an initial phase, an operator will focus on NSA networking. However, in the future, SA networking will gradually replace NSA networking and become a mainstream in the market.

For ease of description, 5G in a SA deployment mode may be referred to as SA 5G for short in this specification, or a process of provisioning (subscribing to) a SA 5G service may be referred to as SA 5G service provisioning for short.

Generally, when a mobile phone is in a state in which no network service is available, the mobile phone searches for a network and initiates initial registration. For example, the mobile phone is powered on, an airplane mode of the mobile phone is disabled, or the mobile phone is disconnected from a network. In a default setting of the mobile phone, the mobile phone preferably searches for a highest-standard network. For example, when the mobile phone supports 3G, 4G, and 5G networks, the mobile phone first searches for a 5G network. A user may also select, in settings of the mobile phone, a network mode searched first.

For ease of understanding, the following describes some example graphical user interfaces implemented on user equipment 200 provided in an embodiment of this application by using examples in which an airplane mode is disabled and the user equipment 200 is restarted and powered on. The user equipment 200 may be the UE 101 in the communication system 200 shown in FIG. 1.

Figure 2:
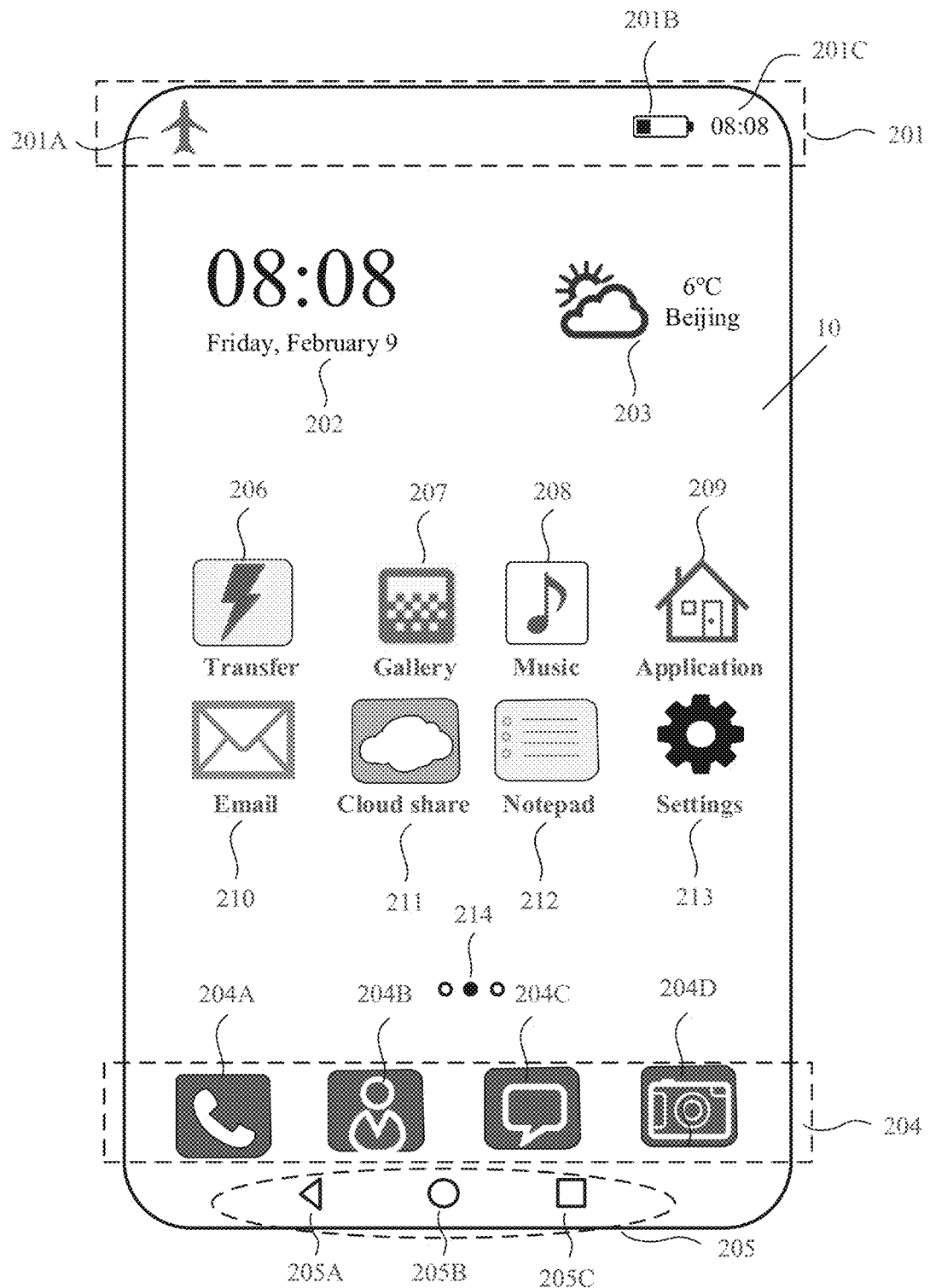

FIG. 2 shows an example of a user interface 10 that is on the user equipment 200 and that is used to display applications installed on the user equipment 200.

The user interface 10 may include: a status bar 201, a calendar indicator 202, a weather indicator 203, a bottom tray 204 including commonly used application icons, a navigation bar 205, and another application icon.

The status bar 201 may include: an airplane mode indicator 201A, a battery status indicator 201B, and a time indicator 201C.

It can be learned from the status bar shown in FIG. 2 that the user equipment 200 is currently in an airplane mode.

The calendar indicator 202 may be used to indicate current time, such as a date, a day of a week, hour-minute information, and the like.

The weather indicator 203 may be used to indicate a weather type, for example, cloudy to clear or light rain, and may be further used to indicate information such as a temperature.

The bottom tray 204 including commonly used application icons may display: a "Phone" icon 204A, a "Contacts" icon 204B, a "Messages" icon 204C, and a "Camera" icon 204D.

The navigation bar 205 may include system navigation buttons such as a "Back" button 205A, a "Home screen" button 205B, and a "Multitask" button 205C. When it is detected that a user taps the "Back" button 205A, the user equipment 200 may display a previous page of a current page. When it is detected that the user taps the "Home screen" button 205B, the user equipment 200 may display a home screen. When it is detected that the user taps the "Multitask" button 205C, the user equipment 200 may display a task recently opened by the user. Alternatively, the navigation buttons may be named in another way. This is not limited in this application, Each navigation button in the navigation bar 205 is not limited to a virtual button, and may alternatively be implemented as a physical button.

Other application icons may be, for example, a "Transfer" icon 206, a "Gallery" icon 207, a "Music" icon 208, an "Application" icon 209, an "Email" icon 210, a "Cloud share" icon 211, a "Notepad" icon 212, and a "Settings" icon 213. The user interface 10 may further include a page indicator 214. The other application icons may be distributed on a plurality of pages, and the page indicator 216 may be used to indicate a specific page on Which an application is currently browsed by the user. The user may slide leftward or rightward in an area including the other application icons, to browse an application icon on another page.

In some embodiments, the user interface 10 shown in FIG. 2 as an example may be a home screen (Home screen). It may be understood that FIG. 2 merely shows an example of a user interface on the user equipment 200, and should not constitute a limitation on this embodiment of this application.

Figure 3A:
Figure 3B:
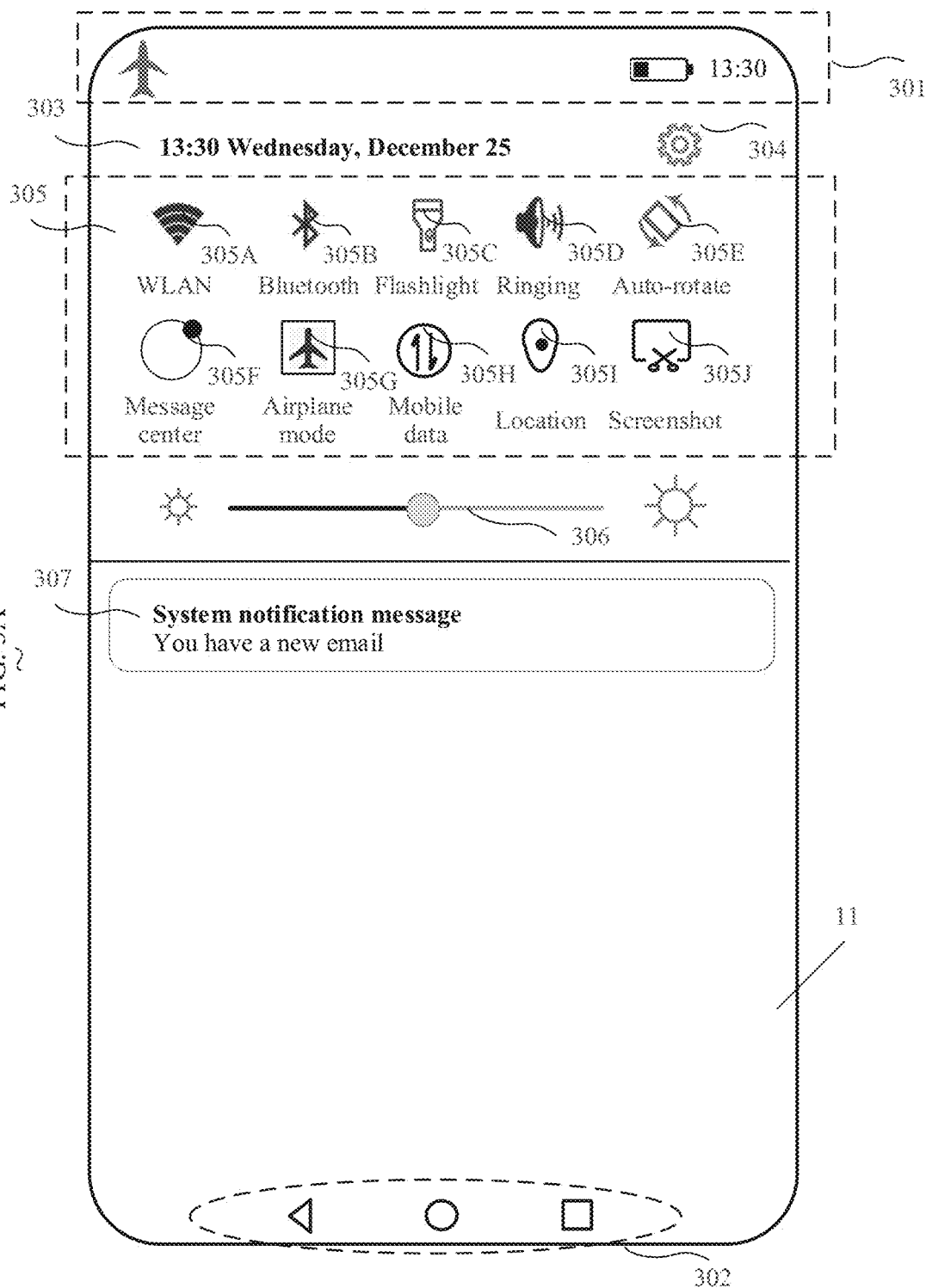

For example, as shown in FIG. 3A and FIG. 3B, the user slides a finger downward from a top of a display and then releases the finger. The user equipment 200 detects the user operation, and in response to the user operation, the user equipment 200 displays a user interface 11 of a drop-down bar.

The user interface 11 may include: a status bar 301, a navigation bar 302, time 303, a settings icon 304, a quick settings panel 305, a brightness control 306, and one or more system notification messages 307.

The settings icon 304 may receive a user operation (for example, a touch operation). In response to the detected user operation, the user equipment 200 may display a setting interface of a drop-down bar.

The quick settings panel 305 may display: a "Wi-Fi" icon 305A, a "Bluetooth" icon 305B, a "Flashlight" icon 305C, a "Ringing" icon 305D, an "Auto-rotate" icon 305E, a "Message center" icon 305F, an "Airplane mode" icon 305G, and a "Mobile data" icon 305H, a "Location" icon 305I, and a "Screenshot" icon 305J. The quick settings panel 305 may further display one or more other quick settings icons. This is not specifically limited herein.

The "Airplane mode" icon 305G may receive a user operation (for example, a touch operation). In response to the detected user operation, the user equipment 200 may disable the airplane mode.

The brightness control 306 may receive a user operation (for example, a touch operation). In response to the detected user operation, the user equipment 200 may adjust brightness of the display.

Figure 4A:
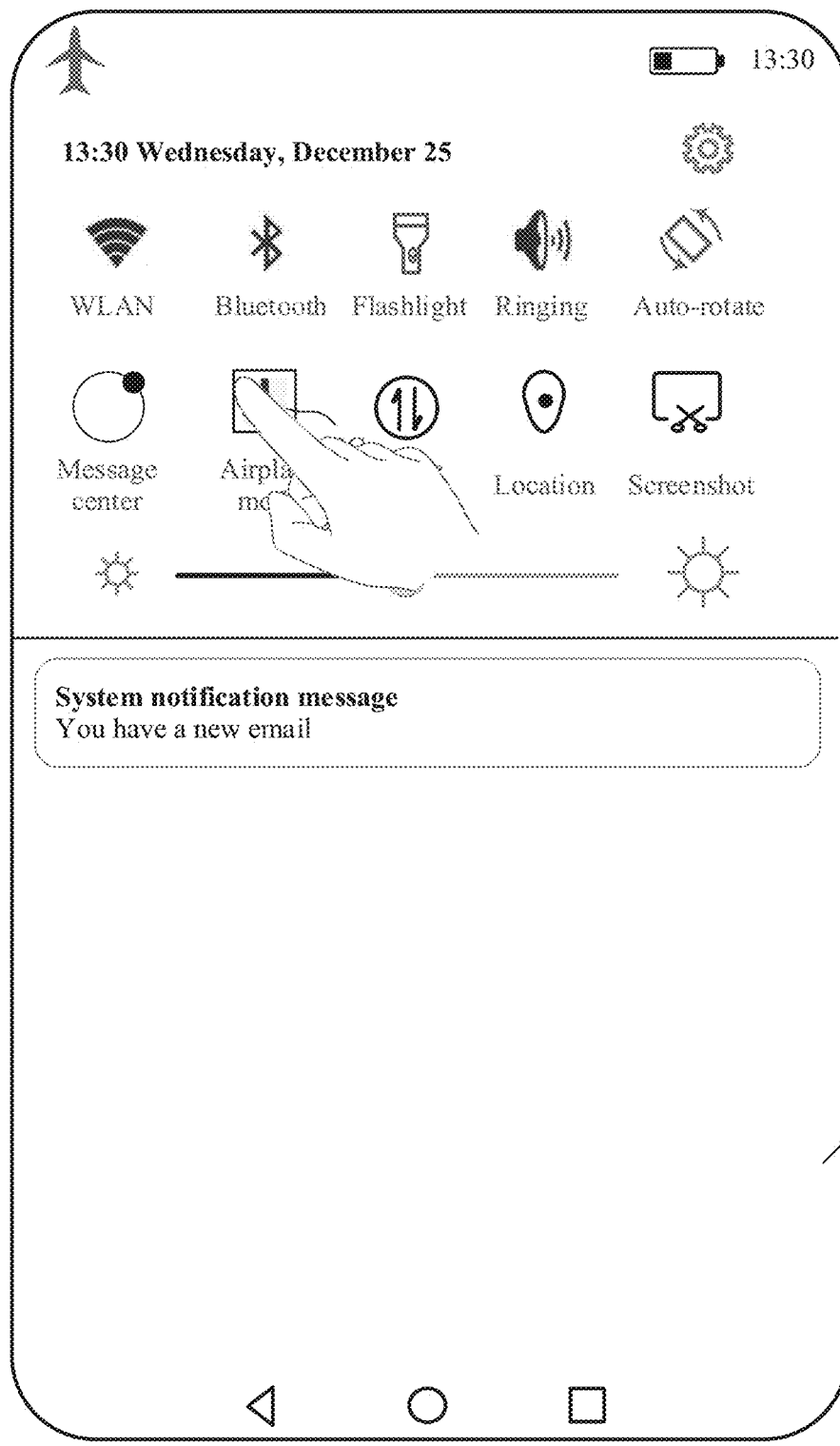
Figure 4B:
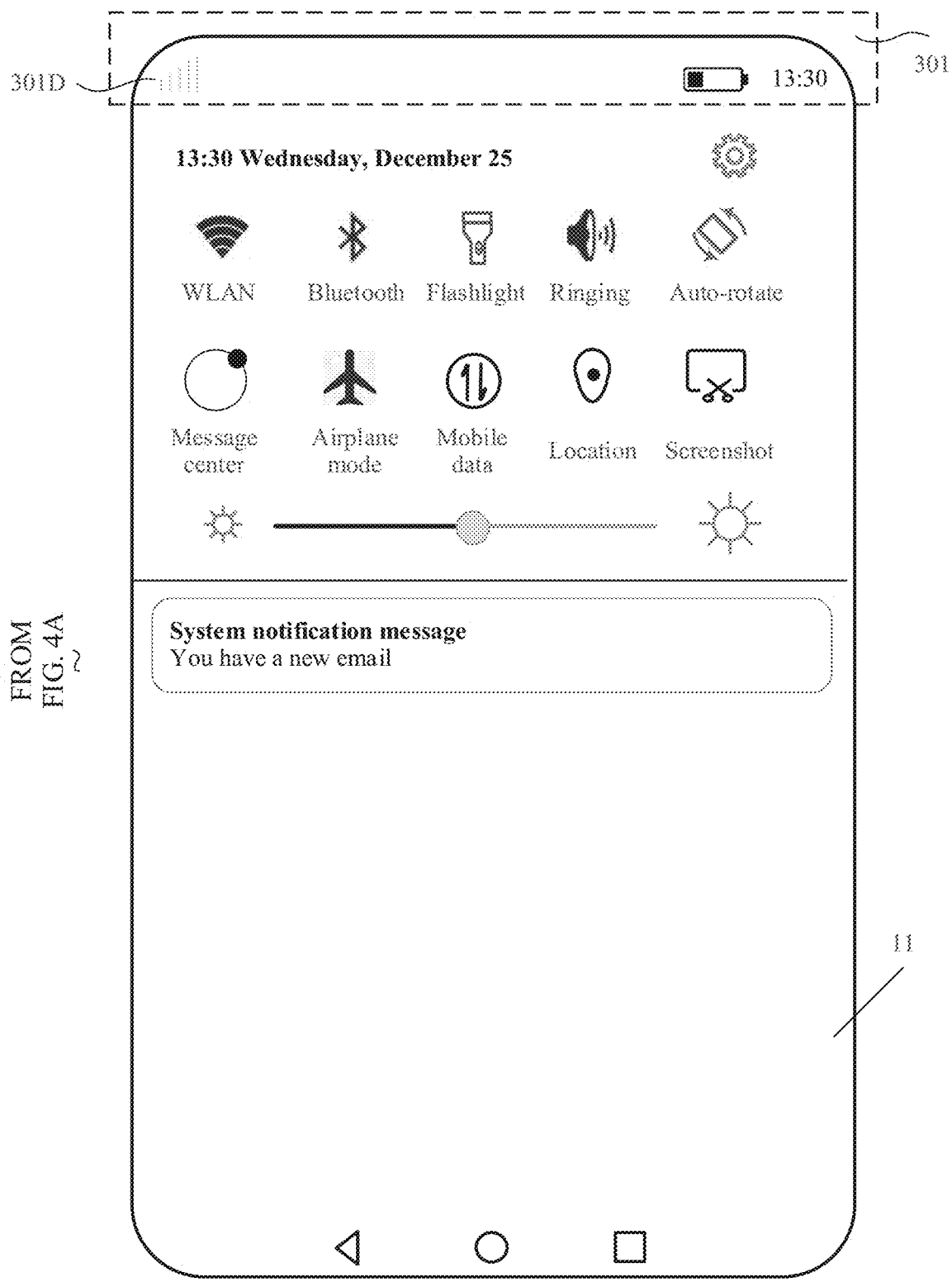

For example, as shown in FIG. 4A and FIG. 4B, the user taps the "Airplane mode" icon 305G with a finger, and the user equipment 200 detects the user operation. In response to the user operation, the user equipment 200 displays a no-signal indicator 301D of a mobile communication signal (which may alternatively be referred to as a cellular signal) on the status bar. It may be learned from the no-signal indicator 301D in FIG. 4B that the user equipment 200 has not accessed a network, that is, has not successfully registered with a network.

When the user equipment 200 supports both 4G and 5G networks, and a SA 5G service is not provisioned for the user equipment 200, the user equipment 200 shown in FIG. 4A and FIG. 4B may register with the 4G network after maintaining a mobile signal-free state for several seconds.

Figure 5A:
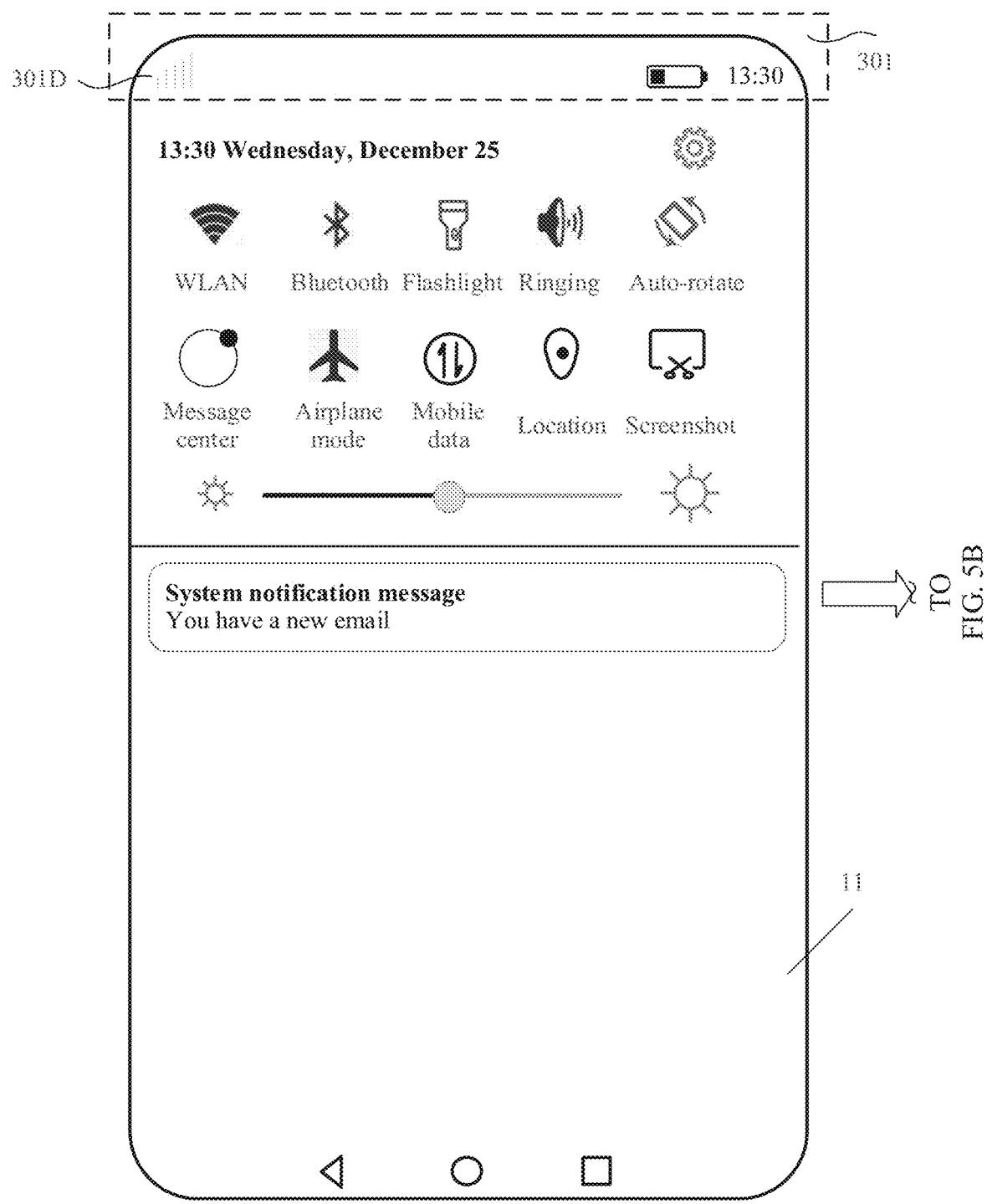

For example, as shown in FIG. 5A and FIG. B, after maintaining a mobile signal-free state for several seconds, the user equipment 200 displays, in the status bar, one or more signal strength indicators 301E and an operator name (for example, "China Mobile") 301F that are of a 4G mobile communication signal, and may further display one or more signal strength indicators 301E of a wireless fidelity (wireless fidelity, Wi-Fi) signal.

In addition to the manner of disabling the airplane mode shown in FIG. 4A and FIG. 4B, in this embodiment of this application, the airplane mode may be disabled in another manner. This is not specifically limited herein.

Figure 6:
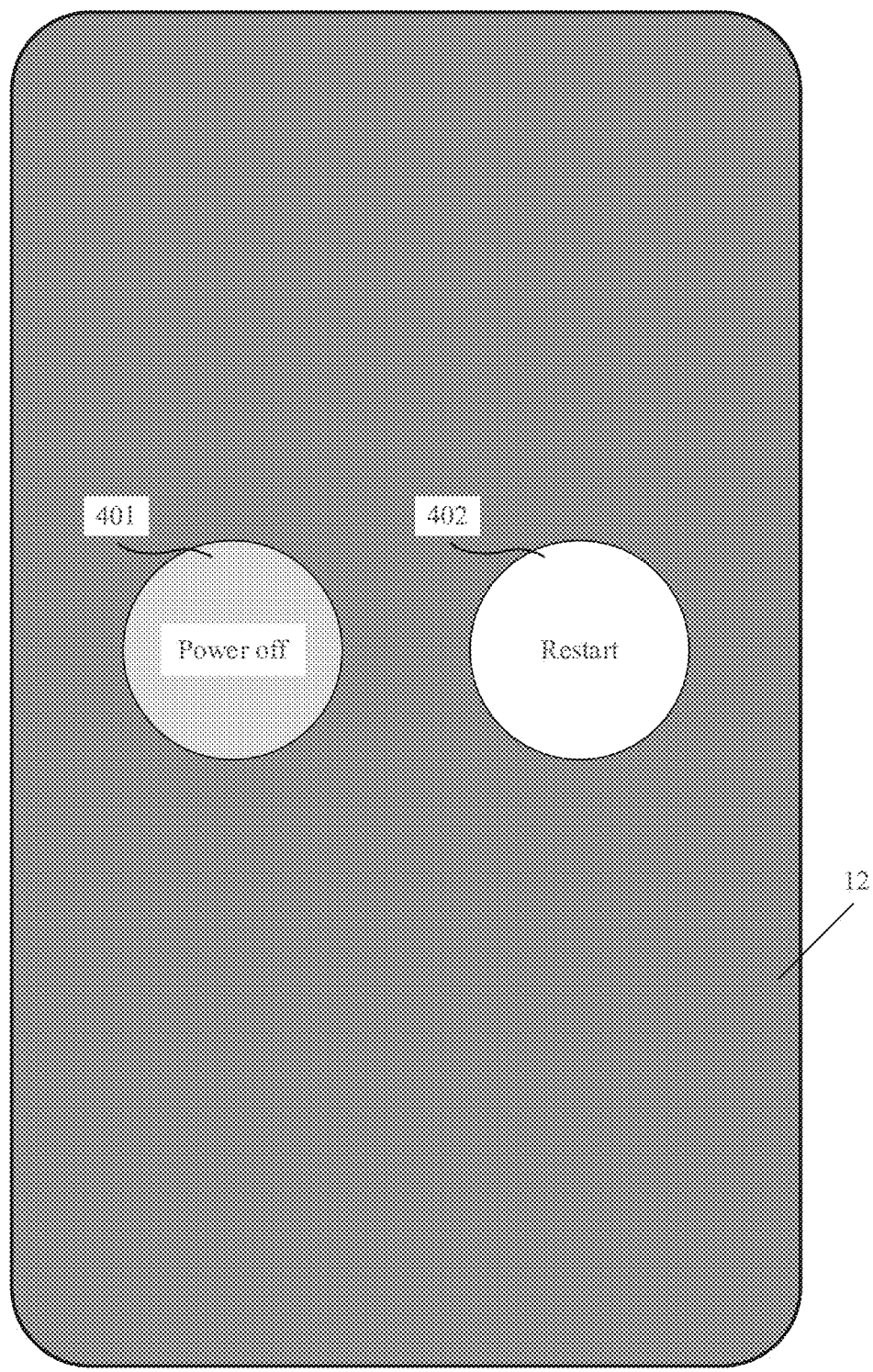

FIG. 6 shows an example of a user interface 12 that is on the user equipment 200 and that is used to show that the user equipment 200 is restarted and powered on.

The user interface 12 may include: a power-off control 401 and a restart control 402.

The power-off control 401 may receive a user operation (for example, a touch operation). In response to the detected user operation, the user equipment 200 may be powered off.

The restart control 402 may receive a user operation (for example, a touch operation). In response to the detected user operation, the user equipment 200 may be powered off and then powered on again.

Figure 7A:
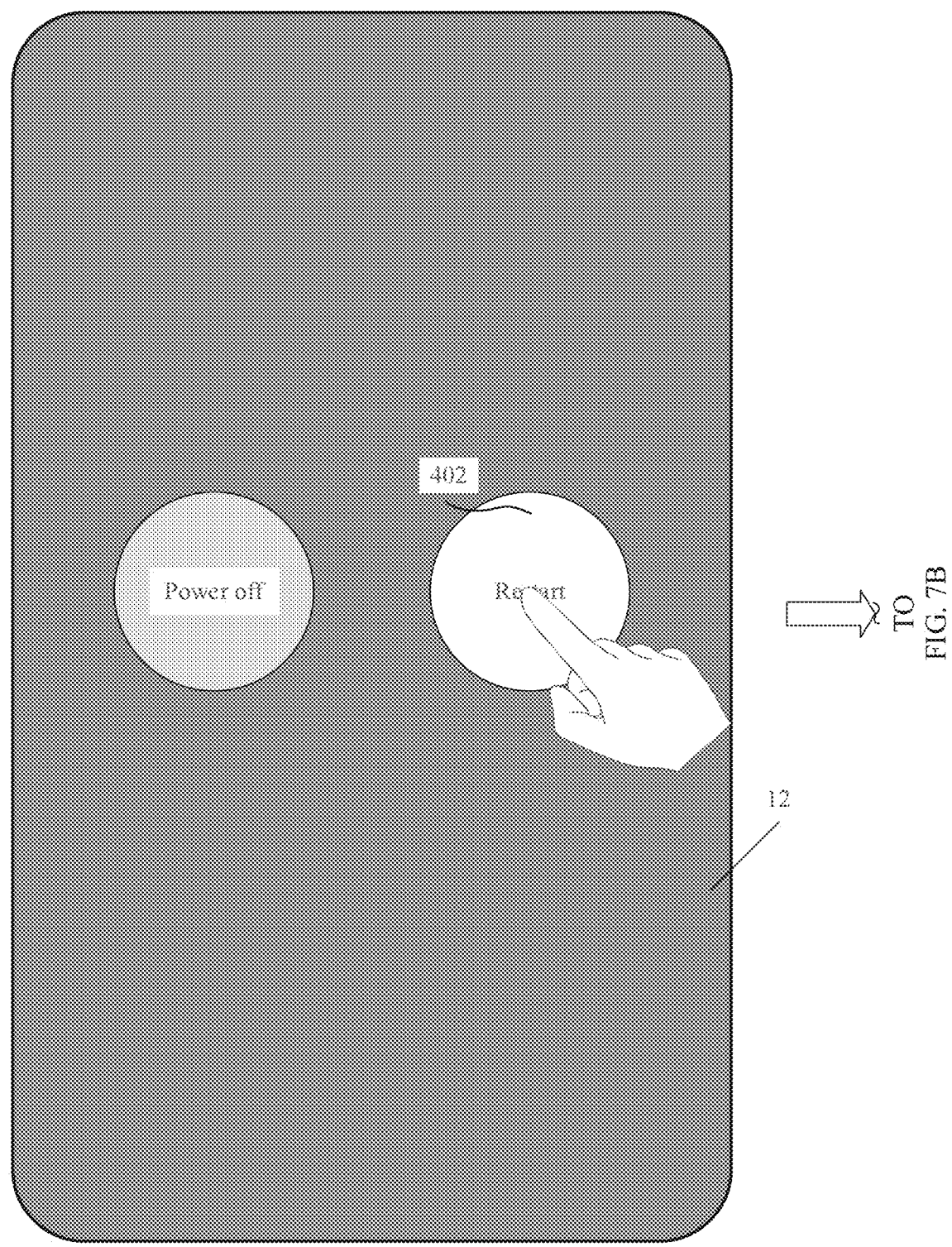
Figure 7B:

For example, as shown in FIG. 7A and FIG. 7B, the user taps the restart control 402 with a finger, and the user equipment 200 detects the user operation. In response to the user operation, the user equipment 200 is powered off and then powered on again. After the user equipment 200 is powered on, the user equipment 200 displays a user interface 10.

Different from the user interface 10 shown in FIG. 4A and FIG. 4B, a status bar 201 of the user interface 10 shown in FIG. 6 may include: a no-signal indicator 201D, a battery status indicator 201B, and a time indicator 201C.

It may be understood that, when the user equipment 200 is just powered on, the user equipment 200 does not access a network. Therefore, the status bar 201 displays the no-signal indicator 201D. When the user equipment 200 supports both 4G and 5G networks, and a SA 5G service is not provisioned for the user equipment 200, the user equipment 200 shown in FIG. 6 may register with the 4G network after maintaining a mobile signal-free state for several seconds.

Figure 8A:
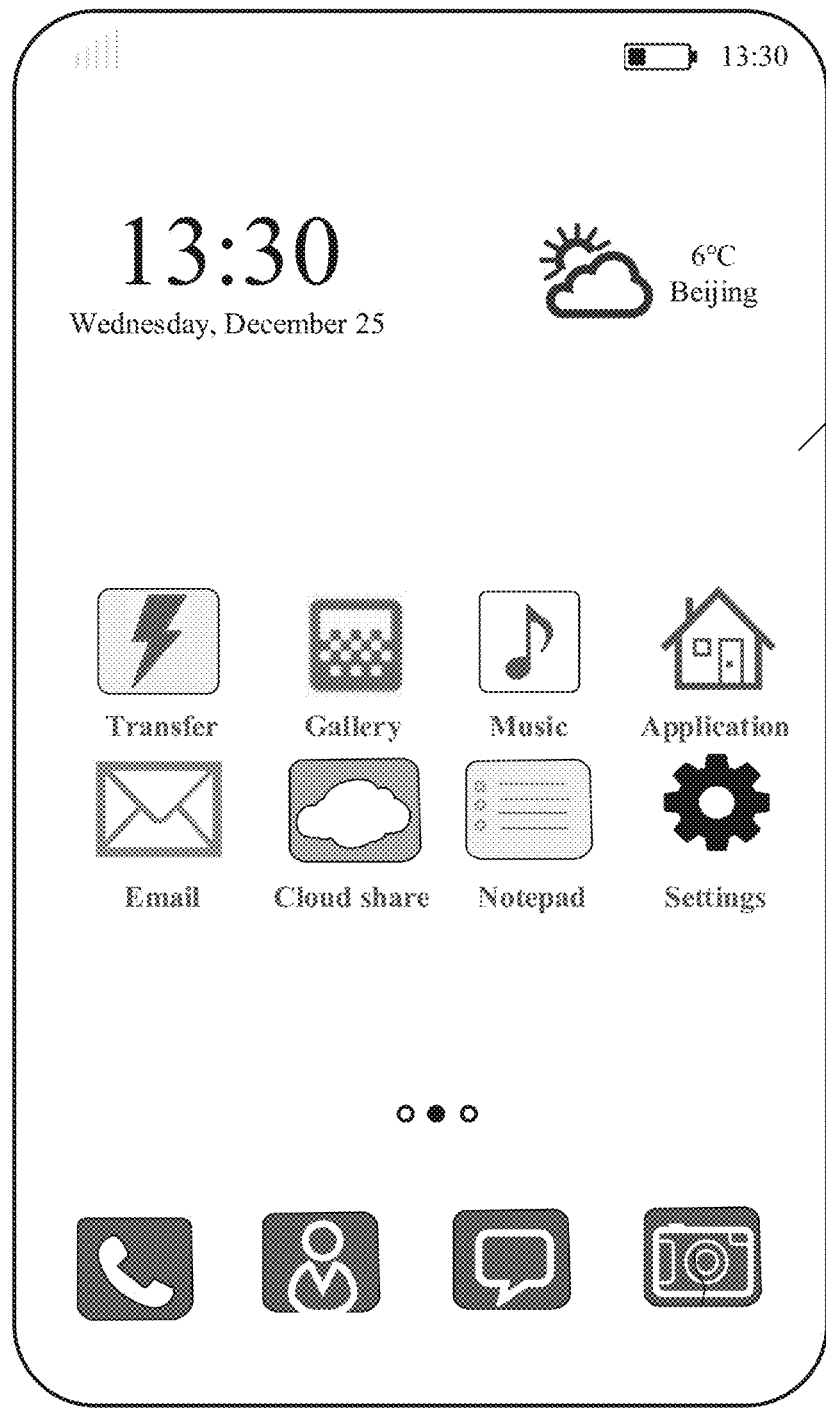
Figure 8B:
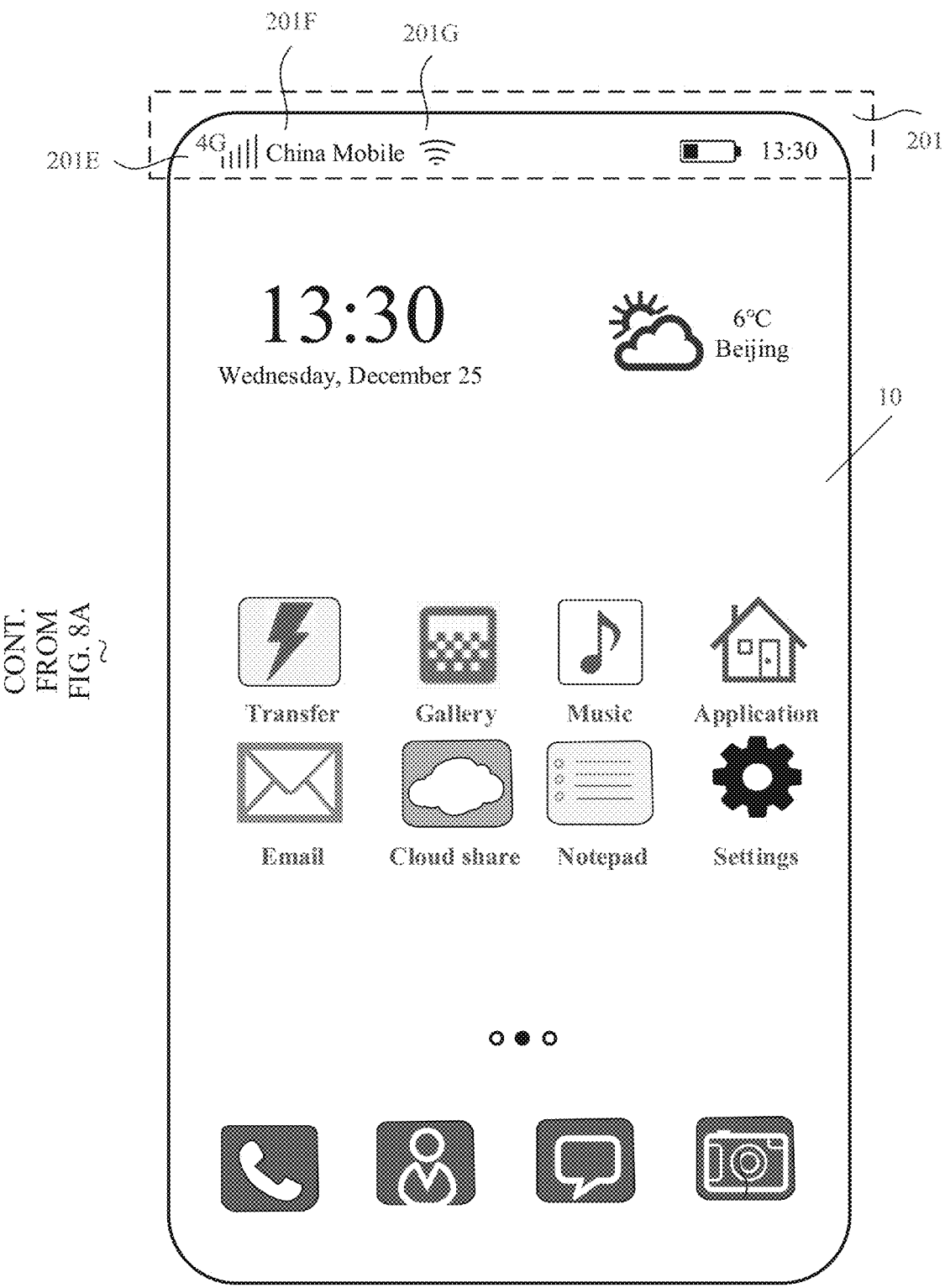

For example, as shown in FIG. 8A and FIG. 8B, after maintaining a mobile signal-free state for several seconds, the user equipment 200 displays, in the status bar 201, one or more signal strength indicators 201E and an operator name 201F that are of a 4G mobile communication signal, and may further display one or more signal strength indicators 201G of a Wi-Fi signal.

It may be understood that when the user equipment 200 supports the 5G network, and the SA 5G service is provisioned before the airplane mode is disabled (or the user equipment 200 is restarted and powered on), the user equipment 200 may register with the SA 5G network after the airplane mode is disabled (or the user equipment 200 is restarted and powered on).

When a user intends to register with the SA 5G network, SA 5G service provisioning needs to be completed in advance via an operator. For a SA 5G network registration request from a user for whom the SA 5G service is not provisioned, different operators may process the request in different ways. Currently, existing processing manners may include the following manners.

(1) After a network device receives a SA 5G registration request sent by a mobile phone for which a SA 5G service is not provisioned, the network device sends a registration reject response to the mobile phone, and adds a reject cause value #27 to the message. After receiving the reject cause value #27, the mobile phone cannot initiate a SA 5G network registration request within 12 to 24 hours.

The value #27 indicates that an N1 mode (N1 mode) is not supported, and the value may be used to reject a network registration request from an unprovisioned user. According to a protocol definition, after receiving the rejection cause value #27, the mobile phone disables the SA 5G service for 12 to 24 hours. In other words, the mobile phone cannot initiate a SA 5G network registration request within 12 to 24 hours.

(2) After a network device receives a SA 5G registration request sent by a mobile phone for which a SA 5G service is not provisioned, the network device sends a registration reject response to the mobile phone, and adds a reject cause value #111 to the message. After receiving the reject cause value #111, the mobile phone cannot initiate a SA 5G network registration request within a preset time period.

The value #111 indicates a protocol error, and the value may be used to reject a registration request for the first time before automatic provisioning. According to a protocol definition, after receiving the reject cause value #111, the mobile phone cannot register with the SA 5G network within the preset period.

It should be noted that, currently, after rejecting a SA 5G registration request from a user for whom a SA 5G service is not provisioned, some operators may automatically provision the SA 5G service for the user.

(3) After a network device receives a SA 5G registration request sent by a mobile phone for which a SA 5G service is not provisioned, the network device sends a registration reject response to the mobile phone, and adds a reject cause value #111 to the message. According to a protocol definition, after receiving the reject cause value #111, the mobile phone triggers a timer T3052. Before the timer T3502 expires, the mobile phone cannot re-initiate a SA 5G network registration request.

(4) After a network device receives a SA 5G registration request sent by a mobile phone for which a SA 5G service is not provisioned, the network device sends a registration reject response to the mobile phone, and automatically completes SA 5G service provisioning for the user. After the auto-provisioning is complete, a 4G network side sends a detach request (for example, Detach Request) to the mobile phone, to trigger the mobile phone to re-initiate a 4G network registration request. Therefore, after the auto-provisioning is complete, the mobile phone cannot directly initiate a registration request on the 5G network.

In conclusion, after the network device rejects the SA 5G registration request from a mobile phone that does not register with the SA 5G network, the mobile phone cannot quickly register with the SA 5G network even if the network device automatically completes SA 5G service provisioning for the mobile phone. After the network side completes auto-provisioning for the mobile phone, the mobile phone may need to be powered on again, an airplane mode may need to be disabled, or the network may need to be disconnected, to trigger the mobile phone to search for and register with the SA 5G network again.

To resolve the foregoing problem, an embodiment of this plication provides a network search method for SA 5G service auto-provisioning. In this embodiment of this application, for user equipment 200 for which a SA 5G service is not provisioned, after a network side rejects a SA 5G registration request from the user equipment 200, an operator completes SA 5G service auto-provisioning for the user equipment 200. After the auto-provisioning, the user equipment 200 determines, based on specific trigger information, that the SA 5G service provisioning for the user equipment is completed. The user equipment 200 initiates SA 5G network search and registration again, to quickly register with the SA 5G network. According to the method provided in this embodiment of this application, a user for whom a SA 5G service is not provisioned can quickly register with the SA 5G network, so that user experience is improved.

Figure 9:
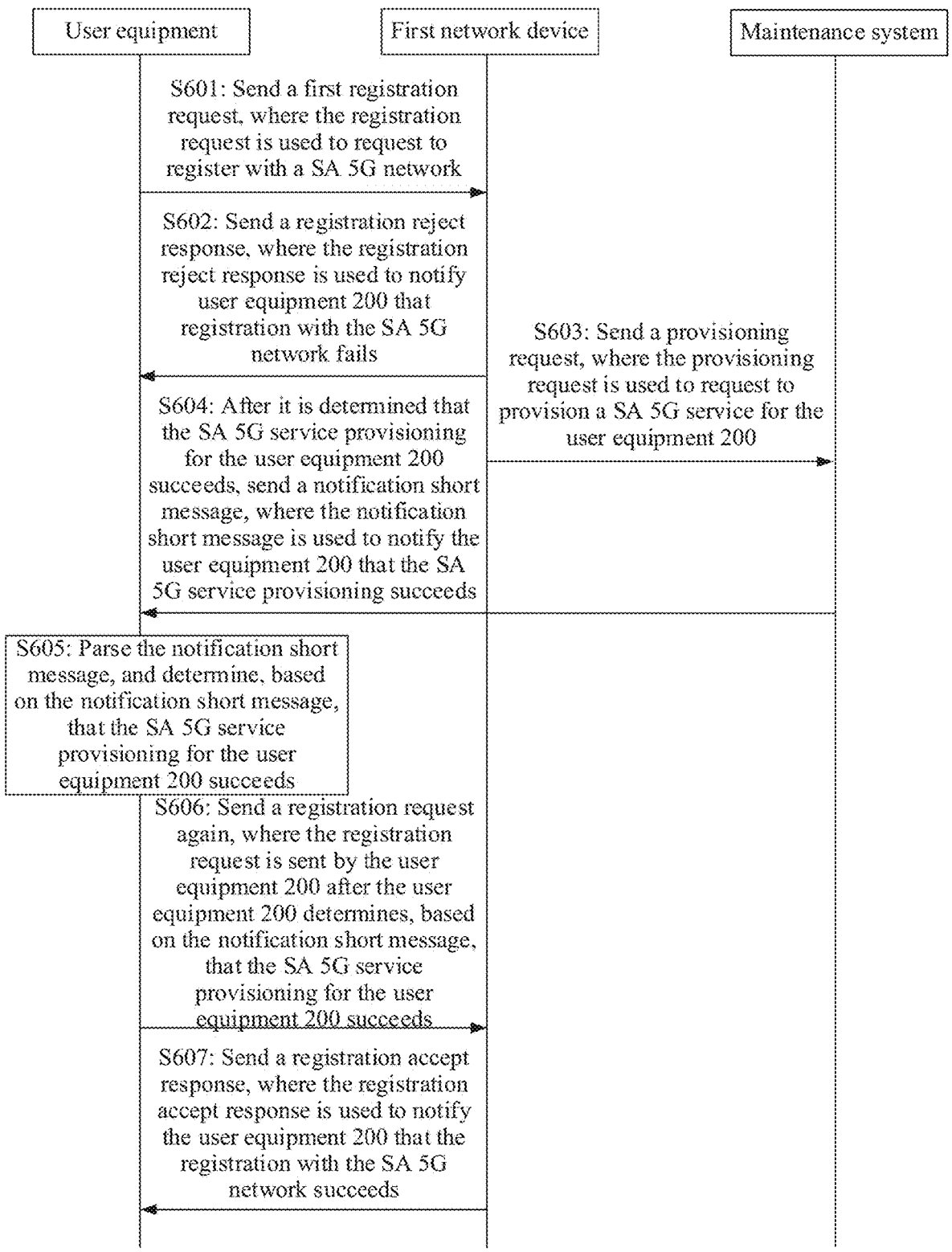
FIG. 9 is a schematic flowchart of a network search method for SA 5G service auto-provisioning according to an embodiment of this application.

FIG. 9 is a schematic flowchart of a network search method for SA 5G service auto-provisioning according to an embodiment of this application. As shown in FIG. 9, the network search method for SA 5G service auto-provisioning provided in this embodiment of this application includes but is not limited to step S601 to step S607. The following further describes a possible implementation of the method embodiment.

S601: User equipment 200 sends a registration request to a first network device, and the first network device receives the registration request sent by the user equipment 200, where the registration request is used to request to register with a SA 5G network.

In this embodiment of this application, a SA 5G service is not provisioned for the user equipment 200, and the user equipment 200 supports 4G network and 5G networks. In addition to the 4G and SA 5G networks, the user equipment 200 may further support 3G and 2G networks. When no network service is available, the user equipment 200 preferentially initiates a 5G network search. When the user equipment 200 is in coverage of a 5G cell, the user equipment 200 may find the 5G network, and initiate a SA 5G registration request to a 5G network side.

It may be understood that, in a default setting of the mobile phone, the mobile phone preferably searches for a highest-standard network. For example, when the mobile phone supports 3G, 4G, and 5G networks, the mobile phone first searches for a 5G network. A user may also select, in settings of the mobile phone, a network mode searched first.

In some embodiments of this application, the foregoing registration request may be a SA 5G network registration request sent by the user equipment 200 to the first network device for the first time.

In some implementations of this application, the foregoing registration request may be a SA 5G network registration request sent, when no network service is available in an NR cell, by the user equipment 200 to the first network device for the first time.

For example, when leaving an LTE cell and entering the NR cell, the user equipment 200 initiates the SA 5G network registration request for the first time; or when an airplane mode is disabled in the NR cell, the user equipment 200 initiates the SA 5G network registration request for the first time; or when user equipment 200 is powered on in the NR cell, the user equipment 200 initiates the SA 5G network registration request for the first time.

Before initiating the current registration request, the user equipment 200 may have initiated a SA 5G registration request, or a SA 5G service may have been provisioned for the user equipment 200. However, when the user equipment 200 sends this registration request, a SA 5G service is not provisioned for the user equipment 200. It may be understood that before the user equipment 200 initiates the current registration request, a SA 5G service may be disabled after being provisioned for the user equipment 200. This is not specifically limited in this embodiment of this application.

In some embodiments of this application, the first network device may include an AMF.

In some embodiments of this application, the foregoing registration request is "registration request".

In some embodiments of this application, the registration request may include a registration type and an identity of the user equipment 200.

It should be noted that the registration type is initial registration. For example, the registration type is "initial registration". The identity of the user equipment 200 may be a subscription concealed identifier (subscription concealed identifier, SUCI) or a 5G globally unique temporary UE identifier (5G globally unique temporary ue identity, 5G-GUTI). An objective of using the 5G-GUTI in a 5G system is to reduce use of a permanent identifier of the UE displayed in communication, to improve security. The SUCI is a ciphertext obtained through encrypting a subscription permanent identifier (subscription permanent identifier, SUPI) by using a public key. The SUPI of the user equipment is a unique permanent identity of a user in the 5G network. When the user equipment 200 performs initial registration by using the 5G-GUTI of the user equipment 200, the user equipment 200 indicates, in a network registration request, related information of a globally unique AMF identifier (globally unique amf ID, GUAMI).

In some implementations of this application, that the user equipment 200 sends the registration request to the first network device includes: the user equipment 200 sends the registration request to an (R)AN, and the (R)AN sends the registration request to the first network device.

In some embodiments of this application, the foregoing registration request may further include an N2 parameter, and the N2 parameter may include a selected public land mobile network (Public Land Mobile Network, PLMN) identity document (Identity document, ID), location information, and a cell identity.

It should be noted that if the registration request includes the 5G-GUTI, the (R)AN may directly determine an AMF based on the GUAMI in the registration request. If the (R)AN cannot select an appropriate AMF, the (R)AN forwards the registration request to an AMF preconfigured by the (R)AN, to perform AMF selection.

S602: The first network device sends a registration reject response to the user equipment 200, and the user equipment 200 receives the registration reject response sent by the first network device, where the registration reject response is used to notify the user equipment 200 that the registration with the SA 5G network fails.

In some embodiments of this application, the foregoing registration request is "registration reject".

In some embodiments of this application, the registration reject response includes reject cause information.

In some embodiments of this application, the reject cause information is a reject cause value. For example, the reject cause value is #111 or #27.

In some embodiments of this application, that the first network device sends the registration reject response to the user equipment 200 includes: the first network device sends the registration reject response to the (R)AN, and the (R)AN sends the registration reject response to the user equipment 200.

In some embodiments of this application, the first network device includes an AMF and a UDM. For example, as shown in FIG. 10A, after step S601 and before step S602, the method may further include step S602a and step S602b.

S602a: The AMF sends a query request to the UDM, and the UDM receives the query request sent by the AMF, Where the query request is used to request to query SA 5G subscription data of the user equipment 200.

In some embodiments of this application, the query request includes the identity of the user equipment 200. For example, the query request includes an international mobile subscriber identity (International Mobile SubscriberIdentification Number, IMSI) or the SUCI. The IMSI is an identity used to distinguish different users in a cellular network, and the identity is unique in all cellular networks.

In some embodiments of this application, the UDM stores SA 5G subscription data of one or more pieces of user equipment. A record of SA 5G subscription data of each user equipment includes an identity of the user equipment. The UDM may query, based on an identity of user equipment, whether the UDM stores SA 5G subscription data of the user equipment.

In some embodiments of this application, after step S601, the AMF invokes an AUSF to attempt to authenticate the identity of the user equipment 200. When the authentication succeeds, the AMF performs step S602a.

In some embodiments of this application, the foregoing query request may be "Nudm_UECM_Registration".

S602b: The UDM sends a query failure response to the AMF, and the AMF receives the query failure response sent by the UDM, where the query failure response indicates that the user equipment 200 has no available SA 5G subscription data.

In some embodiments of this application, after the user equipment 200 fails to register with the SA 5G network, the user equipment 200 searches for the 4G network and initiates a 4G network registration request. Therefore, for example, as shown in FIG. 10A, after step S602, the method may further include step S602c and step S602d.

S602c: The user equipment 200 sends the 4G registration request to a mobility management entity (mobility management entity, MME), and the MME receives the 4G registration request sent by the user equipment 200, where the 4G registration request is used to request to register with the 4G network.

Specifically, the user equipment 200 sends the 4G registration request to the MME through a 4G access network. The 4G access network may be an eNB.

The MME is a key control node in the 4G network, and is mainly responsible for functions such as mobility management, bearer management, user authentication, and selection of a serving gateway and a public data network (public data network, PDN) gateway.

S602d: The MME sends a 4G registration accept response to the user equipment 200, and the user equipment 200 receives the 4G registration accept response sent by the MME, where the 4G registration accept response is used to notify the user equipment 200 that the registration with the 4G network succeeds.

In some embodiments of this application, the MME sends the 4G registration request to the user equipment 200 through the 4G access network, S603: The first network device sends a provisioning request to a maintenance system of an operator, and the maintenance system of the operator receives the provisioning request sent by the first network device, where the provisioning request is used to request to provision the SA 5G service for the user equipment 200.

In some embodiments of this application, the provisioning request includes the identity of the user equipment 200. For example, the provisioning request includes the IMSI.

In some embodiments of this application, after receiving the provisioning request sent by the first network device, the maintenance system of the operator sends a reception acknowledgment message to the first network device, where the reception acknowledgment message is used to notify the first network device that the maintenance system has received the provisioning request.

In some embodiments of this application, after the maintenance system receives the provisioning request sent by the first network device, when the maintenance system allows the SA 5G service to be automatically provisioned for the user equipment 200, the maintenance system notifies a home subscriber server (home subscriber server, HSS) of sending subscription data of the user equipment 200 stored in the HSS to the first network device. After obtaining the subscription data of the user equipment 200, the first network device sends an obtaining notification message to the maintenance system of the operator, to notify the maintenance system that the first network device has obtained the subscription data of the user equipment 200.

The HSS is a server configured to store user subscription data in a 4G evolved packet system (evolved packet system, EPS), and is mainly responsible for managing the user subscription data and location information of a mobile user. The subscription data stored in the HSS mainly includes: user identity information (identity, number, and address), user security context information (authentication and authorization information for user network access control), user location information, and user service subscription information (including value-added service data of another application server). It may be understood that the HSS may store a parameter used to identify whether a user subscribes to a 4G service.

It should be noted that after obtaining the subscription data of the user equipment 200, the first network device may modify or delete information in the subscription data of the user equipment 200 based on a user requirement, to generate SA 5G subscription data of the user equipment 200. After the SA 5G subscription data of the user equipment 200 is generated, the first network device may store a parameter used to identify whether the user equipment 200 subscribes to a SA 5G service. It may be understood that when the first network device stores the SA 5G subscription data of the user equipment 200, and the foregoing parameter represents that the user equipment 200 subscribes to the SA 5G service, the SA 5G subscription data is available SA 5G subscription data of the user equipment 200.

In some embodiments of this application, the first network device includes an AMF and a UDM, and the maintenance system notifies the HSS of sending the subscription data of the user equipment 200 stored in the HSS to the UDM. The UDM may generate the SA 5G subscription data of the user equipment 200 based on the subscription data of the user equipment 200 sent by the HSS.

In some embodiments of this application, after sending the subscription data of the user equipment 200 to the first network device, the HSS may delete the subscription data of the user equipment 200 from the HSS, or may not delete the subscription data of the user equipment 200 from the HSS. This is not specifically limited herein.

In some embodiments of this application, the first network device includes an AMF and a UDM. After (or before, or when) the UDM sends a query failure response to the AMF, the UDM may send a provisioning request to the maintenance system of the operator. For example, as shown in FIG. 10A, after step S602, the method may further include step S603a.

S603a: The UDM network device sends the provisioning request to the maintenance system of the operator, and the maintenance system of the operator receives the provisioning request sent by the UDM, where the provisioning request is used to request to provision the SA 5G service for the user equipment 200.

S604: After the maintenance system of the operator determines that the SA 5G service is successfully provisioned for the user equipment 200, the maintenance system of the operator sends a notification short message to the user equipment 200, and the user equipment 200 receives the notification short message sent by the maintenance system of the operator, where the notification short message is used to notify the user equipment 200 that the SA 5G service is successfully provisioned.

It should be noted that, after the maintenance system of the operator receives an obtaining notification message sent by the first network device, and determines, through the obtaining notification message, that the SA 5G service is successfully provisioned for the user equipment 200, the maintenance system of the operator may send the notification short message to the user equipment 200 by using one or more network devices.

In some embodiments of this application, after the first network device receives the subscription data of the user equipment 200 sent by the HSS, and before step S604, the method further includes: the first network device sends acknowledgment information to the maintenance system of the operator; the maintenance system of the operator receives the acknowledgment information sent by the first network device, where the acknowledgment information is used to indicate that the first network device has obtained the SA 5G subscription data of the user equipment 200; and the maintenance system of the operator determines, based on the acknowledgment information, that the SA 5G service is successfully provisioned for the user equipment 200.

Figure 11:
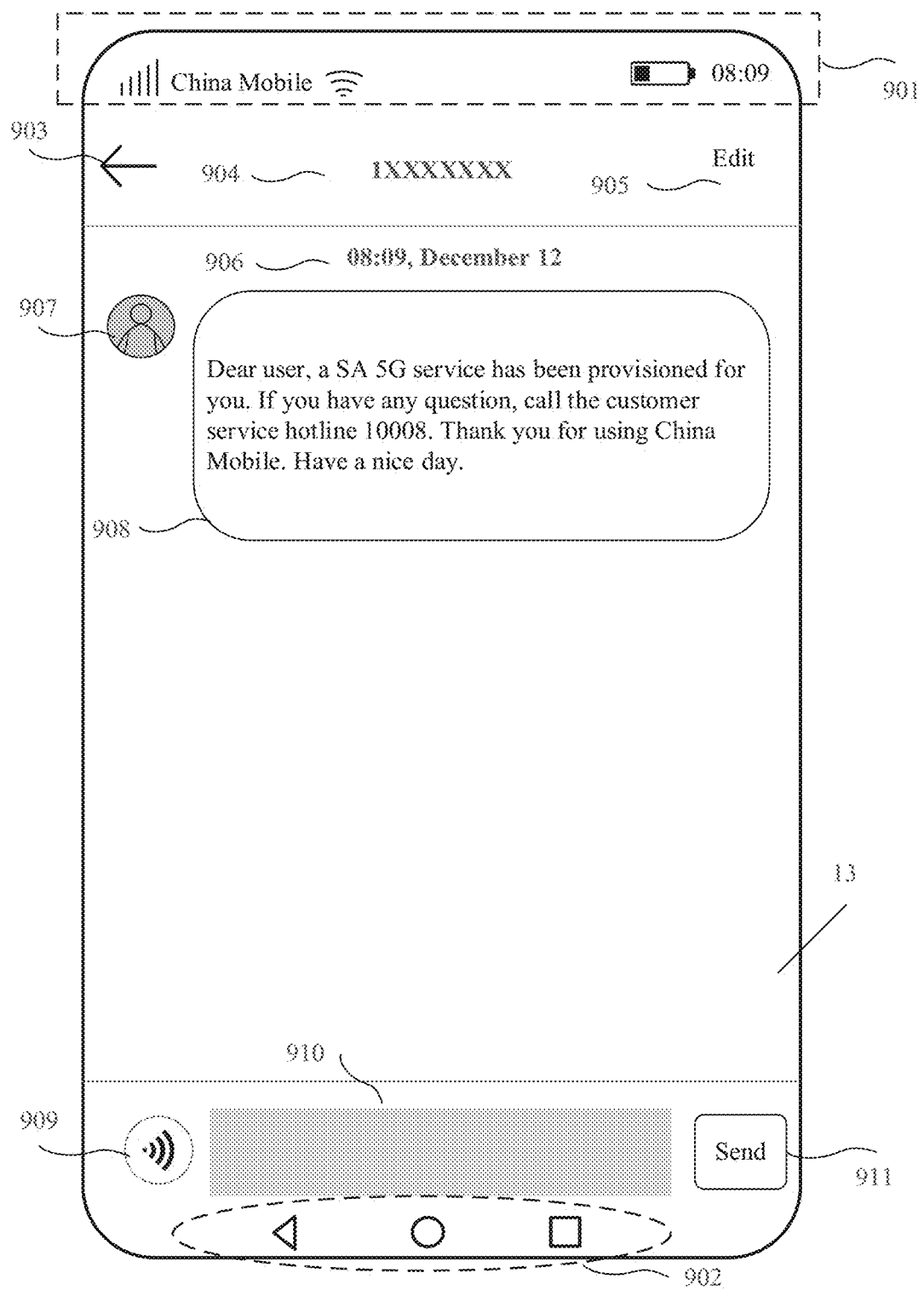
FIG. 11 to FIG. 14 are examples of user interfaces of short messages according to an embodiment of this application.

For example, the user equipment 200 receives a SA 5G service provisioning notification short message sent by the operator. As shown in FIG. 11, a user interface 13 is configured to display the SA 5G service provisioning notification short message received by the user equipment 200.

The user interface 13 may include: a status bar 901, a navigation bar 902, a return control 903, a sender number 904, an editing control 905, a short message receiving time point 906, a profile picture 907, a short message content display area 908, a voice control 909, an input box 910, and a sending control 911.

The return control 903 may receive a user operation (for example, a touch operation). In response to the detected user operation, the user equipment 200 may display a user interface previous to the user interface 13.

The editing control 905 may receive a user operation (for example, a touch operation). In response to the detected user operation, the user equipment 200 may receive an editing operation performed by a user on a display card 1608, for example, deletion and forwarding.

The voice control 909 may receive a user operation (for example, a touch operation). In response to the detected user operation, the user equipment 200 begins to collect a voice.

The input box 910 may receive a user operation (for example, a touch operation). In response to the detected user operation, the user equipment 200 may display an input keyboard. The input box 910 may be configured to display input content.

The short message content display area 908 is configured to display specific content of a notification short message. For example, the specific content of the notification short message may include the following: "Dear user, a SA 5G service has been successfully provisioned for you. If you have any question, call the customer service hotline 10008. Thank you for using China Mobile. Have a nice day."

In some embodiments of this application, before the maintenance system of the operator sends the notification short message to the user equipment 200, the method further includes: the maintenance system of the operator sends a confirmation request short message to the user equipment 200; the user equipment 200 receives the confirmation request short message sent by the maintenance system of the operator, where the confirmation request short message is used to request the user to confirm whether the SA 5G service is to be provisioned; and the user equipment 200 sends a confirmation response short message to the maintenance system of the operator, where the confirmation response short message is used to indicate that the user equipment 200 confirms that the SA 5G service is to be provisioned.

Figure 12:
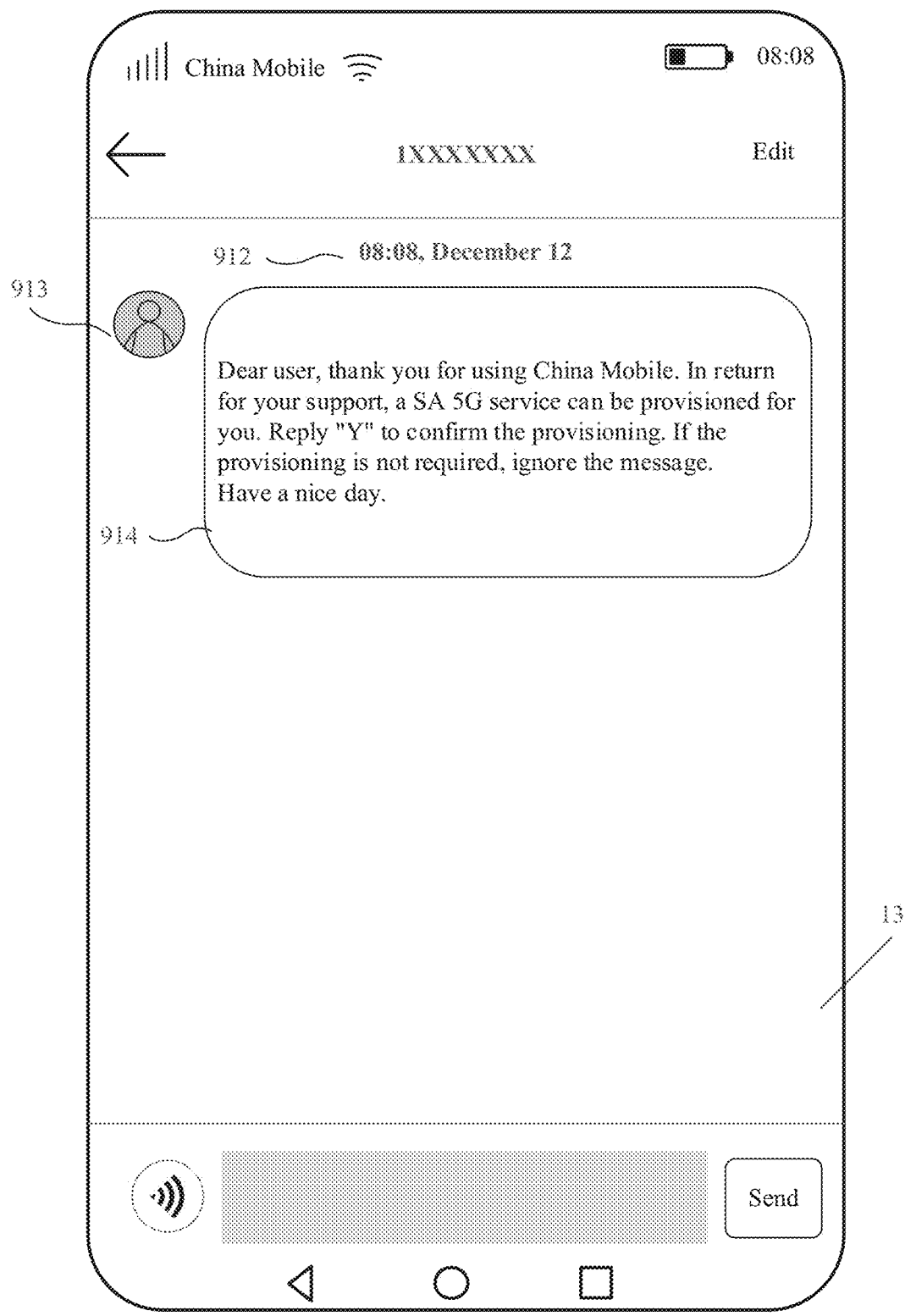

For example, as shown in FIG. 12 the user equipment 200 receives a confirmation request short message sent by an operator. The user interface 13 may further include: a short message receiving time point 912, a profile picture 913, and a short message content display area 914.

The short message content display area 913 is configured to display specific content of the confirmation request short message. For example, the specific content of the confirmation request short message may include the following: "Dear user, thank you for using China Mobile. In return for your support, a SA 5G service can be provisioned for you. Reply "Y" to confirm the provisioning. If the provisioning is not required, ignore the message. Have a nice day."

Figure 13A:
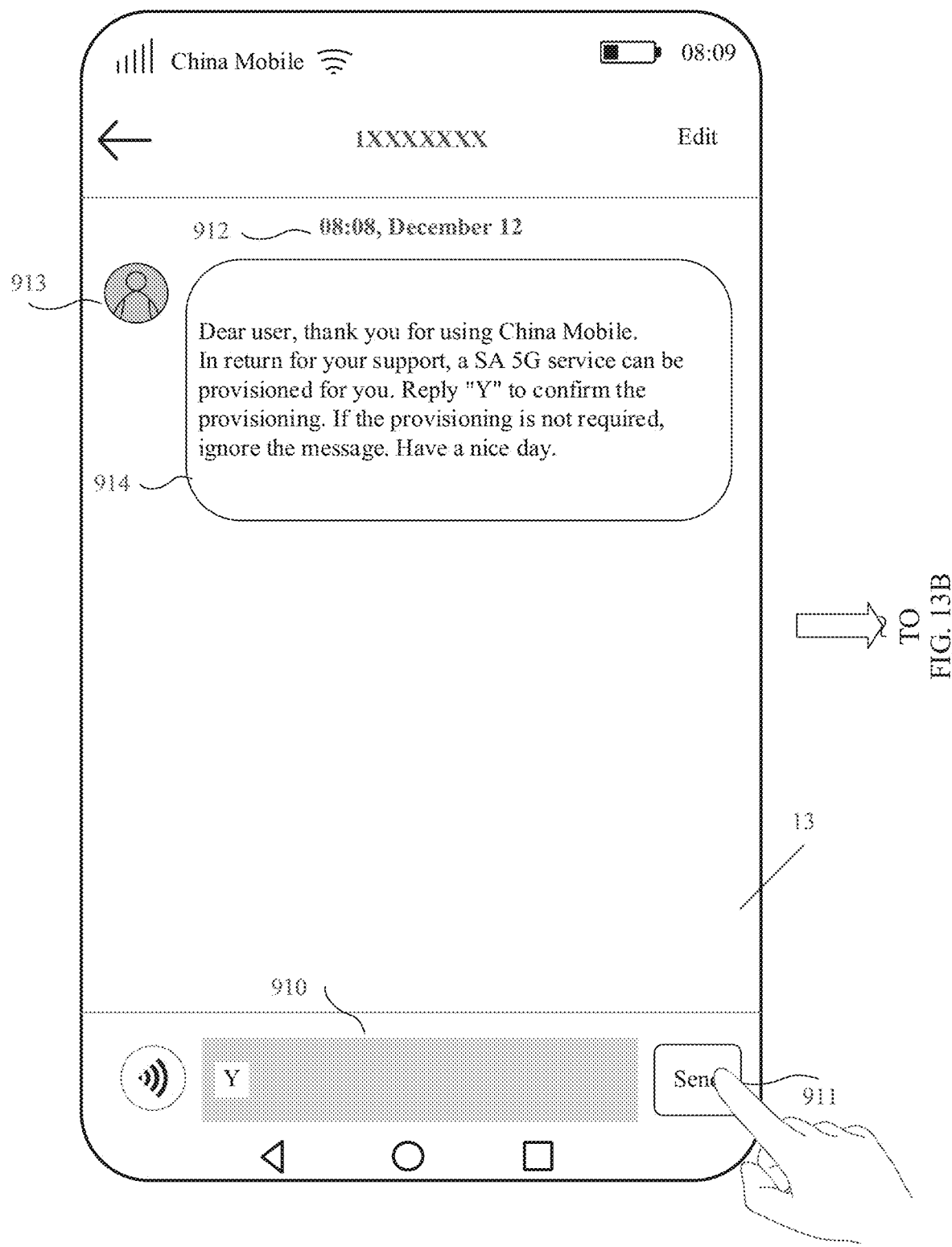
Figure 13B:
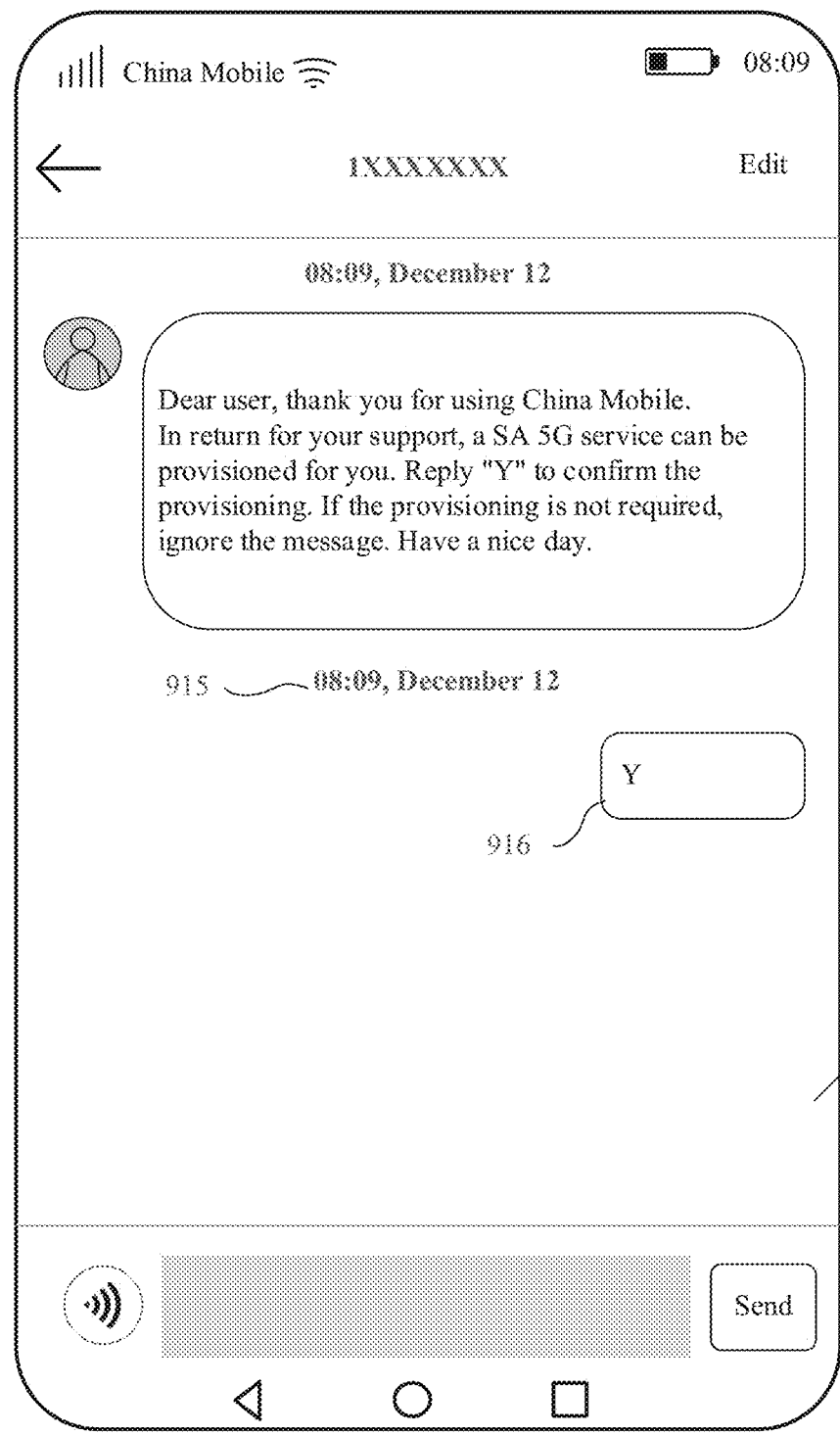

For example, as shown in FIG. 13A and FIG. 13B, the user equipment 200 returns a confirmation response short message based on the confirmation request short message. The user interface 13 may further include: a short message receiving time point 915 and a short message content display area 916.

The short message content display area 913 is configured to display specific content of the confirmation response short message. For example, it can be learned from the foregoing confirmation request short message that when the user agrees that the SA 5G service is to be provisioned, the specific content of the confirmation response short message may be "Y".

Figure 14:
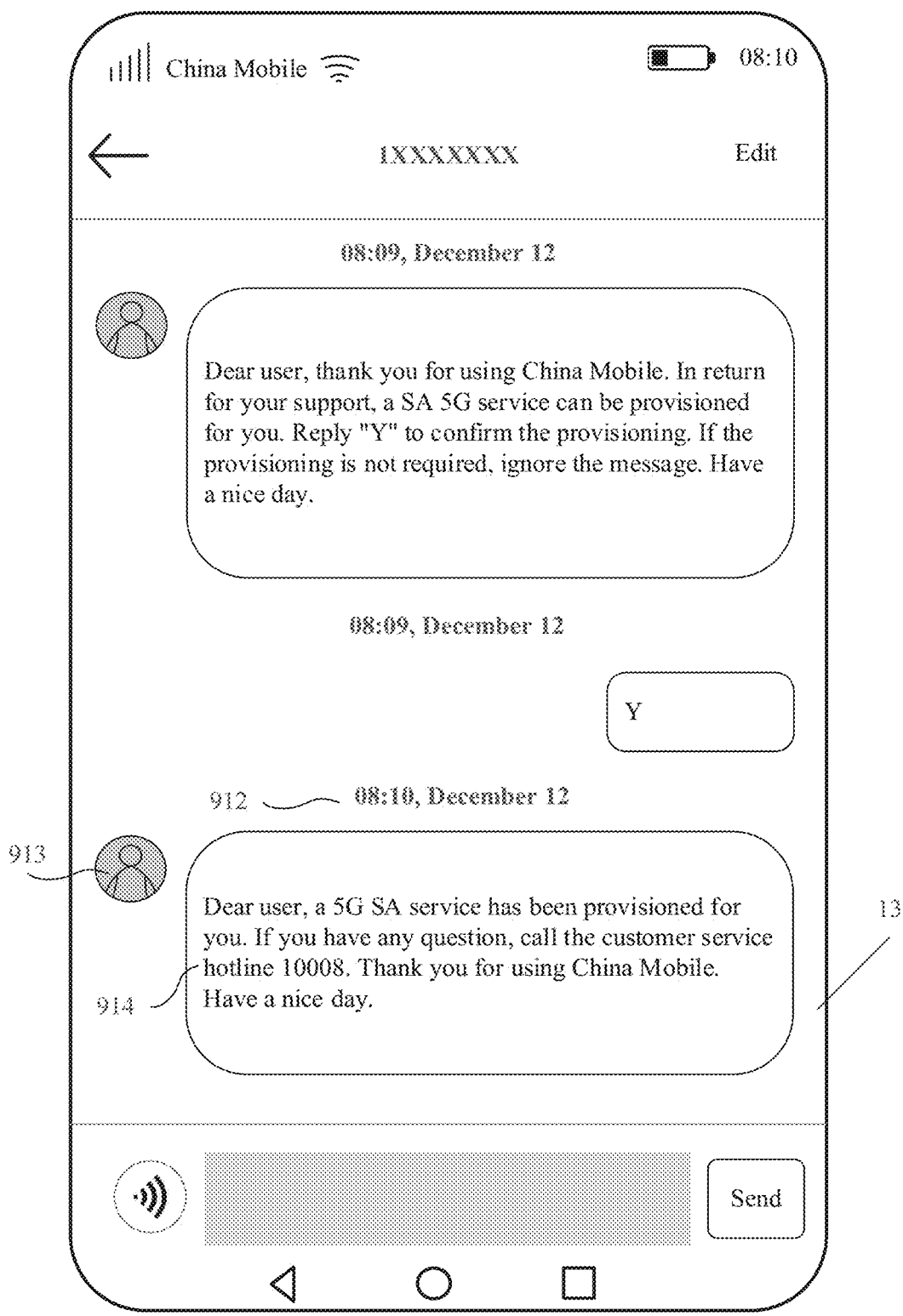

After the operator receives the confirmation response short message returned by the user equipment 200, when determining that the SA 5G service is successfully provisioned for the user equipment 200, the operator sends a SA 5G service provisioning notification short message to the user equipment 200. As shown in FIG. 14, after returning the confirmation response short message, the user equipment 200 receives the SA 5G service provisioning notification short message sent by the operator.

S605: The user equipment 200 parses the notification short message, and determines, based on the notification short message, that the SA 5G service is successfully provisioned for the user equipment 200.

In some embodiments of this application, the user equipment 200 parses the notification short message by using a neural network.

In some embodiments of this application, after the user equipment 200 is powered on, the user equipment 200 parses whether a received short message is the short message indicating that the SA 5G service is successfully provisioned. When the received short message is the short message indicating that the SA 5G service is successfully provisioned, step S610 is performed.

In some embodiments of this application, after sending a SA 5G registration request, the user equipment 200 parses whether a received short message is the short message indicating that the SA 5G service is successfully provisioned. When the received short message is the short message indicating that the SA 5G service is successfully provisioned, step S610 is performed.

In some embodiments of this application, after receiving a SA 5G registration reject response, the user equipment 200 parses whether a received short message is the short message indicating that the SA 5G service is successfully provisioned. When the received short message is the short message indicating that the SA 5G service is successfully provisioned, step S611 is performed.

In some embodiments, after receiving the short message shown in FIG. 11, the user equipment 200 may identify the short message by using a trained neural network model, to determine that the short message is the notification short message indicating that the SA 5G service is provisioned.

It may be understood that the user equipment 200 may parse each received short message (or parse each received short message whose sender is the operator) after the user equipment 200 is powered on, sends the SA 5G registration request, or receives the SA 5G registration reject response. When content of the parsed short message includes a related keyword indicating that the SA 5G service is successfully provisioned, it may be determined that the SA 5G service is successfully provisioned for the user equipment 200. In this way, the user equipment 200 is triggered to initiate SA 5G network search and registration again.

S606: The user equipment 200 sends a registration request to the first network device again, and the first network device receives the registration request sent by the user equipment 200, where the registration request is sent by the user equipment 200 after the user equipment 200 determines, based on the notification short message, that the SA 5G service is successfully provisioned for the user equipment 200.

S607: The first network device sends a registration accept response to the user equipment 200, and the user equipment 200 receives the registration accept response sent by the first network device, where the registration accept response is used to notify the user equipment 200 that the registration with the SA 5G network succeeds.

In some implementations of this application, that the first network device sends the registration accept response to the user equipment 200 includes: the first network device sends the registration accept response to the (R)AN, and the (RAN sends the registration accept response to the user equipment 200.

In some embodiments of this application, the foregoing first registration request is "registration receipt".

In some embodiments of this application, the registration accept response may include: the 5G-GUTI, a registration area, and allowed network slice selection assistance information (network slice selection assistance information, NSSAI).

In some embodiments of this application, the first network device includes an AMF and a UDM. For example, as shown in FIG. 10B, after step S606 and before step S607, the method may further include step S607a and step S607b.

S607a: The AMF sends a query request to the UDM again, and the UDM receives the query request sent by the AMF, where the query request is used to request to query SA 5G subscription data of the user equipment 200.

S607b: The UDM sends a query success response to the AMF, and the AMF receives the query success response sent by the UDM, where the query success response is used to indicate that the user equipment 200 has available SA 5G subscription data.

It may be understood that the AMF sends the registration accept response to the user equipment 200 only after the AMF receives the query success response sent by the UDM and determines that the user equipment 200 has the available SA 5G subscription data. The query success response may include the SA 5G subscription data of the user equipment 200, or may not include the SA 5G subscription data of the user equipment 200. This is not specifically limited herein. In this embodiment of this application, the available SA 5G subscription data may alternatively be referred to as available 5G subscription data for short.

In this embodiment of this application, a sequence of step S602 and step S603 is not specifically limited. It may be understood that step S602 may be performed before or after step S603, or may be performed simultaneously with step S603.

Figure 15A:
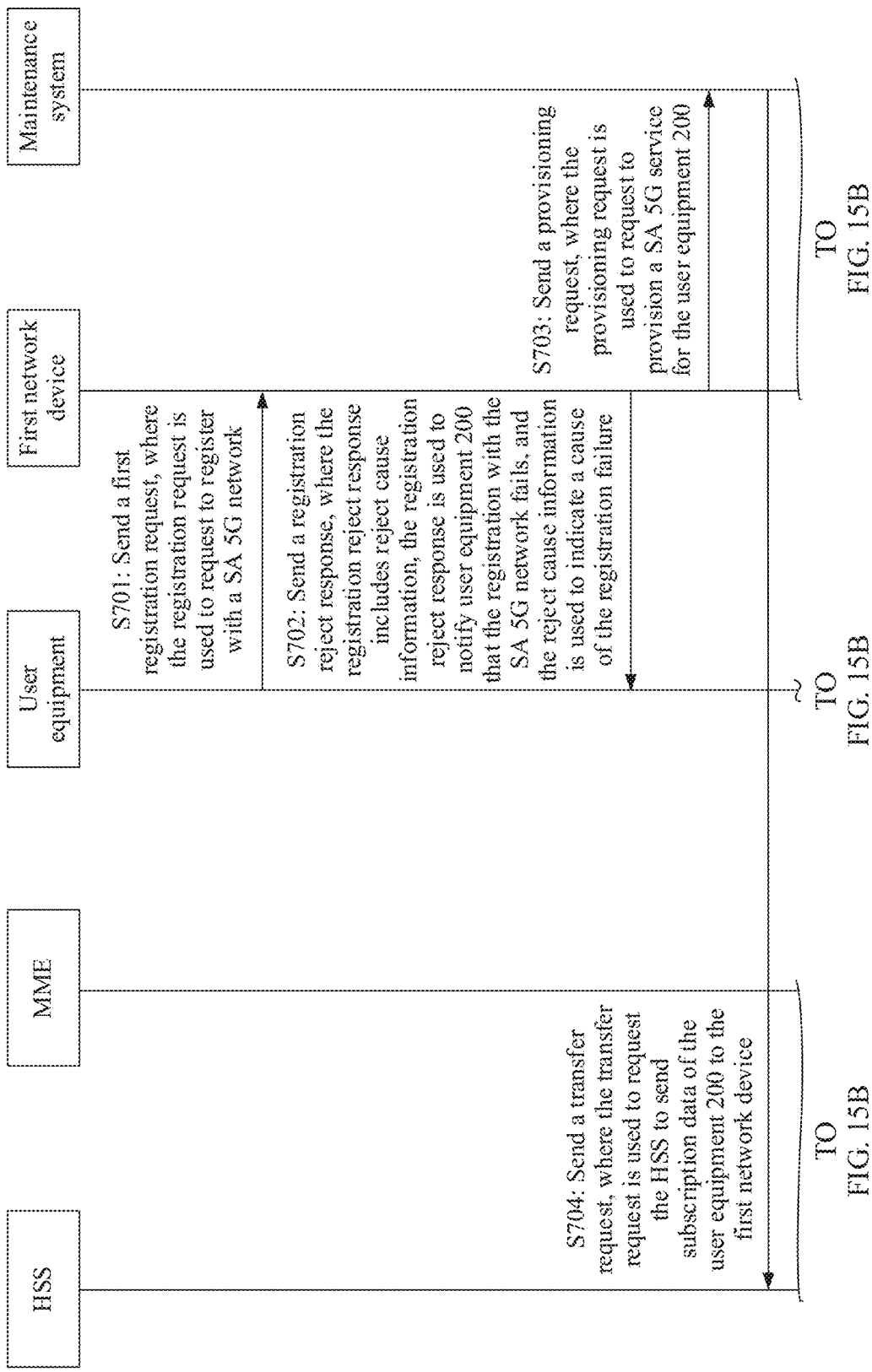
FIG. 15A and FIG. 15B are a schematic flowchart of still another network search method for SA 5G service auto-provisioning according to an embodiment of this application.
Figure 15B:
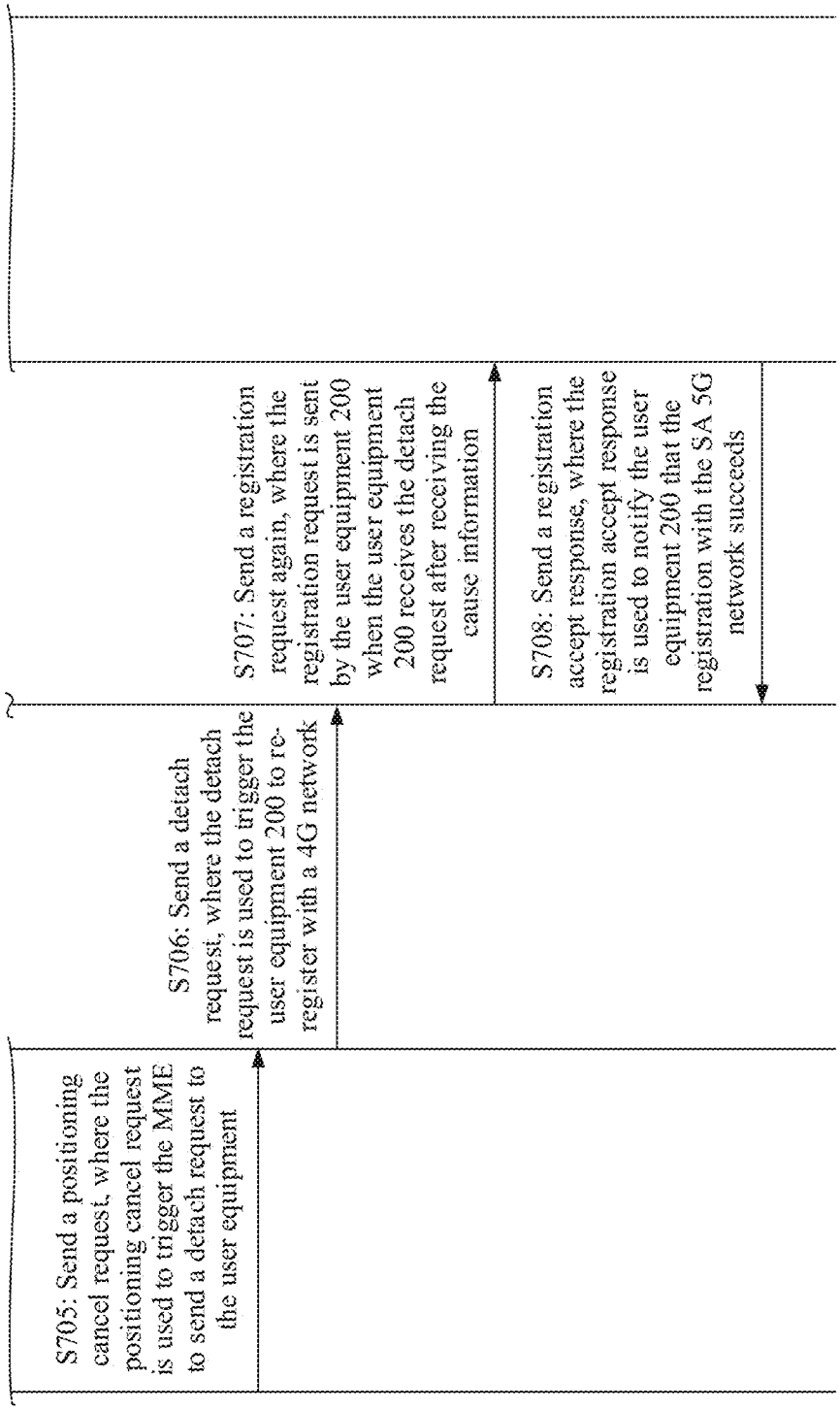

FIG. 15A and FIG. 15B are a schematic flowchart of still another network search method for SA 5G service auto-provisioning according to an embodiment of this application. As shown in FIG. 15A and FIG. 15B, the network search method for SA 5G service auto-provisioning provided in this embodiment of this application includes but is not limited to step S701 to step S707. The following further describes a possible implementation of the method embodiment.

S701: User equipment 200 sends a registration request to a first network device, and the first network device receives the registration request sent by the user equipment 200, where the registration request is used to request to register with a SA 5G network.

In some embodiments of this application, the first network device includes an AMF.

In some embodiments of this application, the foregoing registration request is "registration request".

In some implementations of this application, that the user equipment 200 sends the registration request to the first network device includes: the user equipment 200 sends the registration request to an (JOAN, and the (R)AN sends the registration request to the first network device.

S702: The first network device sends a registration reject response to the user equipment 200, and the user equipment 200 receives the registration reject response sent by the first network device, where the registration reject response includes reject cause information, and the registration reject response is used to notify the user equipment 200 that registration with the SA 5G network fails, and the reject cause information is used to indicate a cause of the registration failure.

In some embodiments of this application, that the first network device sends the registration reject response to the user equipment 200 includes: the first network device sends the registration reject response to the (R)AN, and the (R)AN sends the registration reject response to the user equipment 200.

In some embodiments of this application, the foregoing registration request is "registration reject".

In some embodiments of this application, the registration reject response includes reject cause information.

In some embodiments of this application, the reject cause information is a reject cause value. For example, the reject cause value is #111.

In some embodiments of this application, the first network device includes an AMF and a UDM. For example, as shown in FIG. 16A, after step S701 and before step S702, the method may further include step S702a and step S702b.

S702a: The AMF sends a query request to the UDM, and the UDM receives the query request sent by the AMF, where the query request is used to request to query SA 5G subscription data of the user equipment 200.

S702b: The UDM sends a query failure response to the AMF, and the AMF receives the query failure response sent by the UDM, where the query failure response indicates that the user equipment 200 has no available SA 5G subscription data.

In some embodiments of this application, after the user equipment 200 fails to register with the SA 5G network, the user equipment 200 searches for the 4G network and initiates 4G network registration. Therefore, for example, as shown in FIG. 16A and FIG. 16B, after step S702, the method may further include step S702c and step S702d.

S702c: User equipment 200 sends a 4G registration request to an MME, and the MME receives the 4G registration request sent by the user equipment 200, where the 4G registration request is used to request to register with the 4G network.

S702d: The MME sends a 4G registration accept response to the user equipment 200, and the user equipment 200 receives the 4G registration accept response sent by the MME, where the 4G registration accept response is used to notify the user equipment 200 that the registration with the 4G network succeeds.

S703: The first network device sends a provisioning request to a maintenance system of an operator, and the maintenance system of the operator receives the provisioning request sent by the first network device, where the provisioning request is used to request to provision the SA 5G service for the user equipment 200.

In some embodiments of this application, the provisioning request includes the identity of the user equipment 200. For example, the provisioning request includes the IMSI.

In some embodiments of this application, the first network device includes an AMF and a UDM. After or before, or when) the UDM sends a query failure response to the AMF, the UDM may send a provisioning request to the maintenance system of the operator. For example, as shown in FIG. 16A, after step S702, the method may further include step S703a.

S703a: The UDM network device sends the provisioning request to the maintenance system of the operator, and the maintenance system of the operator receives the provisioning request sent by the UDM where the provisioning request is used to request to provision the SA 5G service for the user equipment 200.

S704: The maintenance system of the operator sends a transfer request to an HSS, and the HSS receives the transfer request sent by the maintenance system of the operator, where the transfer request is used to request the HSS to send the subscription data of the user equipment 200 to the first network device.

In some embodiments of this application, the provisioning request includes the identity of the user equipment 200. For example, the provisioning request includes the IMSI.

It may be understood that after the maintenance system receives the provisioning request, when the maintenance system allows the SA 5G service to be automatically provisioned for the user equipment 200, the maintenance system notifies the HSS to send the subscription data of the user equipment 200 stored in the HSS to a network device that is of a 5G core network and that is configured to store subscription data.

S705: After the HSS sends the subscription data of the user equipment 200 to the first network device, the HSS sends a positioning cancel request to the MME, where the positioning cancel request is used to trigger the MME to send a detach request to the UE.

Optionally, the positioning cancel request is further used to request the MME to delete a mobility management (mobility management, MM) context and an EPS bearer that are subscribed to by the user equipment 200.

It should be noted that after obtaining the subscription data of the user equipment 200, the first network device may modify or delete information in the subscription data of the user equipment 200 based on a user requirement, and determine SA 5G subscription data of the user equipment 200.

In some embodiments of this application, after sending the subscription data of the user equipment 200 to the first network device, the HSS may delete the subscription data of the user equipment 200 from the HSS, or may not delete the subscription data of the user equipment 200 from the HSS. This is not specifically limited herein.

In some embodiments of this application, the foregoing positioning cancel request is "Cancel Location".

In some embodiments of this application, the positioning cancel request includes a cancellation type (cancellation type) and an identity of the user equipment 200 (for example, an IMSI). The cancellation type is "subscription withdrawn".

The MM context is a set of information stored in an MS and an SGSN, and includes a user identity, status information, location information, and a terminal capability. A user can have only one MM context.

The EPS bearer provides a specific QoS guarantee for transmission between a UE and a PDN, and there are two types of EPS bearers: a default bearer and a dedicated bearer. One EPS bearer is a logical aggregation of one or more service data flows (service data flow, SDF) between the UF, and the PDN.

In some embodiments of this application, the first network device includes an AMF and a UDM. For example, as shown in FIG. 16B, before step S705, the proposed solution further includes S705a.

S705a: The HSS sends the subscription data of the user equipment 200 to the UDM, and the UDM receives the subscription data of the user equipment 200 sent by the HSS.

S706: The MME sends a detach request to the user equipment 200, where the detach request is used to trigger the user equipment 200 to re-register with the 4G network.

In some embodiments of this application, the foregoing detach request is "Detach Request".

In some embodiments of this application, the detach request carries the identity of the user equipment 200. For example, the detach request carries the IMSI.

In some embodiments of this application, the detach request may further include a detach type and a detach cause.

In some embodiments of this application, the detach request is sent by the MME after the MME deletes the MM context and the EPS bearer that are subscribed to by the user equipment 200.

Figure 16C:
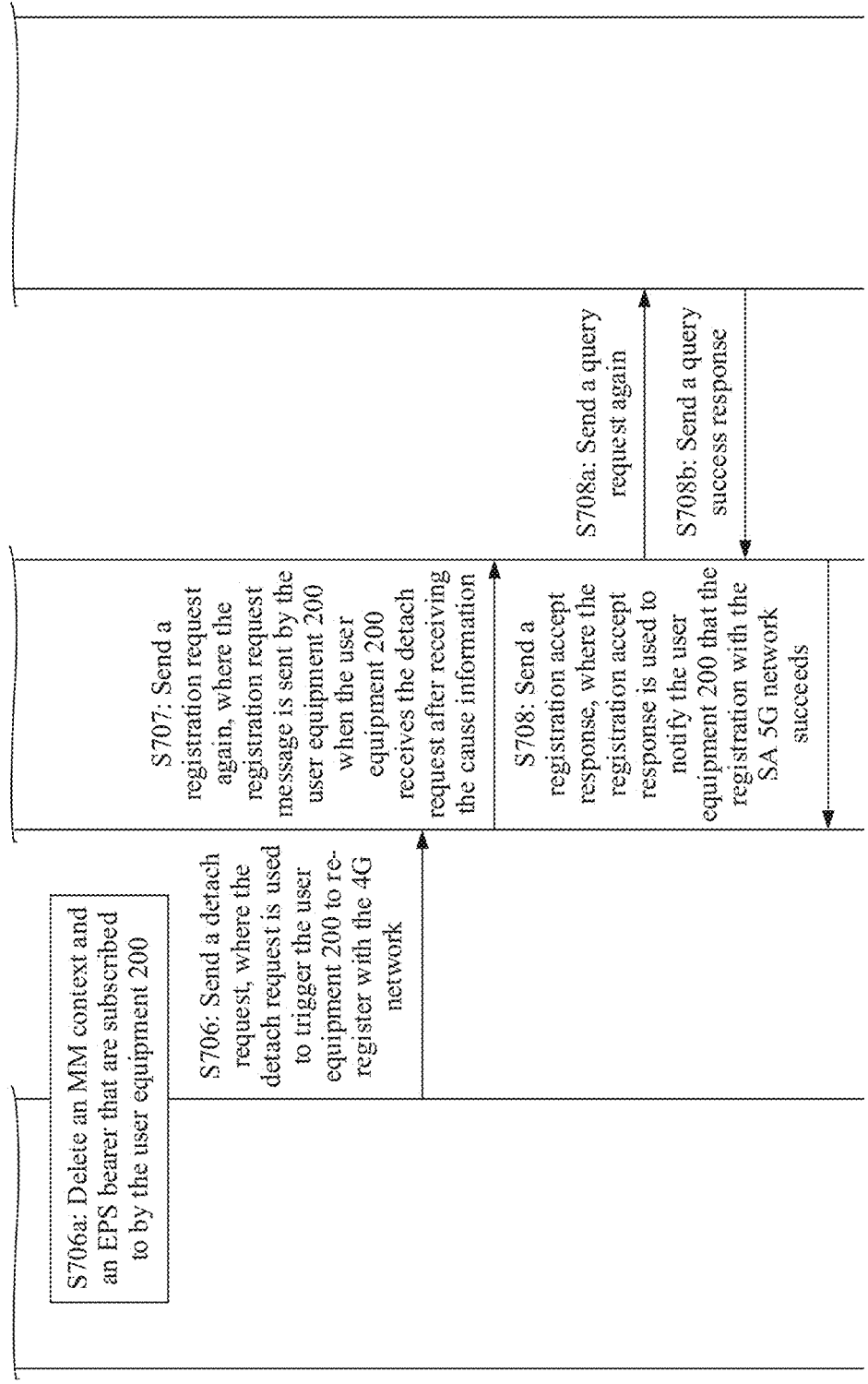

In some embodiments of this application, for example, as shown in FIG. 16C, before step S706, the proposed solution further includes S706a.

S706a: The MME deletes the MM context and the EPS bearer that are subscribed to by the user equipment 200.

S707: The user equipment 200 sends a registration request to the first network device again, and the first network device receives the registration request sent by the user equipment 200, where the registration request is sent when the user equipment 200 receives the detach request after receiving the cause information.

S708: The first network device sends a registration accept response to the user equipment 200, and the user equipment 200 receives the registration accept response sent by the first network device, where the registration accept response is used to notify the user equipment 200 that the registration with the SA 5G network succeeds.

In some implementations of this application, that the first network device sends the registration accept response to the user equipment 200 includes: the first network device sends the registration accept response to the (R)AN, and the (R)AN sends the registration accept response to the user equipment 200.

In some embodiments of this application, the first network device includes an AMF and a UDM. For example, as shown in FIG. 16C, after step S708 and before step S709, the method may further include step S709a and step S709b.

S708a: The AMF sends a query request to the UDM again, and the UDM receives the query request sent by the AMF, where the query request is used to request to query SA 5G subscription data of the user equipment 200.

S708b: The UDM sends a query success response to the AMF, and the AMF receives the query success response sent by the UDM, where the query success response is used to indicate that the user equipment 200 has available SA 5G subscription data.

It may be understood that after receiving the subscription data of the user equipment 200 sent by the HSS, the UDM may determine the SA 5G subscription data of the user equipment 200 based on the subscription data of the user equipment 200. Therefore, after the UDM receives the query request sent by the AMF in step S708a, the UDM may obtain the available SA 5G subscription data of the user equipment 200 through query.

In this embodiment of this application, a sequence of step S702 and step S703 is not specifically limited.

In this embodiment of this application, for specific implementations of step S701 to step S703, refer to the optional embodiments of step S601 to step S603. For specific implementations of step S707 to step S708, refer to step S606 and the optional embodiments of step S606. Details are not described herein again.

Figure 17:
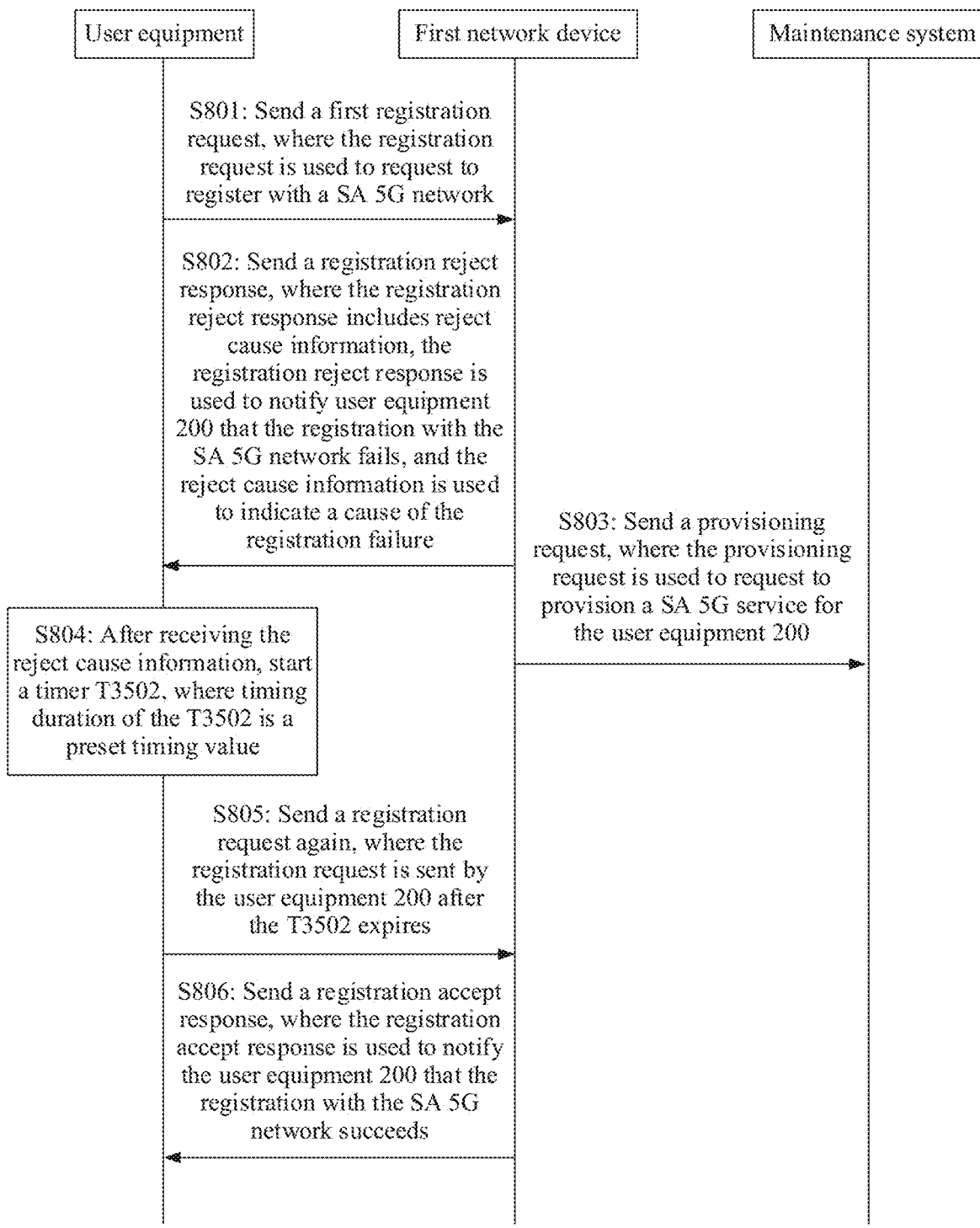
FIG. 17 is a schematic flowchart of still yet another network search method for SA 5G service auto-provisioning according to an embodiment of this application.

FIG. 17 is a schematic flowchart of a network search method for SA 5G service auto-provisioning according to an embodiment of this application. As shown in FIG. 17, the network search method for SA 5G service auto-provisioning provided in this embodiment of this application includes but is not limited to step S801 to step S805. The following further describes a possible implementation of the method embodiment.

S801: User equipment 200 sends a registration request to a first network device, and the first network device receives the registration request sent by the user equipment 200, where the registration request is used to request to register with a SA Ski network.

In some embodiments of this application, the first network device includes an AMF.

In some embodiments of this application, the foregoing registration request is "registration request".

In some implementations of this application, that the user equipment 200 sends the registration request to the first network device includes: the user equipment 200 sends the registration request to an (R)AN, and the (R)AN sends the registration request to the first network device.

S802: The first network device sends a registration reject response to the user equipment 200, and the user equipment 200 receives the registration reject response sent by the first network device, where the registration reject response includes reject cause information, and the registration reject response is used to notify the user equipment 200 that registration with the SA 5G network fails, and the reject cause information is used to indicate a cause of the registration failure.

In some embodiments of this application, that the first network device sends the registration reject response to the user equipment 200 includes: the first network device sends the registration reject response to the (R)AN, and the (R)AN sends the registration reject response to the user equipment 200.

In some embodiments of this application, the foregoing registration request is "registration reject".

In some embodiments of this application, the registration reject response includes reject cause information.

In some embodiments of this application, the reject cause information is a reject cause value. For example, the reject cause value is #111.

Figure 18A:
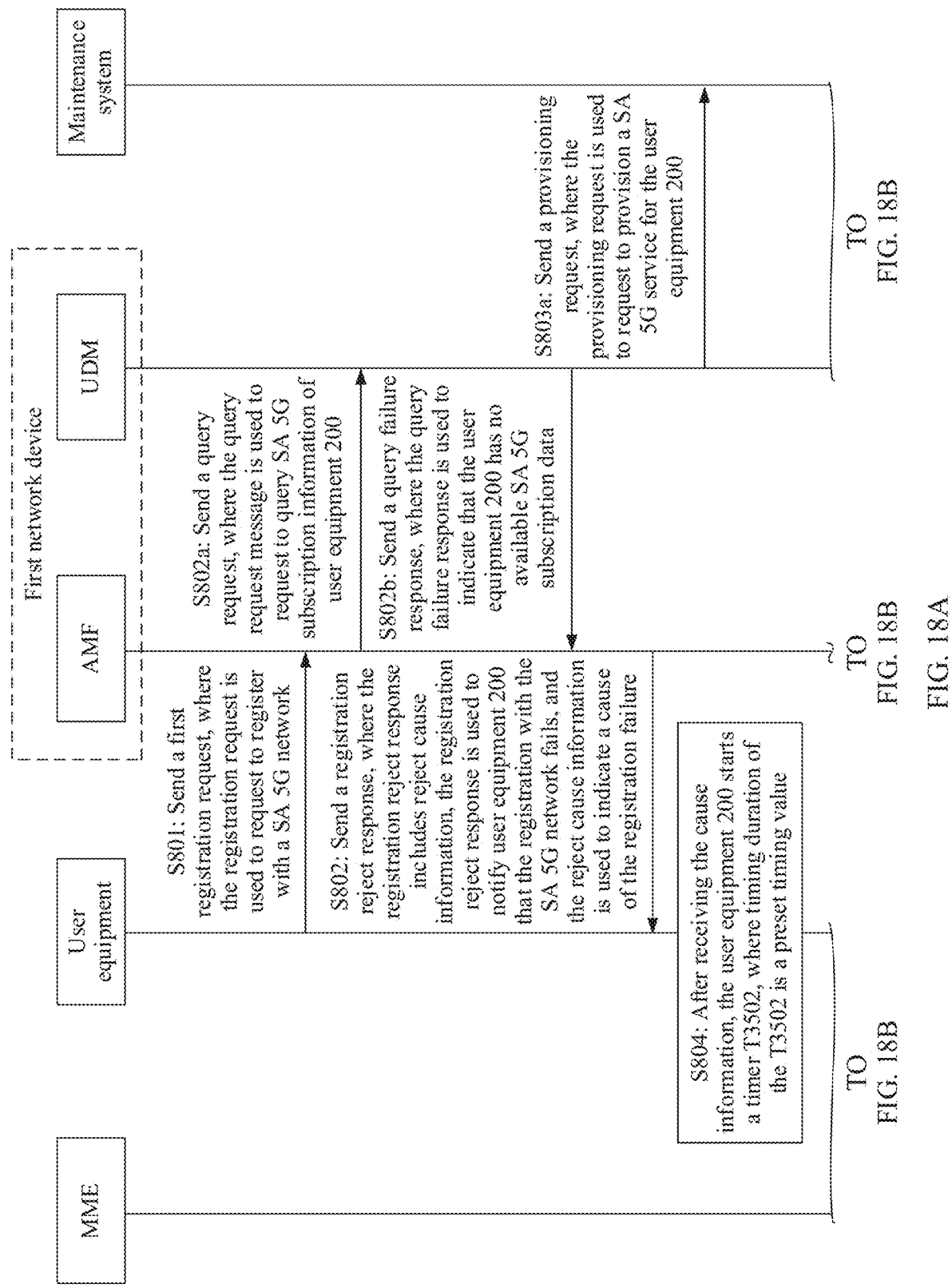
FIG. 18A and FIG. 18B are a schematic flowchart of a further network search method for SA 5G service auto-provisioning according to an embodiment of this application.

In some embodiments of this application, the first network device includes an AMF and a UDM. For example, as shown in FIG. 18A, after step S801 and before step S802, the method may further include step S802a and step S802b.

S802a: The AMF sends a query request to the UDM, and the UDM receives the query request sent by the AMF, where the query request is used to request to query SA 5G subscription data of the user equipment 200.

S802b: The UDM sends a query failure response to the AMF and the AMF receives the query failure response sent by the UDM, where the query failure response indicates that the user equipment 200 has no available SA 5G subscription data.

Figure 18B:
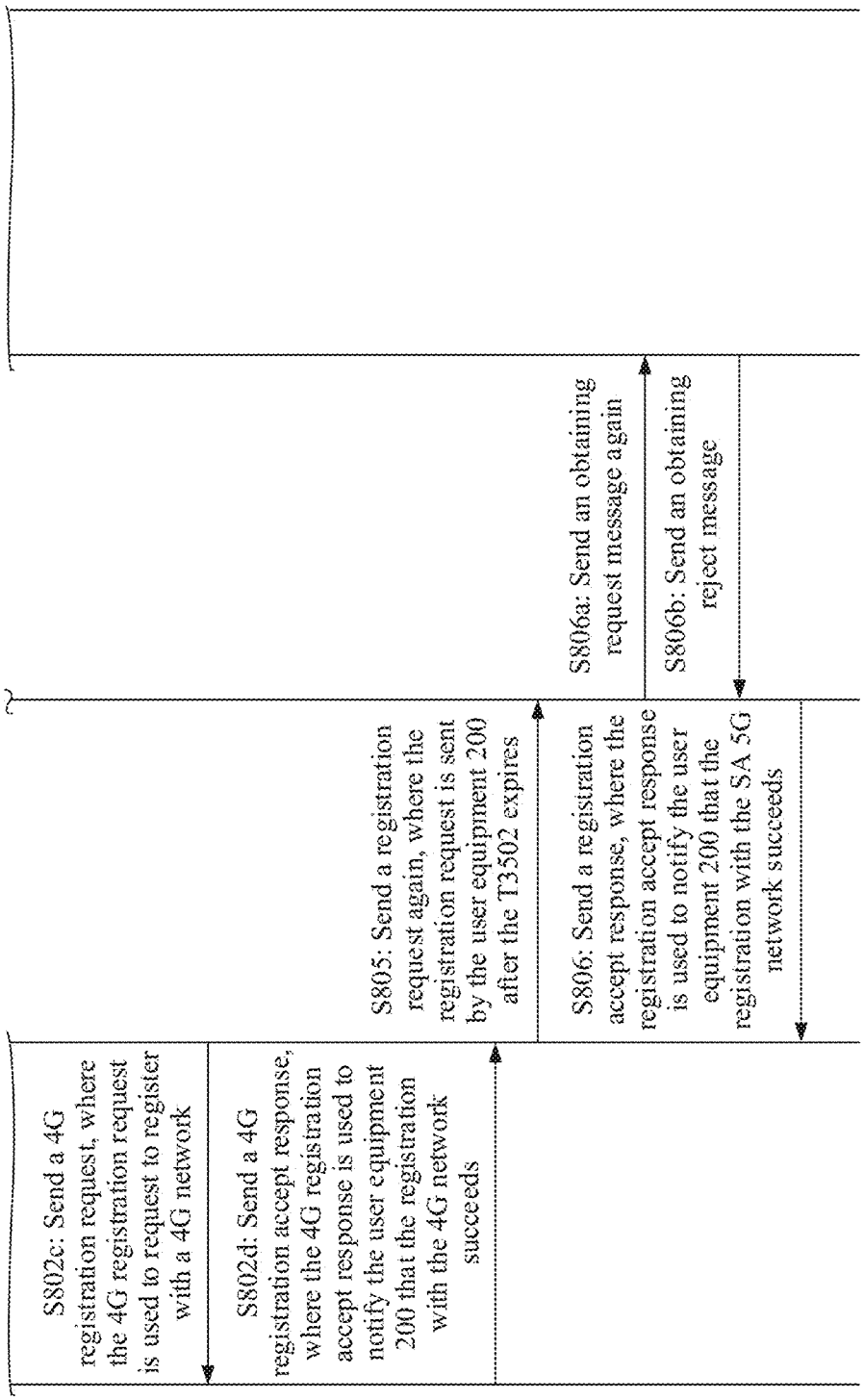

In some embodiments of this application, after the user equipment 200 fails to register with the SA 5G network, the user equipment 200 searches for the 4G network and initiates 4G network registration. Therefore, for example, as shown in FIG. 18A and FIG. 18B, after step S802, the method may further include step S802c and step S802d.

S802c: User equipment 200 sends a 4G registration request to an MME, and the MME receives the 4G registration request sent by the user equipment 200, where the 4G registration request is used to request to register with the 4G network.

S802d: The MME sends a 4G registration accept response to the user equipment 200, and the user equipment 200 receives the 4G registration accept response sent by the MME, where the 4G registration accept response is used to notify the user equipment 200 that the registration with the 4G network succeeds.

It may be understood that after receiving, the SA 5G registration reject response, the user equipment 200 disables a 5G network search capability, searches for the 4G network, and initiates 4G network registration. The 4G access network may be an eNB.

S803: After receiving the reject cause information, the user equipment 200 starts a timer T3502, where timing duration of the T3502 is a preset timing value.

It should be noted that default timing duration of T3502 is 12 minutes, but actual SA 5G service provisioning duration is usually much shorter than 12 minutes.

In some embodiments of this application, actual SA 5G service provisioning duration is measured for a plurality of times, to calculate average SA 5G service provisioning duration. The preset timing value is the average provisioning duration.

In some embodiments of this application, SA 5G service provisioning duration in different networks is measured, to calculate average SA 5G service provisioning duration in the different networks. The preset timing value is, based on each different network, the average SA 5G service provisioning duration corresponding to the network.

S804: The first network device sends a provisioning request to a maintenance system of an operator, and the maintenance system of the operator receives the provisioning request sent by the first network device, where the provisioning request is used to request to provision the SA 5G service for the user equipment 200.

In some embodiments of this application, the provisioning request includes the identity of the user equipment 200. For example, the provisioning request includes an IMSI or a SUCI.

In some embodiments of this application, the first network device includes an AMF and a UDM. After (or before, or when) the UDM sends the query failure response to the first network device, the UDM may send the provisioning request to the maintenance system of the operator. For example, as shown in FIG. 18A, the solution provided in this embodiment of this application may include S804a.

S804a: The UDM network device sends the provisioning request to the maintenance system of the operator, and the maintenance system of the operator receives the provisioning request sent by the UDM, where the provisioning request is used to request to provision the SA 5G service for the user equipment 200.

In some embodiments of this application, after the UDM sends the query failure response to the AMF, the AMF or the UDM sends the provisioning request to the maintenance system of the operator. After the maintenance system receives the provisioning request, when the maintenance system allows the SA 5G service to be automatically provisioned for the user equipment 200, the maintenance system notifies the HSS to send the subscription data of the user equipment 200 stored in the HSS to the first network device. After obtaining the subscription data of the user equipment 200, the first network device may determine the SA 5G subscription data of the user equipment 200 based on the subscription data of the user equipment 200. Then, the first network device may send an obtaining notification message to the maintenance system of the operator, to notify the maintenance system that the first network device has obtained the SA 5G subscription data of the user equipment 200.

S805: The user equipment 200 sends a registration request to the first network device again, and the first network device receives the registration request sent by the user equipment 200, where the registration request is sent by the user equipment 200 after the T3502 expires.

S806: The first network device sends a registration accept response to the user equipment 200, and the user equipment 200 receives the registration accept response sent by the first network device, where the registration accept response is used to notify the user equipment 200 that the registration with the SA 5G network succeeds.

In some implementations of this application, that the first network device sends the registration accept response to the user equipment 200 includes: the first network device sends the registration accept response to the (R)AN, and the (R)AN sends the registration accept response to the user equipment 200.

In some embodiments of this application, the first network device includes an AMF and a UDM. For example, as shown in FIG. 18B, after step S708 and before step S709, the method may further include step S709a and step S709b.

S806a: The AMF sends a query request to the UDM again, and the UDM receives the query request sent by the AMF, where the query request is used to request to query SA 5G subscription data of the user equipment 200.

S806b: The UDM sends a query success response to the AMF, and the AMF receives the query success response sent by the UM where the query success response is used to indicate that the user equipment 200 has available SA 5G subscription data.

In this embodiment of this application, a sequence of step S802 and step S803 is not specifically limited.

In this embodiment of this application, for specific implementations of step S801 to step S803, refer to the optional embodiments of step S601 to step S603. For specific implementations of step S805 to step S806, refer to step S606 and the optional embodiments of step S606. Details are not described herein again.

It should be noted that in the network search methods for SA 5G service auto-provisioning that are shown in FIG. 9 and FIG. 10A and FIG. 10B, one or more of step S704 to step S706 may alternatively be included after step S603 or S603a. This is not specifically limited herein.

In some embodiments of this application, for the network search methods shown in FIG. 9 and FIG. 10A and FIG. 10B, one or more of step S704 to step S706 are included after step S603 or step S603a. When the user equipment 200 receives, before step S605, the detach request sent by the MME (step S706), the user equipment 200 re-initiates 4G registration, and registers with the 4G network. Then, in step S605, when the user equipment 200 determines, based on the notification short message, that the SA 5G service provisioning is completed, the user equipment 200 disconnects from the 4G network, and performs step S606, that is, re-initiates SA 5G network registration. Before step S706, when the user equipment 200 determines, based on the notification short message, that the SA 5G service provisioning is completed (step S705), the user equipment 200 disconnects from the current 4G network, and re-initiates SA 5G network registration. It may be understood that in this case, the user equipment 200 may register with the SA 5G network, and no longer perform step S706.

It should be noted that in the network search methods for SA 5G service auto-provisioning that are shown in FIG. 17 and FIG. 18A and FIG. 18B, one or more of step S704 to step S706 may alternatively be included after step S803 or step S803a. This is not specifically limited herein.

In some embodiments of this application, for the network search methods shown in FIG. 17 and FIG. 18A and FIG. 18B, one or more of step S704 to step S706 are included after step S803 or step S803a. When the user equipment 200 receives, before the T3502 expires, the detach request sent by the MME (step S706), the user equipment 200 re-initiates 4G registration, and registers with the 4G network. Then, when the T3502 expires, the user equipment 200 disconnects from the 4G network, and performs step S805, that is, re-initiates SA 5G network registration. When the T3502 expires before step S706 is performed, the user equipment 200 disconnects from the current 4G network, and re-initiates SA 5G network registration. It may be understood that in this case, the user equipment 200 may register with the SA 5G network, and no longer perform step S706.

It should be noted that in the network search methods for SA 5G service auto-provisioning that are shown in FIG. 16A, FIG. 16B, and FIG. 16C to FIG. 18A and FIG. 18B, after the maintenance system of the operator automatically provisions the SASE service for the user equipment 200, the maintenance system of the operator may also send a notification short message to the user equipment 200 through the (R)AN, to notify the user equipment 200 that the SA 5G service provisioning succeeds. This is not specifically limited herein.

It can be learned from the network search methods for SA 5G service auto-provisioning shown in FIG. 9, FIG. 10A and FIG. 10B, and FIG. 15A and FIG. 15B to FIG. 18A and FIG. 18B that, in the network search methods provided in embodiments of this application, after an operator successfully performs auto-provisioning for the user equipment 200, specific trigger information (for example, existing information in an existing protocol) is used to notify the user equipment 200 that SA 5G service provisioning is completed, to trigger the user equipment 200 to initiate SA 5G network search and SA 5G network registration again. The first trigger information in the network search methods shown in FIG. 9 and FIG. 10A and FIG. 10B is to determine, by parsing a short message, that SA 5G service provisioning is completed. The second trigger information in the network search methods shown in FIG. 15A and FIG. 15B and FIG. 16A, FIG. 16B, and FIG. 16C is that the reject cause information and the detach request are received. The third trigger information in the network search methods shown in FIG. 17 and FIG. 18A and FIG. 18B is that the T3502 expires after the reject cause information is received.

In some embodiments of this application, at least two of the network search methods for SA 5G service auto-provisioning that are shown in FIG. 9 (or FIG. 10A and FIG. 10B), FIG. 15A and FIG. 15B (or FIG. 16A, FIG. 16B, and FIG. 16C), and FIG. 17 (or FIG. 18A and FIG. 18B) may be alternatively used, to enable a user for whom a SA 5G service is not provisioned to quickly register with a SA 5G network.

For example, the network search methods for SA 5G service auto-provisioning that are shown in FIG. 9 and FIG. 15A and FIG. 15B are used.

In some embodiments of this application, for the network search method shown in FIG. 9 (or FIG. 10A and FIG. 10B), one or more of step S704 to step S706 may be included after step S603, in this case, after the user equipment 200 receives the registration reject response in step S602, when the user equipment 200 determines at least one of the first trigger information and the second trigger information, the user equipment 200 performs step S606, that is, re-initiates SA 5G network registration.

For example, the network search methods for SA 5G service auto-provisioning that are shown in FIG. 9 and FIG. 17 are used.

In some embodiments of this application, for the network search method shown in FIG. 9 (or FIG. 10A and FIG. 10B), the registration reject response message may also carry reject cause information, and step S804 may be included after step S603. In this case, after the user equipment 200 receives the registration reject response in step S602, when the user equipment 200 determines at least one of the second trigger information and the third trigger information, the user equipment 200 performs step S606, that is, re-initiates SA 5G network registration.

For example, the network search methods for SA 5G service auto-provisioning that are shown in FIG. 15A and FIG. 15B and FIG. 17 are used.

In some embodiments of this application, for the network search method shown in FIG. 15A and FIG. 15B (or FIG. 16A, FIG. 16B, and FIG. 16C), the registration reject response message may also carry reject cause information, and step S804 may be included after step S703. In this case, after the user equipment 200 receives the registration reject response in step S702, when the user equipment 200 determines at least one of the second trigger information and the third trigger information, the user equipment 200 performs step S707, that is, re-initiates SA 5G network registration.

For example, the network search methods for SA 5G service auto-provisioning that are shown in FIG. 9, FIG. 15A and FIG. 15B, and FIG. 17 are used.

In some embodiments of this application, for the network search method shown in FIG. 9 (or FIG. 10A and FIG. 10B), the registration reject response message may also carry reject cause information. One or more of step S704 to step S706 may be included after step S603, and step S804 may be included. In this case, after the user equipment 200 receives the registration reject response in step S602, when the user equipment 200 determines at least one of the first trigger information, the second trigger information, and the third trigger information, the user equipment 200 performs step S606, that is, re-initiates SA 5G network registration.

In conclusion, in this embodiment of this application, for user equipment for which a SA 5G service is not provisioned, after a network device rejects a SA 5G registration request from the user equipment, an operator completes SA 5G service auto-provisioning for the user equipment. After determining, based on the specific trigger information, that the SA 5G service auto-provisioning has been completed, the user equipment initiates SA 5G network search and SA 5G network registration again. Therefore, according to the solution provided in this embodiment of this application, the user equipment can quickly register with the SA 5G network without being powered on again, disabling an airplane mode, or being disconnected from a network, so that user experience is effectively improved. In addition, in the solution provided iii this embodiment of this application, an existing protocol does not need to be modified, and modification is made only on a user equipment side. Therefore, the solution provided in this embodiment of this application has high applicability.

It should be noted that, in this application, the network side device may include the foregoing first network device and the maintenance system of the operator, the SA 5G network may alternatively be referred to as a 5G network for short, the SA 5G subscription data may alternatively be referred to as 5G subscription data for short, and the SA 5G service may alternatively be referred to as a 5G service for short.

For ease of understanding beneficial effects of the solution provided in this embodiment of this application, the following describes some example graphical user interfaces implemented on the user equipment 200 provided in this embodiment of this application by using examples in which an airplane mode is disabled and the user equipment 200 is restarted and powered on.

Figure 5B:
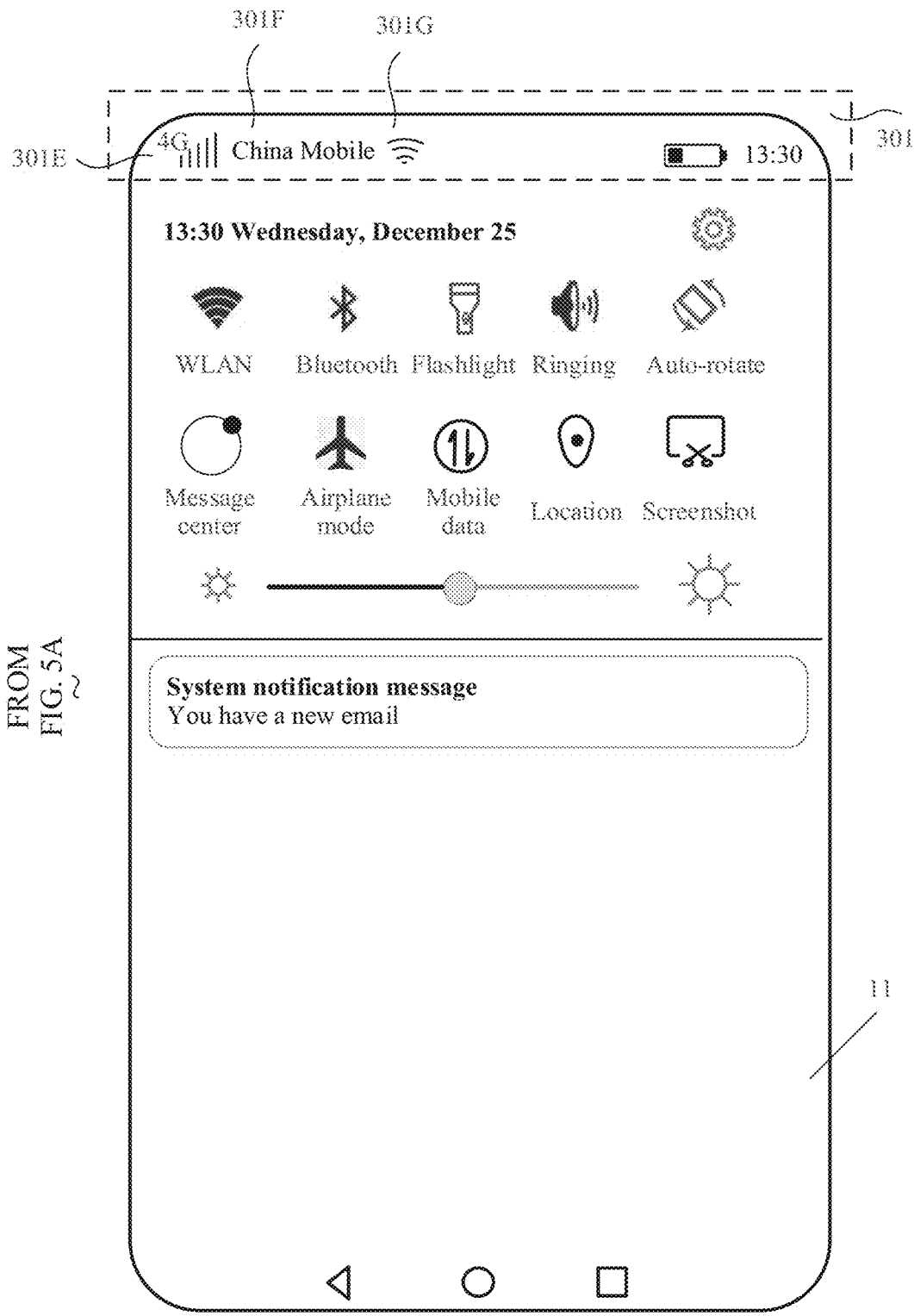

For example, when the airplane mode is disabled, for the solution provided in this embodiment of the present invention, refer to FIG. 3A and FIG. 3B to FIG. 5A and FIG. 5B. The user equipment 200 shown in FIG. 3A and FIG. 3B is user equipment for which a SA 5G service is not provisioned, and an airplane mode is enabled on the user equipment 200. As shown in FIG. 4A and FIG. 4B, after a user disables the airplane mode, the user equipment 200 displays the no-signal indicator 301D of a mobile communication signal on the status bar. After the airplane mode is disabled on the user equipment 200, the user equipment 200 initiates SA 5G search and registration. As shown in FIG. 5A and FIG. 5B, after the SA 5G registration fails, the user equipment 200 registers with the 4G network.

Figure 19A:
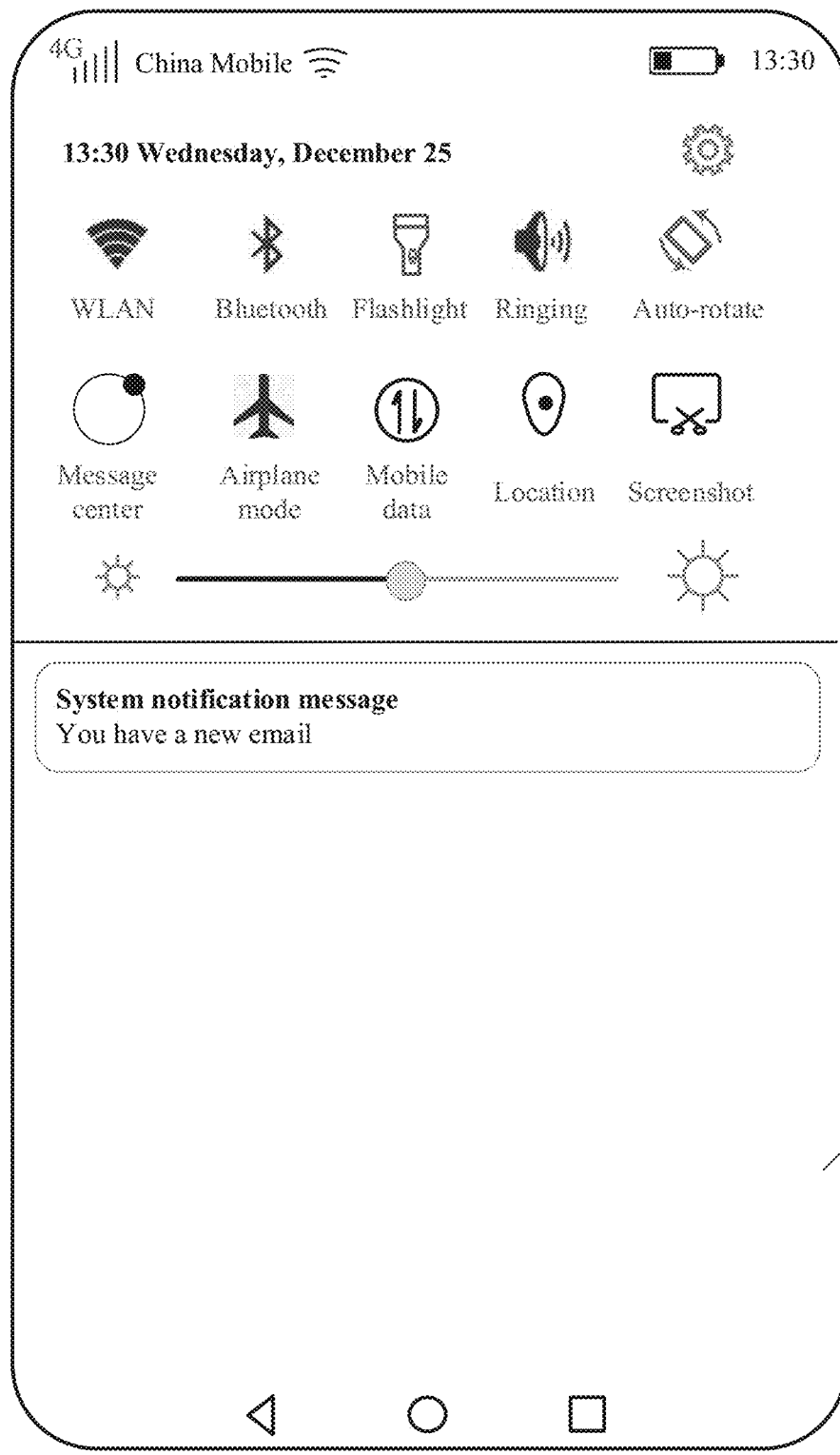
Figure 19B:
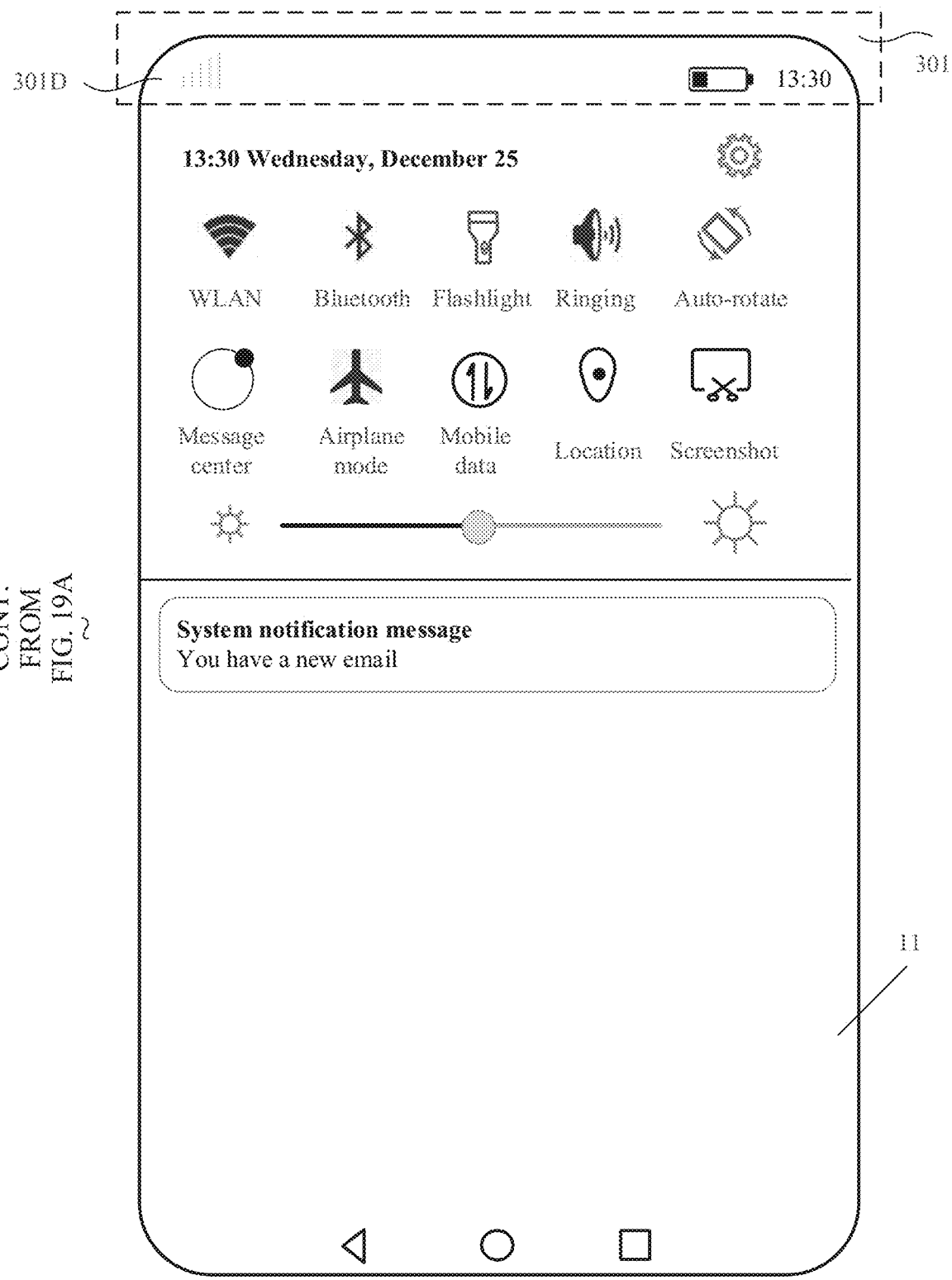
Figure 20A:
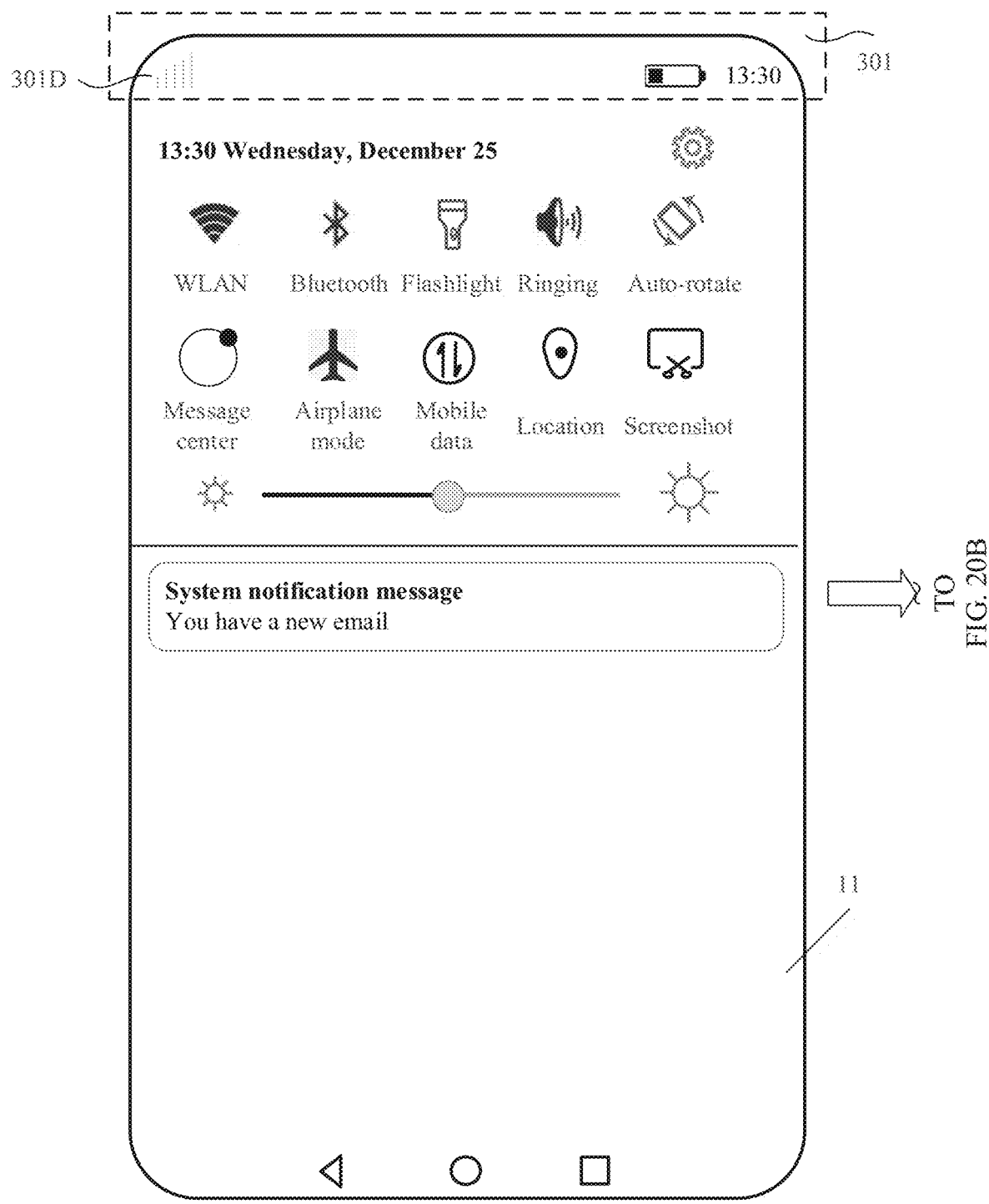
Figure 20B:
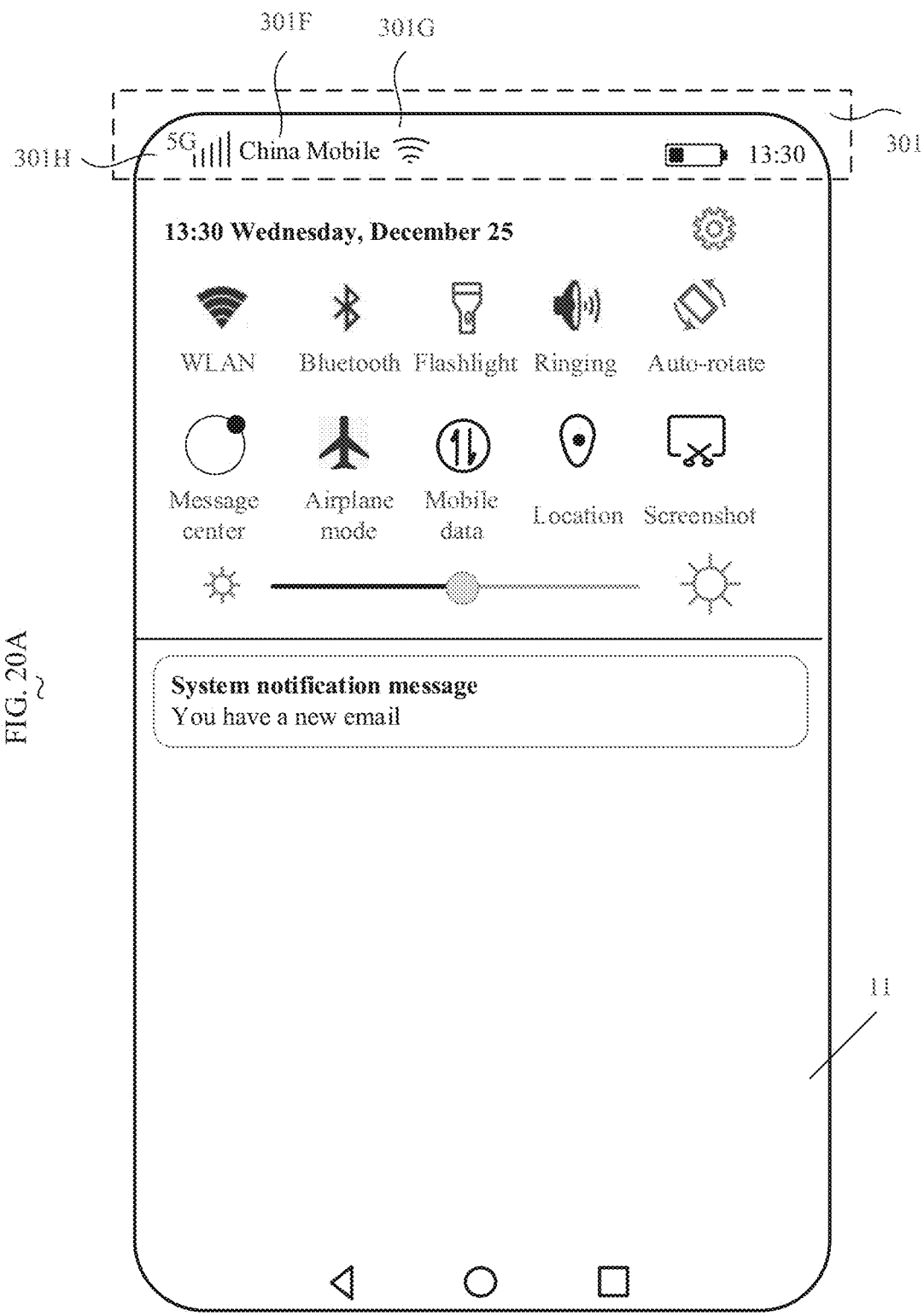

In this embodiment of this application, after registering with the 4G network, the user equipment 200 obtains specific trigger information, to trigger the user equipment 200 to initiate SA 5G network search and registration again. As shown in FIG. 19A and FIG. 19B, when the user equipment 200 disconnects from the 4G network, the user equipment 200 displays the no-signal indicator 301D of a mobile communication signal on the status bar. Then, the user equipment 200 initiates SA 5G network search and registration. As shown in FIG. 20A and FIG. 20B, the user equipment 200 successfully registers with the SA 5G network this time. In addition, the user equipment 200 displays, in the status bar, one or more signal strength indicators 301H and an operator name 301F that are of a 5G mobile communication signal, and may further display a signal strength indicator 301G.

For example, when the user equipment 200 is restarted and powered on, for the solution provided in this embodiment of the present invention, refer to FIG. 6 to FIG. 8A and FIG. 8B.

The user equipment 200 shown in FIG. 6 is user equipment for which a SA 5G service is not provisioned. As shown in FIG. 7A and FIG. 7B, a user restarts the user equipment 200. When the user equipment 200 is just powered on, the user equipment 200 displays the no-signal indicator 201D of a mobile communication signal on the status bar 201D. After being powered on, the user equipment 200 initiates SA 5G search and registration. As shown in FIG. 8A and FIG. 8B, after the SA 5G registration fails, the user equipment 200 registers with the 4G network.

Figure 21A:
Figure 21B:
Figure 22A:
Figure 22B:

In this embodiment of this application, after registering with the 4G network, the user equipment 200 obtains specific trigger information, to trigger the user equipment 200 to initiate SA 5G network search and registration again. As shown in FIG. 21A and FIG. 21B, when the user equipment 200 disconnects from the 4G network, the user equipment 200 displays the no-signal indicator 201D of a mobile communication signal on the status bar 201. Then, the user equipment 200 initiates SA 5G network search and registration. As shown in FIG. 22A and FIG. 22B, the user equipment 200 successfully registers with the SA 5G network this time. In addition, the user equipment 200 displays, in the status bar, one or more signal strength indicators 201H and an operator name 201F that are of a 5G mobile communication signal, and may further display a signal strength indicator 201G.

Figure 23:
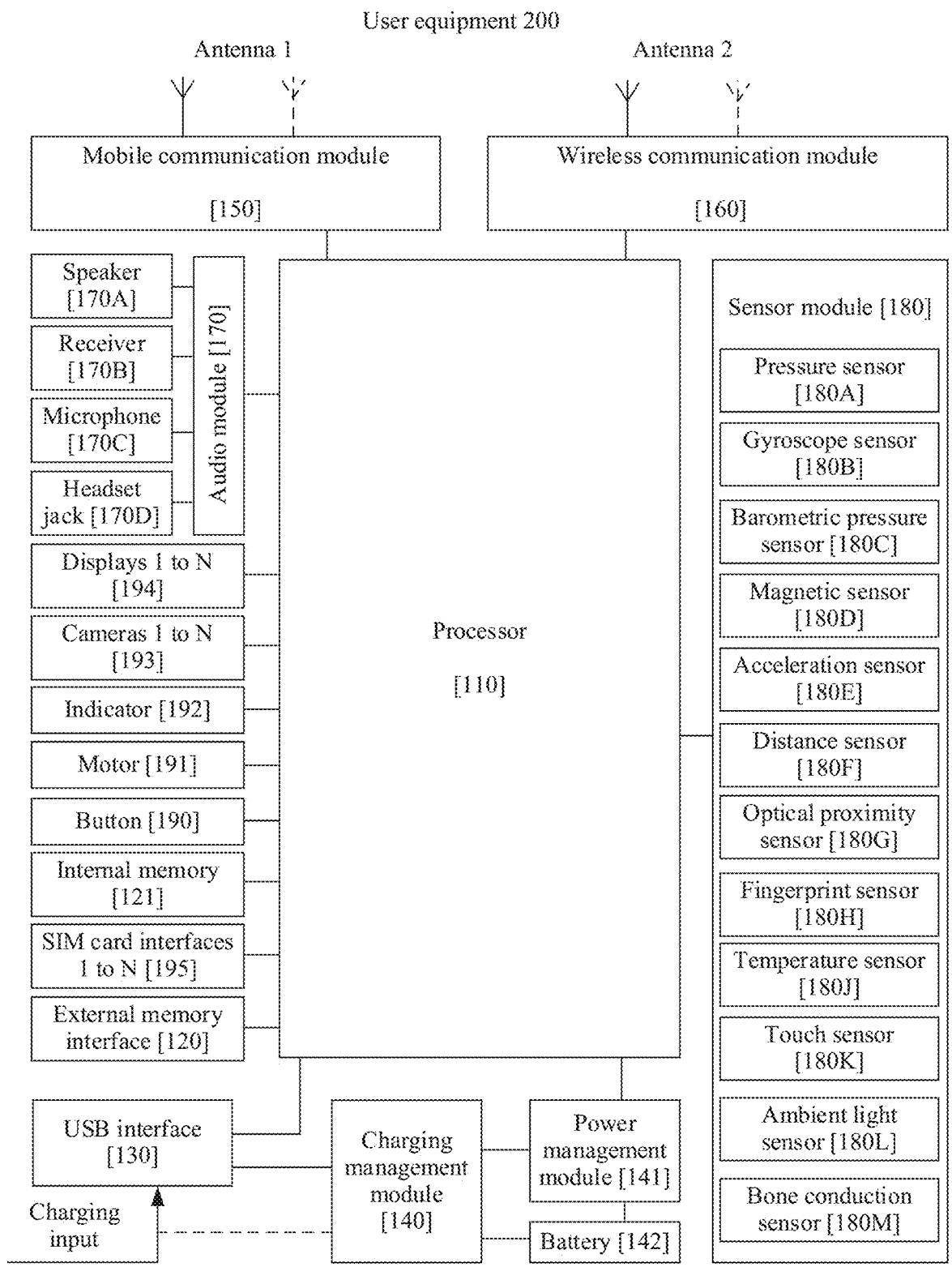
FIG. 23 is a schematic diagram of a structure of user equipment according to an embodiment of this application.

For ease of understanding embodiments of this application, the user equipment 200 shown in FIG. 23 is used as an example to describe user equipment to which embodiments of this application are applicable.

FIG. 23 shows a schematic diagram of a structure of an example of user equipment 200 according to an embodiment of this application.

The user equipment 200 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 1700, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180E an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of this application does not constitute a specific limitation on the user equipment 200. In other embodiments of this application, the user equipment 200 may include more or fewer components than those shown in the figure, or combine some components, or split some components, or have a different component arrangement. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the user equipment 200. The controller may generate an operation control signal based on instruction operation code and a time sequence signal, to control instruction fetching and instruction execution.

The NPU may perform an artificial intelligence operation by performing convolutional neural network (convolutional neural networks, CNN) processing. For example, a CNN model is used to perform a large amount of information identification and information filtering, to implement identification for short message content.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. In this way, repeated access is avoided, waiting time of the processor 110 is reduced, and system efficiency is improved.

The charging management module 140 is configured to receive a charging input from a charger.

A wireless communication function of the user equipment 200 may be implemented by using the antenna 1, the antenna 2, the mobile communication module 150, the wireless communication module 160, the modem processor, the baseband processor, and the like. The antenna 1 and the antenna 2 are configured to transmit and receive electromagnetic wave signals, Each antenna in the user equipment 200 may be configured to cover one or more communication frequency bands. Different antennas may be multiplexed to improve antenna utilization.

The mobile communication module 150 may provide a solution that includes wireless communication such as 2G/3G/4G/5G and that is applied to the user equipment 200. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 and at least some modules of the processor 110 may be disposed in a same component.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transfers the low-frequency baseband signal obtained through demodulation to the baseband processor for processing. After being processed by the baseband processor, the low-frequency baseband signal is transmitted to the application processor. The application processor outputs a sound signal through an audio device (not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same component as the mobile communication module 150 or another functional module.

The wireless communication module 160 may provide a wireless communication solution that is applied to the user equipment 200 and that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field, communication (near field communication, NFC) technology, an infrared (infrared. IR) technology, or the like. The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the user equipment 200, the antenna 1 and the mobile communication module 150 are coupled, and the antenna 2 and the wireless communication module 160 are coupled, so that the user equipment 200 can communicate with a network and another device by using a wireless communication technology. The wireless communication technology may include a global system for mobile communication (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite-based augmentation system (satellite based augmentation systems, SBAS).

The user equipment 200 implements a display function by using the GPU, the display 194, the application processor, and the like. The GPU is a microprocessor for image processing, and is connected to the display 194 and the application processor. The processor 110 may include one or more GPU that execute program instructions to generate or change display information.

The display 194 is configured to display an image, a video, and the like. The display 194 includes a display panel. In some embodiments of this application, the display 194 displays interface content currently output by a system. For example, the interface content is an interface provided by an instant messaging application.

The user equipment 200 may implement a photographing function by using the ISP, the camera 193, the video codec, the GPU, the display 194, the application processor, and the like. The ISP is configured to process data fed back by the camera 193. In some embodiments, the ISP may be disposed in the camera 193. The camera 193 is configured to capture a static image or a video.

The NPU is a neural-network (neural-network, NN) computing processor. The NPU quickly processes input information by using a structure of a biological neural network, for example, by using a transfer mode between human brain neurons, and may further continuously perform self-learning. Applications such as intelligent cognition of the user equipment 100, such as image recognition, facial recognition, speech recognition, and text understanding, may be implemented by using the NPU.

The internal memory 121 may be configured to store computer executable program code, where the executable program code includes instructions. The processor 110 runs the instructions stored in the internal memory 121, to perform various function applications and data processing of the user equipment 200. The internal memory 121 may include a program storage area and a data storage area. The program storage area may store an operating system, an application required by at least one function (for example, a sound playing function or an image playing function), and the like. The data storage area may store data (for example, audio data, and a phone book) created during a process of using the user equipment 200, and the like.

The user equipment 200 may implement audio functions by using the audio module 170, the speaker 170A, the receiver 170B, the microphone 170C, the headset jack 170D, the application processor, and the like. For example, a music playback function and a recording function are implemented. The audio module 170 is configured to convert digital audio information into an analog audio signal output, and is also configured to convert an analog audio input into a digital audio signal. The speaker 170A, also referred to as a "loudspeaker", is configured to convert an audio electrical signal into a sound signal. The receiver 170B, also referred to as an "earpiece", is configured to convert an audio electrical signal into a sound signal. The microphone 170C, also referred to as a "mike" or a "microphone", is configured to convert a sound signal into an electrical signal. The headset jack 170D is configured to connect to a wired headset.

The pressure sensor 180A is configured to sense a pressure signal, and may convert the pressure signal into an electrical signal. The gyroscope sensor 180B may be configured to determine a motion posture of the user equipment 200. The barometric pressure sensor 180C is configured to measure barometric pressure. The magnetic sensor 180D includes a Hall sensor.

The user equipment 200 may detect opening and closing of a flip leather case by using the magnetic sensor 180D. The acceleration sensor 180E may detect magnitudes of accelerations in various directions generally on three axes) of the user equipment 200. The distance sensor 180F is configured to measure a distance. The optical proximity sensor 180G may include a light-emitting diode (LED) and an optical detector, for example, a photodiode. The ambient light sensor 180L is configured to sense ambient light brightness. The fingerprint sensor 180H is configured to collect a fingerprint. The temperature sensor 180J is configured to detect a temperature. The touch sensor 180K is also referred to as a "touch panel". The touch sensor 180K may be disposed on the display 194. The touch sensor 180K and the display 194 constitute a touchscreen, and the touchscreen is also referred to as a "touch control screen". The touch sensor 180K is configured to detect a touch operation performed on or near the touch sensor 180K The touch operation is an operation that a user touches the display 194 by using a hand, an elbow, a stylus, or the like. The touch sensor may transfer the detected touch operation to the application processor, to determine a type of a touch event. The bone conduction sensor 180M may obtain a vibration signal.

The button 190 includes a power button, a volume button, and the like. The button 190 may be a mechanical button, or may be a touch button. The motor 191 may generate a vibration prompt. The indicator 192 may be an indicator light, and may be configured to indicate a charging status and a power change, or may be configured to indicate a message, a missed call, a notification, and the like.

A software system of the user equipment 200 may use a layered architecture, an event-driven architecture, a microkernel architecture, a microservice architecture, or a cloud architecture. In this embodiment of this application, an Android system with a layered architecture is used as an example to describe a software structure of the user equipment 200.

Figure 24:
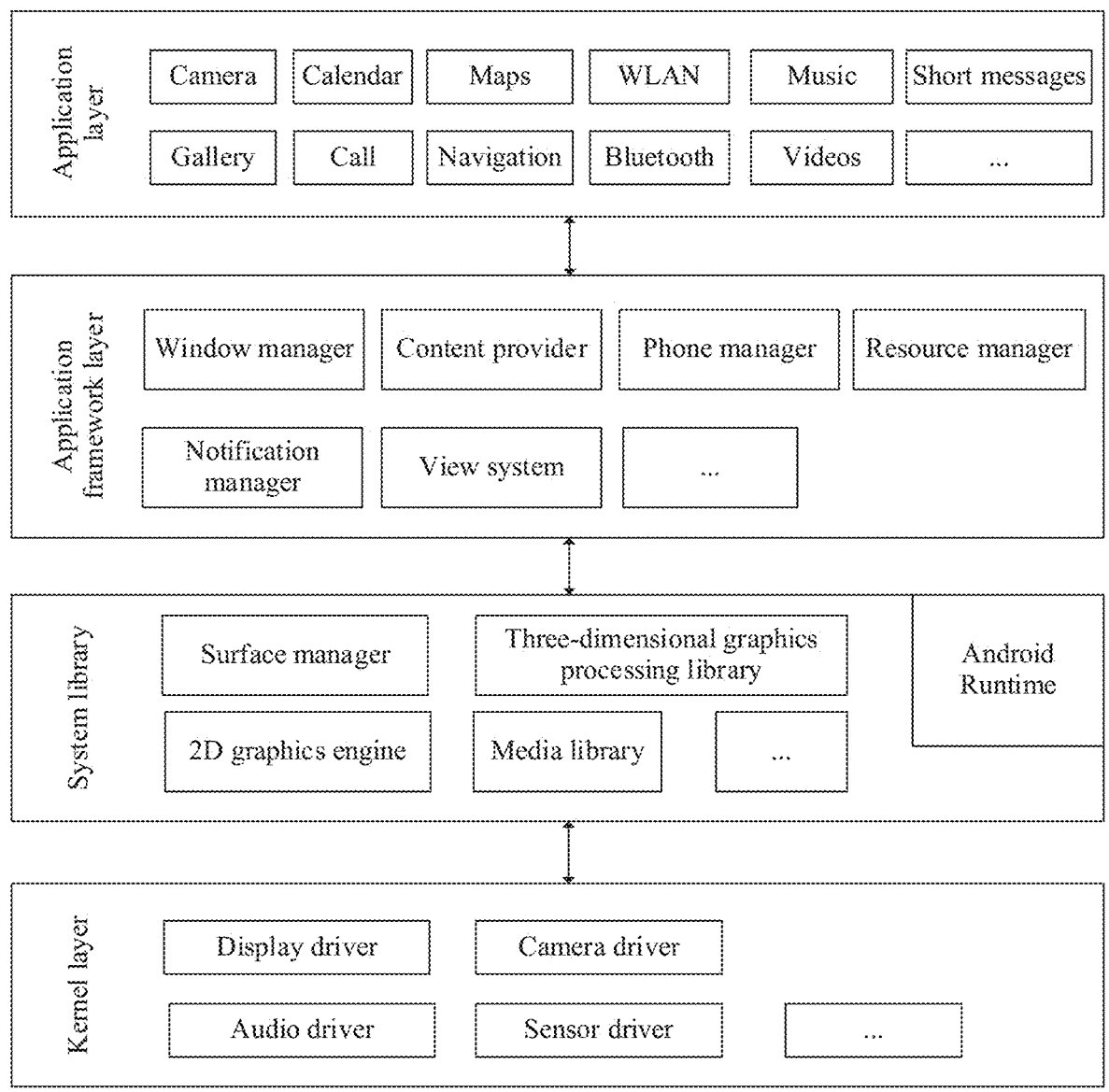
FIG. 24 is a block diagram of a software structure of user equipment according to an embodiment of this application.

FIG. 24 is a block diagram of a software structure of the user equipment 200 according to an embodiment of this application.

In the layered architecture, software is divided into several layers, and each layer has a clear role and a clear task. The layers communicate with each other by using a software interface. In some embodiments, the Android system is divided into four layers: an application layer, an application framework layer, an Android Runtime (Android runtime) and system library, and a kernel layer from top to bottom.

The application layer may include a series of application packages.

As shown in FIG. 24, the application packages may include applications such as Camera, Gallery, Calendar, Call, Maps, Navigation, WLAN, Bluetooth, Music, Videos, and Messages.

In this application, a floating launcher (floating launcher) may be further added to the application layer, to serve as a default display application in the foregoing floating window, and provide an entry for a user to enter another application.

The application framework layer provides an application programming interface (application programming interface, API) and a programming framework for an application at the application layer. The application framework layer includes some predefined functions.

As shown in FIG. 24, the application framework layer may include a window manager (window manager), a content provider, a view system, a phone manager, a resource manager, a notification manager, an activity manager (activity manager), and the like.

The window manager is configured to manage a window program. The window manager may obtain a size of a display, determine Whether there is a status bar, lock the display, take a screenshot of the display, and the like. In this application, a FloatingWindow may be extended based on a native PhoneWindow of Android, and is specially configured to display the foregoing floating window, to distinguish the floating window from a common window. The window has an attribute of being displayed on a top layer of a series of windows in a floating manner. In some optional embodiments, a proper value of a size of the window may be given based on an actual screen size according to an optimal display algorithm. In some possible embodiments, an aspect ratio of the window may be an aspect ratio of a screen of a conventional mainstream mobile phone by default. In addition, to help the user close and hide the floating window, an extra close button and an extra minimize button may be drawn in an upper right corner.

The content provider is configured to: store and obtain data, and enable the data to be accessed by an application. The data may include a video, an image, audio, calls that are made and received, a browsing history and bookmarks, a phone book, and the like.

The view system includes a visual control, for example, a control for displaying text or a control for displaying a picture. The view system may be used to build an application. A display interface may include one or more views. For example, a display interface including a short message notification icon may include a text display view and a picture display view. In this application, a key view used for operations such as closing and minimization may be correspondingly added to the floating window, and bound to the FloatingWindow in the window manager.

The phone manager is configured to provide a communication function of the user equipment 200, for example, management of a call status (including answering, declining, or the like).

The resource manager provides various resources for an application, such as a localized character string, an icon, a picture, a layout file, and a video file.

The notification manager enables an application to display notification information in a status bar 207, and may be configured to convey a notification-type message. The displayed information may automatically disappear after a short pause without user interaction. For example, the notification manager is configured to: notify download completion, give a message notification, and the like. The notification manager may alternatively be a notification that appears in a top status bar of the system in a form of a graph or a scroll bar text, for example, a notification of an application running in the background, or may be a notification that appears on a display in a form of a dialog window. For example, text information is prompted in the status bar, a prompt tone is played, the user equipment vibrates, or an indicator light blinks.

The activity manager is configured to manage activities that are running in the system, including a process (process), an application, a service (service), task (task) information, and the like. In this application, an activity task stack dedicated to managing an activity of an application displayed in the floating window may be newly added to an activity manager module, to ensure that the activity and a task of the application in the floating window do not conflict with an application displayed on the screen in full screen.

In this application, a motion detector (motion detector) may be further added to the application framework layer, to perform logical determining on an obtained input event and identify a type of the input event. For example, the motion detector determines, based on information such as touch coordinates and a timestamp of a touch operation included in the input event, that the input event is a knuckle touch event, a finger pad touch event, or the like. In addition, the motion detector may further record a track of the input event, determine a gesture rule of the input event, and respond to different operations based on different gestures.

The Android Runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, an input manager (input manager), an input dispatcher (input dispatcher), a surface manager (surface manager), a media library (Media Libraries), a three-dimensional graphics processing library (for example, OpenGL ES), and a 2D graphics engine (for example, SGL).

The input manager is responsible for obtaining event data front an underlying input driver, parsing and encapsulating the event data, and sending the event data to the input dispatcher.

The input dispatcher is configured to store window information. After receiving an input event from the input manager, the input dispatcher searches for a proper window in windows stored in the input dispatcher and dispatches the event to the window.

The surface manager is configured to manage a display subsystem, and provide fusion of 2D and 3D layers for a plurality of applications.

The media library supports playback and recording in a plurality of commonly used audio and video formats, static image files, and the like. The media library may support a plurality of audio and video coding formats, for example, MPEG 4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Figure 25:
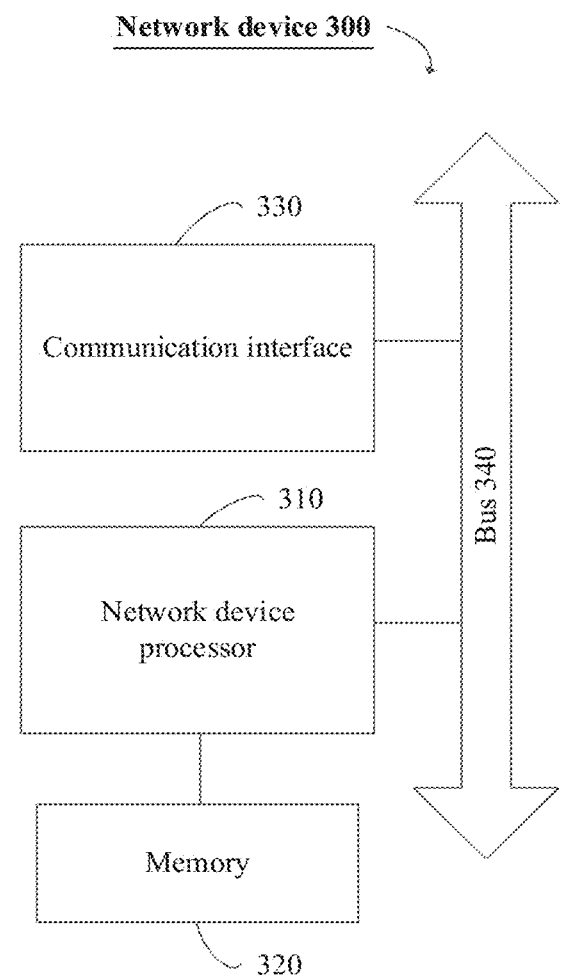
FIG. 25 is a block diagram of a software structure of a network device according to an embodiment of this application.

For ease of understanding embodiments of this application, a network device 300 shown in FIG. 25 is used as an example to describe a network device to which embodiments of this application are applicable.

FIG. 25 shows the network device 300 according to an embodiment of this application. As shown in FIG. 25, the network device 300 may include one or more network device processors 310, a memory 320, and a communication interface 330. These components may be connected by using a bus 340 or in another manner. In FIG. 25, an example in which these components are connected by using a bus is used.

The communication interface 330 may be used by the network device 300 to communicate with another communication device, for example, user equipment or another network device. Specifically, the communication interface 330 may be a 5G communication interface, or may be a future new radio communication interface. In addition to a wireless communication interface, the network device 300 may be configured with a wired communication interface 330 to support wired communication. For example, a backhaul link between a network device 300 and another network device 300 may be a wired communication connection.

The memory 320 is coupled to the network device processor 310, and is configured to store various software programs and/or a plurality of sets of instructions. Specifically, the memory 320 may include a high-speed random access memory, and may further include a non-volatile memory, for example, one or more magnetic disk storage devices, a flash memory device, or another non-volatile solid-state storage device. The memory 320 may store an operating system (briefly referred to as a system below), for example, an embedded operating system such as uCOS, VxWorks, or RTLinux. The memory 320 may further store a network communication program. The network communication program may be used to communicate with one or more additional devices, one or more pieces of user equipment, one or more network devices, or the like.

In this embodiment of this application, the network device processor 310 may be configured to read and execute computer-readable instructions. Specifically, the network device processor 310 may be configured to: invoke a program stored in the memory 32, for example, a program for implementing, on a network device 300 side, a network slice management method provided in one or more embodiments of this application; and execute instructions included in the program.

It may be understood that the network device 300 may be the AN 102 in the communication system 100 shown in FIG. 1, or may be the core network entity in the communication system 100 shown in FIG. 1, for example, a UPF 104, an AMF 105, an SMF 106, an AUSF 107, an NSSF 108, an NEF 109, an NRF 110, a PCF 111, or a UDM 112.

It should be noted that the network device 300 shown in FIG. 25 is merely an implementation of this embodiment of this application. In actual application, the network device 300 may further include more or fewer components. This is not limited herein.

An embodiment of this application further provides a chip system 400. The chip system 400 may include one or more processors 410.

The processor 410 may be an integrated circuit chip and has a signal processing capability. In an implementation process, the steps in the foregoing methods may be completed by using a hardware integrated logic circuit in the processor 410, or by using instructions in a form of software. The processor 410 may include a modem processor, and may further include an application processor (application processor, AP). The processor 410 may implement or perform the methods and the steps disclosed in embodiments of this application. The processor 410 may further include more components. This is not limited herein.

Optionally, the chip system 400 further includes a memory 420. The memory 420 may include a read-only memory and a random access memory, and provide operation instructions and data to the processor. A part of the memory 420 may further include a non-volatile random access memory.

Optionally, the memory 420 stores an executable software module or a data structure, and the processor 420 may perform a corresponding operation by invoking operation instructions (the operation instructions may be stored in an operating system) stored in the memory.

Optionally, the chip system 400 may be disposed in the user equipment in this embodiment of this application. Optionally, the processor 410 is configured to perform the processing steps of the user equipment in the embodiments shown in FIG. 9, FIG. 10A and FIG. 10B, and FIG. 15A and FIG. 15B to FIG. 18A and FIG. 18B. For example, the chip system 400 sends a registration request by using the modem processor, and the chip system 400 parses a notification short message by using the AP processor. The memory 420 is configured to store data and instructions of the user equipment in the embodiments shown in FIG. 9, FIG. 10A and FIG. 10B, and FIG. 15A and FIG. 15B to FIG. 18A and FIG. 18B.

An embodiment of this application further provides a computer-readable storage medium. All or some of the methods described in the foregoing method embodiments may be implemented by using software, hardware, firmware, or any combination thereof. When the methods are implemented in the software, functions used as one or more instructions or code may be stored in the computer-readable medium or transmitted on the computer-readable medium. The computer-readable medium may include a computer storage medium and a communication medium, and may further include any medium that can transfer a computer program from one place to another. The storage medium may be any available medium accessible to a computer.

An embodiment of this application further provides a computer program product. All or some of the methods described in the foregoing method embodiments may be implemented by using software, hardware, firmware, or any combination thereof. When the methods are implemented in the software, all or some of the methods may be implemented in a form of the computer program product. The computer program product includes one or more computer instructions. When the computer program instructions are loaded and executed on a computer, all or some of the procedures or functions that are described in the foregoing method embodiments are generated. The computer may be a general-purpose computer, a dedicated computer, a computer network, a network device, user equipment, or another programmable apparatus.

In conclusion, the foregoing embodiments are merely intended for describing the technical solutions of this application, rather than limiting this application. Although this application is described in detail with reference to the foregoing embodiments, a person of ordinary skill in the art should understand that modifications may still be made to the technical solutions described in the foregoing embodiments, or equivalent replacements may still be made to some technical features thereof. These modifications or replacements do not make the essence of the corresponding technical solutions depart from the scope of the technical solutions of embodiments of this application.

What is claimed is:

1. A network search method for standalone (SA) fifth generation (5G) service auto-provisioning implemented by a user equipment, wherein the network search method comprises:
   sending, to a network side device, a registration request requesting to register the user equipment with a 5G network, wherein a networking mode of the 5G network is SA networking;
   receiving, from the network side device, a registration reject response when no available 5G subscription data corresponding to the user equipment is obtained through a query, wherein the registration reject response notifies the user equipment that a registration with the 5G network has failed;
   receiving, from the network side device after the network side device provisions a 5G service for the user equipment, a notification short message notifying the user equipment that the 5G service is successfully provisioned; and
   resending, in response to the notification short message and to the network side device, the registration request.

2. The network search method of claim 1, further comprising further sending, to the network side device for a first time, the registration request.

3. The network search method of claim 1, further comprising:
   identifying that the user equipment has no network service in a New Radio (NR) cell; and
   further sending, in response to identifying that the user equipment has no network service in the NR cell and to the network side device for a first time, the registration request.

4. The network search method of claim 1, further comprising:
   leaving a Long-Term Evolution (LTE) cell; and
   entering a New Radio (NR) cell; and
   further sending, in response to leaving the LTE cell and entering the NR cell and to the network side device for a first time, the registration request.

5. The network search method of claim 1, further comprising:
   identifying that the user equipment is powered on in a New Radio (NR) cell; and
   further sending, in response to identifying that the user equipment is powered on in the NR cell and to the network side device for a first time, the registration request.

6. The network search method of claim 1, further comprising:
   identifying that an airplane mode of the user equipment is disabled in a New Radio (NR) cell; and further sending, in response to identifying that the airplane mode of the user equipment is disabled in the NR cell and to the network side device for a first time, the registration request.

7. The network search method of claim 1, wherein the user equipment supports the 5G network.

8. The network search method of claim 1, wherein after resending the registration request to the network side device, the network search method further comprises receiving, a from the network side device after the available 5G subscription data is obtained through the query, a registration accept response notifying the user equipment that the registration with the 5G network has succeeded.

9. The network search method of claim 1, further comprising:
   detecting that the notification short message comprises a preset keyword; and
   further resending, in response to detecting that the notification short message comprises the preset keyword and to the network side device, the registration request.

10. A user equipment comprising:
    a memory configured to store instructions; and
    a processor coupled to the memory and configured to execute the instructions to cause the user equipment to:
      send, to a network side device, a registration request requesting to register the user equipment with a fifth generation (5G) network, wherein a networking mode of the 5G network is standalone (SA) networking;
      receive, from the network side device when no available 5G subscription data corresponding to the user equipment is obtained through a query, a registration reject response notifying the user equipment that a registration with the 5G network has failed;
      receive, from the network side device after the network side device provisions a 5G service for the user equipment, a notification short message notifying the user equipment that the 5G service is successfully provisioned; and
      resend, to the network side device in response to the notification short message, the registration request.

11. The user equipment of claim 10, wherein the processor is further configured to execute the instructions to cause the user equipment to further send the registration request to the network side device for a first time.

12. The user equipment of claim 10, wherein the processor is further configured to execute the instructions to cause the user equipment to:
    identify that the user equipment has no network service in a New Radio (NR) cell; and
    further send, in response to identifying that the user equipment has no network service in the NR cell and to the network side device for a first time, the registration request.

13. The user equipment of claim 10, wherein the processor is further configured to execute the instructions to cause the user equipment to:
    leave a Long-Term Evolution (LTE) cell and enter a New Radio (NR) cell; and
    further send, in response to leaving the LTE cell and entering the NR cell and to the network side device for a first time, the registration request.

14. The user equipment of claim 10, wherein the processor is further configured to execute the instructions to cause the user equipment to:
    identify that the user equipment is powered on in a New Radio (NR) cell; and,
    further send, in response to identifying that the user equipment is powered on in the NR cell and to the network side device for a first time, the registration request.

15. The user equipment of claim 10, wherein the processor is further configured to execute the instructions to cause the user equipment to:
    identify that an airplane mode of the user equipment is disabled in a New Radio (NR) cell; and
    further send, in response to identifying that the airplane mode of the user equipment is disabled in the NR cell and to the network side device for a first time, the registration request.

16. The user equipment of claim 10, wherein the user equipment supports the 5G network.

17. The user equipment of claim 10, wherein after resending the registration request to the network side device, the processor is further configured to execute the instructions to cause the user equipment to receive, from the network side device after the available 5G subscription data is obtained through the query, a registration accept response notifying the user equipment that the registration with the 5G network has succeeded.

* * * * *

UNITED STATES PATENT AND TRADEMARK OFFICE
CERTIFICATE OF CORRECTION

| | | |
|---|---|---|
| PATENT NO. | : 12,414,069 B2 | Page 1 of 1 |
| APPLICATION NO. | : 17/921442 | |
| DATED | : September 9, 2025 | |
| INVENTOR(S) | : Zhenrong Wei and Hao Song | |

It is certified that error appears in the above-identified patent and that said Letters Patent is hereby corrected as shown below:

In the Claims

Claim 8, Column 43, Lines 9-10: "receiving, a from the network" should read "receiving, from the network"

Signed and Sealed this
Twenty-eighth Day of October, 2025

John A. Squires
*Director of the United States Patent and Trademark Office*